(12) United States Patent
Shimazu et al.

(10) Patent No.: US 9,195,010 B2
(45) Date of Patent: Nov. 24, 2015

(54) OPTICAL CONNECTOR APPARATUS

(75) Inventors: Hideto Shimazu, Tokyo (JP); Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 951 days.

(21) Appl. No.: 13/147,888

(22) PCT Filed: Feb. 3, 2010

(86) PCT No.: PCT/JP2010/051496
§ 371 (c)(1),
(2), (4) Date: Aug. 4, 2011

(87) PCT Pub. No.: WO2010/090211
PCT Pub. Date: Aug. 12, 2010

(65) Prior Publication Data
US 2011/0293223 A1 Dec. 1, 2011

(30) Foreign Application Priority Data

| Feb. 5, 2009 | (JP) | 2009-024630 |
| Jun. 9, 2009 | (JP) | 2009-138537 |
| Aug. 28, 2009 | (JP) | 2009-198748 |
| Oct. 27, 2009 | (JP) | 2009-247022 |

(51) Int. Cl.
*G02B 6/36* (2006.01)
*G02B 6/38* (2006.01)
(Continued)

(52) U.S. Cl.
CPC ............ *G02B 6/3817* (2013.01); *C09K 11/616* (2013.01); *C09K 11/636* (2013.01);
(Continued)

(58) Field of Classification Search
None
See application file for complete search history.

(56) References Cited

U.S. PATENT DOCUMENTS

| 4,707,071 A | 11/1987 | Kraft |
| 4,758,719 A | 7/1988 | Sasaki et al. |

(Continued)

FOREIGN PATENT DOCUMENTS

| CN | 1561462 A | 1/2005 |
| JP | 59-204814 A | 11/1984 |

(Continued)

OTHER PUBLICATIONS

International Search Report dated Apr. 27, 2010 issued in International Appln. No. PCT/JP2010/051496.

(Continued)

*Primary Examiner* — Ryan Lepisto
*Assistant Examiner* — Erin Chiem
(74) *Attorney, Agent, or Firm* — Holtz, Holtz, Goodman & Chick PC

(57) ABSTRACT

An optical connector apparatus includes a connector connected to an electro-optical composite cable including an optical fiber and a metal conductor, and a connection object to be connected. The connector is provided with a ferrule which has a conductive portion on the surface thereof. The connection object is provided with an electrically conductive connection member to be connected to the ferrule. The ferrule and the cable are connected by a crimping structure. Provided is also an optical connector apparatus which includes a connector having a plurality of ferrules having distances between the end of the ferrules and the conductive portions so that the timing of the connection of the connector to the object is delayed, and thus the optical connector apparatus is capable of hot swapping. The connection object can be a combination of an adapter and a mating connector, or an optical element and an adapter which holds the same, etc.

14 Claims, 35 Drawing Sheets

(51) Int. Cl.
*C09K 11/63* (2006.01)
*C09K 11/61* (2006.01)
*C09K 11/66* (2006.01)

(52) U.S. Cl.
CPC ............ *C09K11/665* (2013.01); *G02B 6/3825* (2013.01); *G02B 6/3855* (2013.01); *G02B 6/3869* (2013.01); *G02B 6/3879* (2013.01); *G02B 6/3887* (2013.01); *G02B 6/3893* (2013.01)

(56) References Cited

U.S. PATENT DOCUMENTS

| | | | |
|---|---|---|---|
| 5,642,450 A * | 6/1997 | Oda | 385/60 |
| 5,689,609 A | 11/1997 | Tonejc | |
| 6,632,023 B1 * | 10/2003 | Ogawa et al. | 385/53 |
| 6,648,520 B2 | 11/2003 | McDonald et al. | |
| 6,848,834 B1 | 2/2005 | Roehrs et al. | |
| 6,899,467 B2 | 5/2005 | McDonald et al. | |
| 2002/0126967 A1 * | 9/2002 | Panak et al. | 385/101 |

FOREIGN PATENT DOCUMENTS

| | | | |
|---|---|---|---|
| JP | 60-39009 U | 3/1985 | |
| JP | 61-73909 A | 4/1986 | |
| JP | 61-157910 U | 9/1986 | |
| JP | 62-19813 A | 1/1987 | |
| JP | 5-164941 A | 6/1993 | |
| JP | 6-5153 A | 1/1994 | |
| JP | 9-166730 A | 6/1997 | |
| JP | 10-31134 A | 2/1998 | |
| JP | 10-96832 A | 4/1998 | |
| JP | 2000-39537 A | 2/2000 | |
| JP | 2004-191397 A | 7/2004 | |
| JP | 2005-316281 A | 11/2005 | |
| JP | 2006-23420 A | 1/2006 | |
| JP | 2006-84788 A | 3/2006 | |
| JP | 2006-146084 A | 6/2006 | |
| JP | 2007-193251 A | 8/2007 | |
| JP | 2007-241105 A | 9/2007 | |
| JP | 2008-33243 A | 2/2008 | |

OTHER PUBLICATIONS

Chinese Office Action dated Aug. 12, 2013 (and English translation thereof) in counterpart Chinese Application No. 201080005814.4.
Chinese Office Action dated Apr. 24, 2014 in counterpart Chinese Application No. 201080005814.4.
Canadian Office Action dated Jul. 28, 2015, issued in counterpart Canadian Application No. 2,751,691.
Chinese Office Action (and English translation thereof) dated Jun. 30, 2015, issued in counterpart Chinese Application No. 201410323013.2.

* cited by examiner

OPTICAL CONNECTOR APPARATUS

CROSS REFERENCE TO RELATED APPLICATIONS

This application is a U.S. National Phase Application under 35 USC 371 of International Application No. PCT/JP2010/051496 filed Feb. 3, 2010.

TECHNICAL FIELD

This invention relates to an optical connector apparatus, and especially to an optical connector apparatus comprising: a wiring structure for an electro-optical composite cable and a ferrule, a connector connected with the electro-optical composite cable, and an adaptor relaying a connection between the connector and a connection object (a mating connector, an optical element, or the like).

BACKGROUND ART

A wiring structure for an electro-optical composite cable and a ferrule is disclosed in, for example, Patent Document 1 to Patent Document 3. The wiring structures disclosed in them are as follows. First, a tubular member integrally formed with (or prepared separately from) the ferrule is inserted between an optical fiber strand and a tensile-strength resistant fiber. Next, the ferrule is crimped so that the tensile-strength resistant fiber and an outer jacket are interposed between the ferrule and the tubular member. Thus, the electro-optical composite cable is connected with the ferrule without using an adhesive agent or the like.

A split sleeve (a sleeve having a cut portion) is known as a connection member connected with the ferrule. Techniques which solve a problem of the split sleeve are disclosed in Patent Document 4 to Patent Document 6. Each of the connection members disclosed in them is not provided with the cut portion. The connection member is configured to support the ferrule at three points (surfaces). Patent Document 7 discloses an improved technique of Patent Document 4.

Patent Document 8 discloses one of the examples of connectors and an adaptor wherein each of the connectors is connected with an electro-optical composite cable, and the adaptor connects the connectors with each other. The disclosed connector comprises a conductive ferrule holding an optical fiber included in the electro-optical composite cable while connected with a metal conductive material of the electro-optical composite cable. The adaptor is made of a synthetic resin. A conductive connection member adjusting a position of an axis of the ferrule is formed in the adaptor by insert molding. An electrical connection between the ferrules is carried out as follows. First, each ferrule of two connectors is inserted into the connection member. Then, end surfaces of the ferrules are brought into contact with each other within the connection member.

A technique relating to hot swapping of the electrical connector is disclosed in, for example, Patent Document 9. The disclosed electrical connector uses contacts each of which has a projection length from the connector wherein the projection lengths are different from each other so that a timing of connection can be shifted for every contact. The above-described structure enables the hot swapping.

Patent Document 1: JPA 2004-191397
Patent Document 2: JPA 2006-146084
Patent Document 3: JPA 2006-84788
Patent Document 4: JPA H10-31134
Patent Document 5: JPA S59-204814
Patent Document 6: JPA H5-164941
Patent Document 7: JPA 2006-23420
Patent Document 8: JPA S62-19813
Patent Document 9: JPA H6-5153

SUMMARY OF THE INVENTION

Problems to be Solved by the Invention

Applying the above crimping structure for an electrical connection between a metal conductor of an electro-optical composite cable and a conductive ferrule may be cause a problem that connection strength may be weak. It is therefore an object of the present invention to identify and eliminate a cause which brings a reduction of the connection strength in a wiring structure between the electro-optical composite cable and the conductive ferrule and to provide the wiring structure having high connection strength.

Each of the sleeves disclosed in Patent Document 4 to Patent Document 7 has a high spring constant so that there is a possibility that the ferrule may be damaged when the ferrule is inserted into the sleeve. Another problem is that a manufacturing cost may be high because high precision is required for holding the ferrule appropriately. It is therefore another object of the present invention to provide an optical connector apparatus which comprises sleeve which is of a low cost and which can hold the ferrule appropriately without giving damage thereto.

Furthermore, as for one of methods for holding an optical fiber by the ferrule, there is a method using an adhesive agent. In this method, general techniques to remove an adhesive agent leaked from an end surface of the ferrule are to polish, the end surface of the ferrule. However, in a case that the ferrule has conductivity on its surface, the conductivity may be lost when the ferrule is polished. For this reason, when the polished end surfaces of the ferrules are brought into contact with each other, there is a possibility that a good electrical connection may not be obtained between them.

In addition, the sleeve included in an adaptor of Patent Document 1 is generally made of conductive material so that the sleeve has a possibility to contribute to the electrical connection between the ferrules. However, the sleeve does not assure the electrical connection between the ferrules, in a case where, for example the ferrules are slightly uneven in size. This is because a principal object of the sleeve is to adjust axes of the ferrules as clearly understood from a fact that the sleeve is formed into the adaptor by insert molding so that the sleeve is prevented from being moved and/or displaced within the adaptor. Accordingly, a connection simply between conductive ferrules may cause the contact therebetween be unstable. In addition, when the conductive ferrule is used, foreign matter may be attached thereto so that an electrical short may occur, and the ferrule may be accidentally touched by a finger because an end of the ferrule is projected from a housing of the connector.

It is therefore another object of the present invention to provide an optical connector apparatus which has a structure that ensures the electrical connection between the ferrules. It is also another object to provide the optical connector apparatus which prevents the electrical short or the like caused by a touch by a finger or attachment of foreign matter, and so on to the end portion of the ferrule.

Furthermore, it is another object of the present invention to provide an optical connector and an optical connector apparatus using the same which enables, in addition to an optical connection, an electrical connection and hot swapping by using a new method distinct from Patent Document 9.

Means for Solving the Problems

One aspect of the present invention provides an optical connector apparatus comprising: a first connector connected with a first electro-optical composite cable including a first optical fiber and a first metal conductor; a second connector connected with a second electro-optical composite cable including a second optical fiber and a second metal conductor; and an adaptor relaying a connection between the first connector and the second connector. The first connector comprises a first ferrule holding the first optical fiber, at least a part of a surface of the first ferrule having a conductive portion electrically connected with the first metal conductor. The second connector comprises a second ferrule holding the second optical fiber, at least a part of a surface of the second ferrule having a conductive portion electrically connected with the second metal conductor. The adaptor comprises a connection member holding the first ferrule and the second ferrule, at least a part of a surface of the adaptor having conductivity for making an electrical connection between the conductive portion of the first ferrule and the conductive portion of the second ferrule.

Another aspect of the present invention provides an optical connector apparatus comprising: an optical element; a ferrule holding an optical fiber of an electro-optical composite cable and having a conductive portion electrically connected with a metal conductor of the electro-optical composite cable; and an adaptor holding the optical element and relaying a connection between the ferrule and the optical element. The adaptor comprises a connection member holding the ferrule, at least a part of a surface of the connection member having conductivity for making an electrical connection with the conductive portion.

Another aspect of the present invention provides an optical connector apparatus comprising: a ferrule holding an optical fiber of an electro-optical composite cable and having a contact portion electrically connected with a metal conductor of the electro-optical composite cable; and a connection object making an optical connection and an electrical connection simultaneously with the ferrule. The connection object comprises: a receiving portion receiving an end portion of the ferrule; a conductive portion provided on at least the end portion of the receiving portion; and an optical connection portion provided inside the receiving portion. The end portion of the ferrule is received in the receiving portion so that the optical connection is made by facing an end surface of the optical fiber toward the optical connection portion while the electrical connection is made by contacting the contact portion to the conductive portion.

Another aspect of the present invention provides an optical connector apparatus comprising: a first connector connected with a first electro-optical composite cable including a first optical fiber and a first metal conductor; a second connector connected with a second electro-optical composite cable including a second optical fiber and a second metal conductor; and an adaptor and relaying a connection between the first connector and the second connector. The first connector comprises a first ferrule holding the first optical fiber, at least a part of a surface of the first ferrule having a first conductive portion, the first conductive portion being connected with the first metal conductor. On the other hand, the second connector comprises a second ferrule holding the second optical fiber, at least a part of the second ferrule having a second conductive portion, the second conductive portion being connected with the second metal conductor. The adaptor comprises a connection member which connects the first ferrule with the second ferrule. An end portion of the first ferrule is provided with a recess portion, and an end of the first optical fiber is positioned within the recess portion so as not to project from an end surface of the first ferrule.

Another aspect of the present invention provides an optical connector apparatus having a connection member connecting ferrules, wherein the connection member is formed by processing a metal sheet having two edge portions so that the connection member has a main body having a tube or a cylinder shape, the two edge portions facing each other. The main body portion comprises a plurality of ferrule-contact portions, each of the ferrule-contact portions being separated from each other on a perpendicular surface perpendicular to an axis-direction of the connection member and being brought into contact with the ferrule when the connection member holds the ferrule.

Another aspect of the present invention provides an optical connector comprising a first ferrule having a first end surface and a second ferrule having a second end surface. The first ferrule is provided with a first conductive portion. The second ferrule is provided with a second conductive portion. A distance between the first end surface and the first conductive portion is different from another distance between the second end surface and the second conductive portion.

Effect of Invention

According to the present invention, with the above wiring methods, the crimped portion is crimped in a state that size difference between the metal conductor and the outer jacket is adjusted by an adjuster portion so that the connection strength can be stable. The crimped portion has no unnecessary clearance so that there is another advantageous that simple jig may be used for crimping.

According to the present invention, the connection member (the split sleeve) is configured to hold the first ferrule and the second ferrule from outside in a diameter direction so that an electrical connection between the first ferrule and the second ferrule is reliable even when a polishing process is carried out for each ferrule.

According to the present invention, the sleeve is formed by processing a metal sheet having two edge portions so that the sleeve has a main body having a tube or a cylinder shape wherein the two edge portions face (or join to) each other. For this reason, the spring constant can be decreased, and the ferrules are held appropriately. The opposed-edges portion (joint portion) is formed on the sleeve, and the ferrule is held by three ferrule-contact portions formed by the process. Therefore, a manufacturing cost can be reduced.

According to the present invention, a plurality of the ferrules are provided in the optical connector, wherein each of the ferrules has a length between an end surface of the ferrule and the conductive portion to be connected with the mating connector or the like, and the lengths of the ferrules are different from each other. Therefore, the electrical connection is reliably established when the optical connection with the mating connector or the like is established, in addition, hot swapping is usable.

BEST MODE FOR CARRYING OUT THE INVENTION

A brief explanation will be made about components of an optical connector apparatus according to an embodiment of the present invention. The optical connector apparatus comprises a connector and an adaptor, wherein the connector is connected with an electro-optical cable, and the adaptor relays between the connector and a connection object. The connector comprises a ferrule connected with an electro-optical composite cable. The adaptor comprises a connection member. An electro-optical connection between the connector and the adaptor is made by connecting the ferrule of the connector to the connection member of the adaptor.

The explanation will be made about the connection object, taking a mating connector or a connector comprising an optical element as an example. A combination of the adaptor and the mating connector or a combination of adaptor and the connector comprising the optical element may be considered as one connection object. With reference to the drawings, a detailed explanation will be made hereinbelow about the optical connector applicable for the electro-optical composite cable according to the embodiment.

First Embodiment

Figure 1:
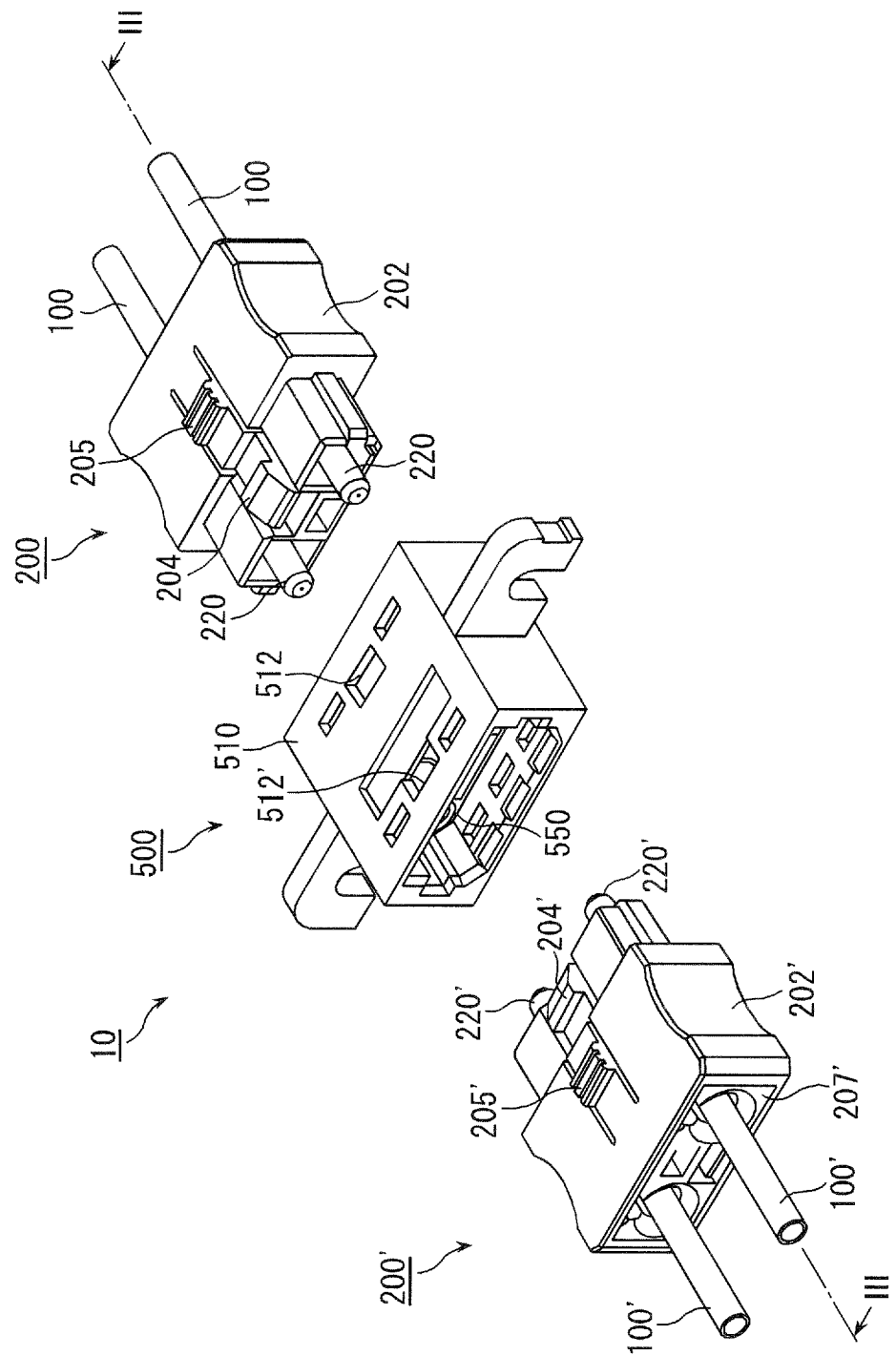
FIG. 1 An oblique view showing an optical connector apparatus according to a first embodiment of the present invention. The illustrated optical connector apparatus comprising connectors (a first connector and a second connector) and an adaptor is in a separated state.
Figure 2:
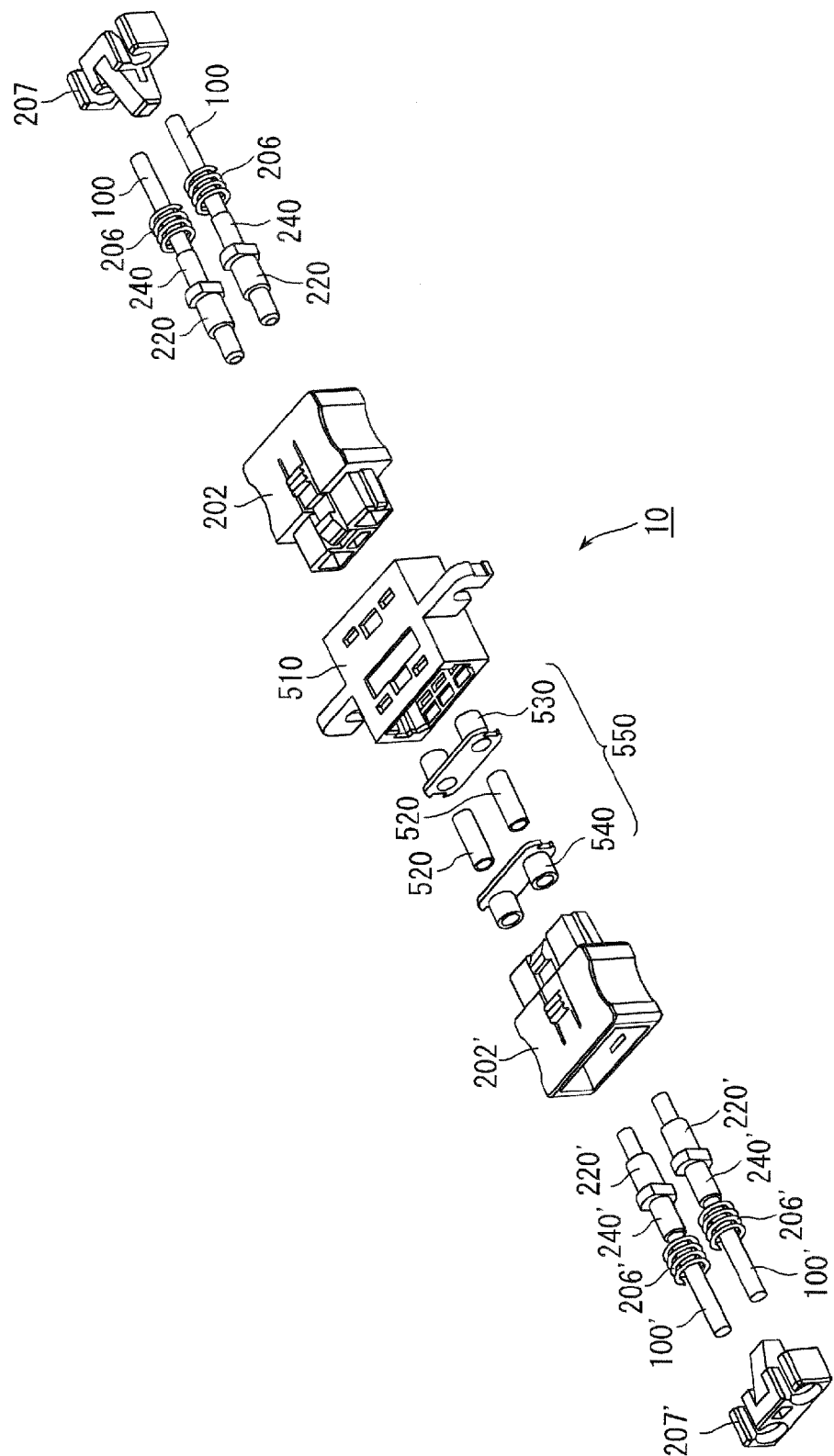
FIG. 2 An exploded oblique view showing the optical connector apparatus of FIG. 1.
Figure 3:
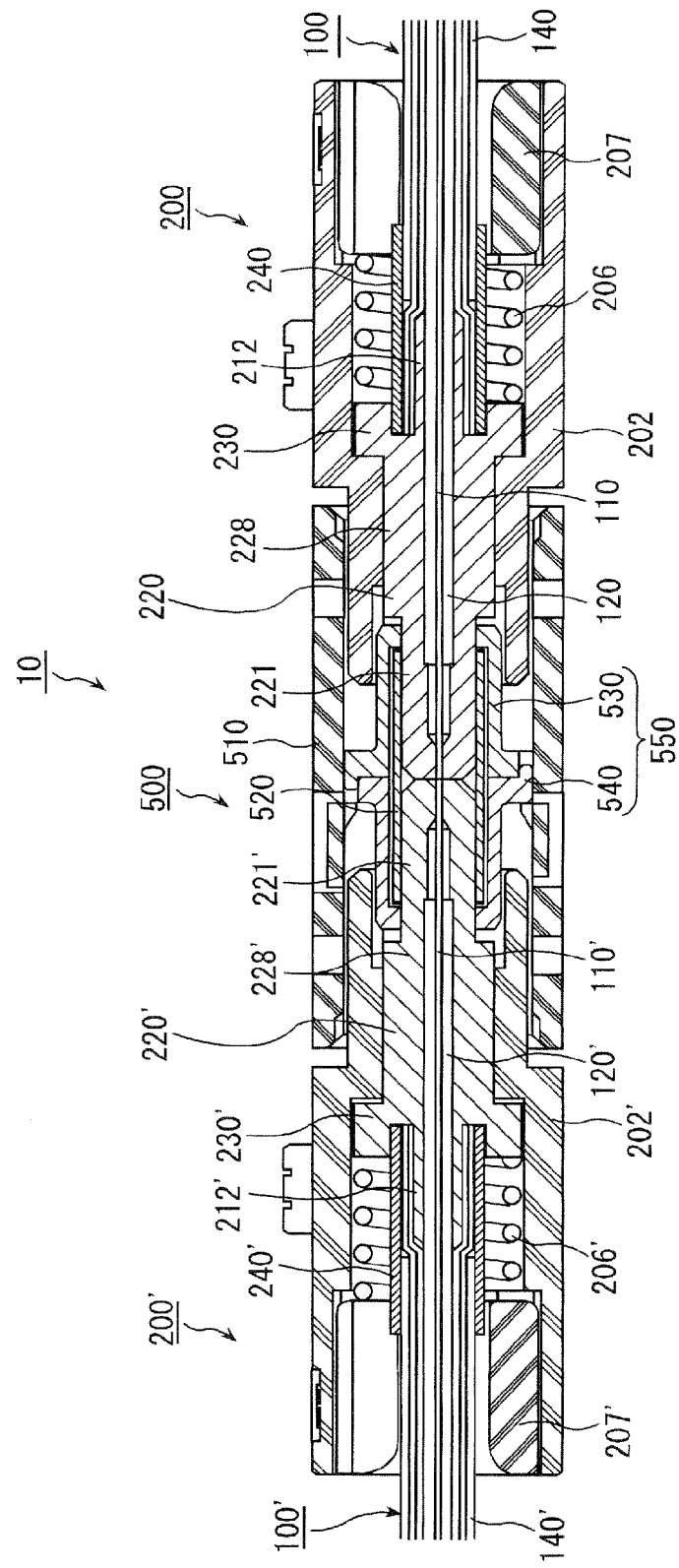
FIG. 3 A cross-sectional view showing the optical connector apparatus of FIG. 1, taken along lines III-III. The illustrated optical connector apparatus is in a connection state.

In an optical connector according to a first embodiment of the present invention, a ferrule is gripped by a connection member so that a connection between them is made. An explanation of the first embodiment will be made about two connectors and an adaptor relaying between them. As illustrated in FIGS. 1 to 3, the optical connector 10 comprises a first connector 200 connected with a first electro-optical composite cable 100, a second connector 200' connected with a second electro-optical composite cable 100', and an adaptor 500 relaying a connection between the first connector 200 and the second connector 200'.

As illustrated in FIG. 3, the first connector 200 comprises a first ferrule 220. The first ferrule 220 is connected with the first electro-optical composite cable 100. The second connector 200' comprises a second ferrule 220'. The second ferrule 220' is connected with the second electro-optical composite cable 100'. A first to fourth wiring structures illustrated in FIGS. 4 to 13 may be used as a wiring structure between the first electro-optical composite cable 100 and the first ferrule 220 (or a wiring structure between the second electro-optical composite cable 100' and the second ferrule 220') as appropriate.

Figure 4:
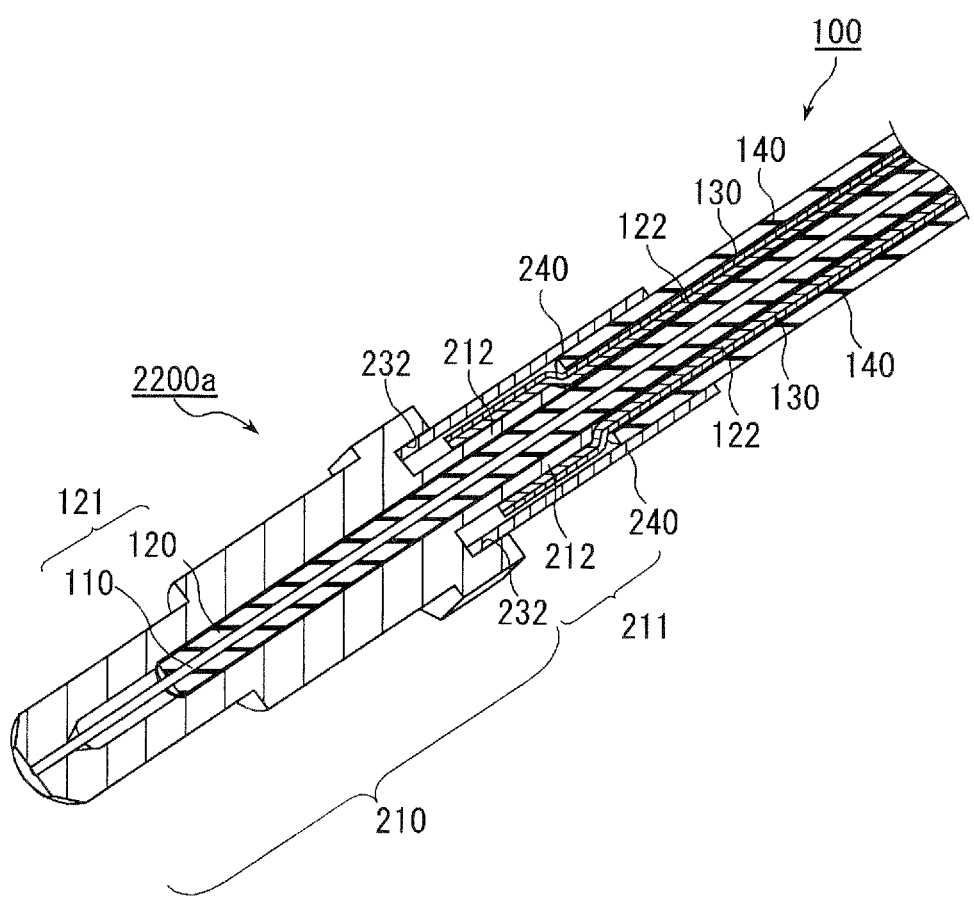
FIG. 4 A cross-sectional view showing a wiring structure between an electro-optical composite cable and a ferrule according to a first wiring method of the present invention.
Figure 5:
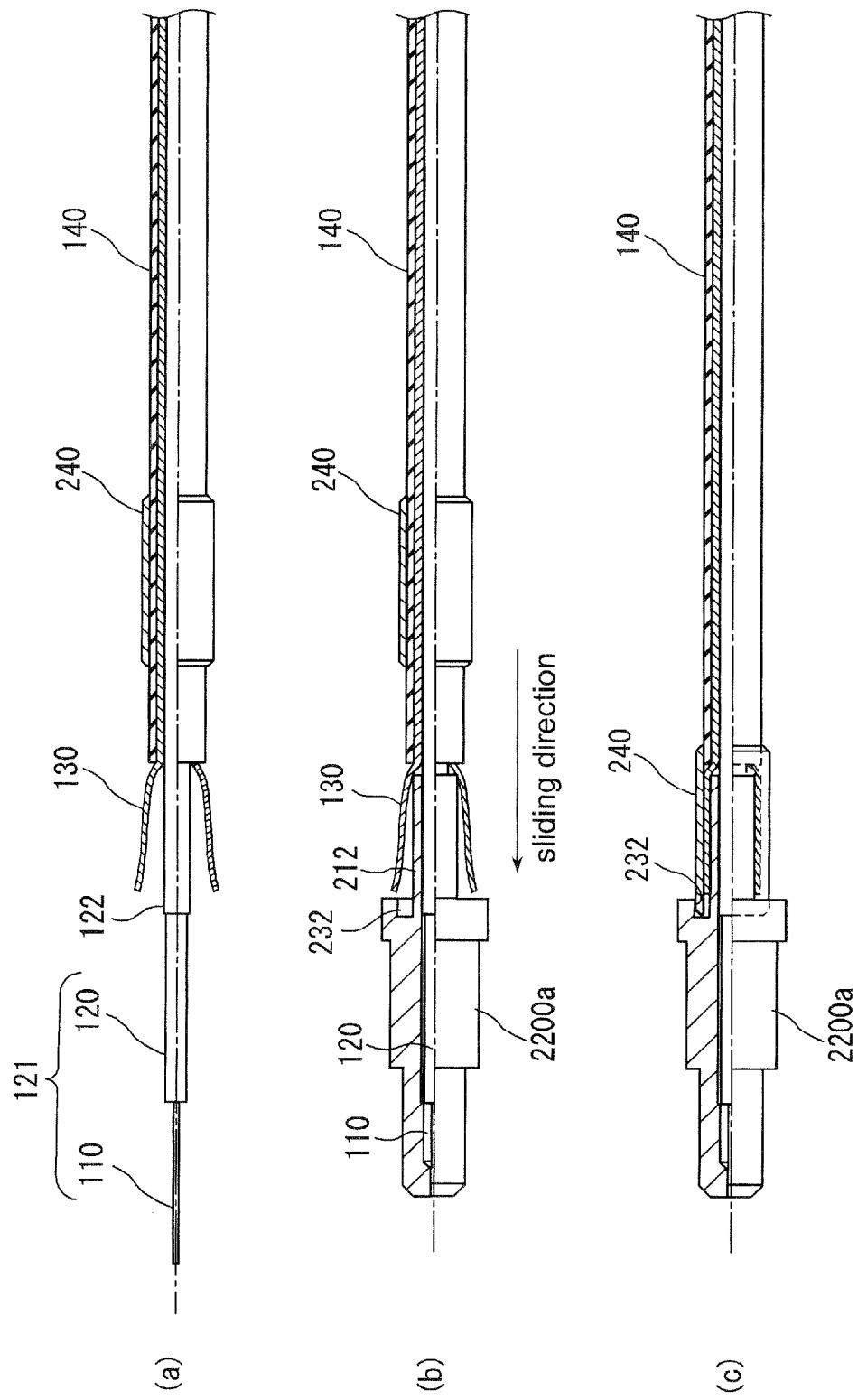
FIG. 5 A partially-cutaway cross-sectional view showing procedures of making the wiring structure of FIG. 4.

As illustrated in FIGS. 4 and 5, The first wiring structure comprise an electro-optical composite cable 100, a ferrule 2200a made of conductive material such as metal, and a sleeve 240 made of conductive material such as metal. Except for metal, conductive resin or insulation resin formed with a metal thin layer on a surface may be used as the conductive material.

Figure 6:
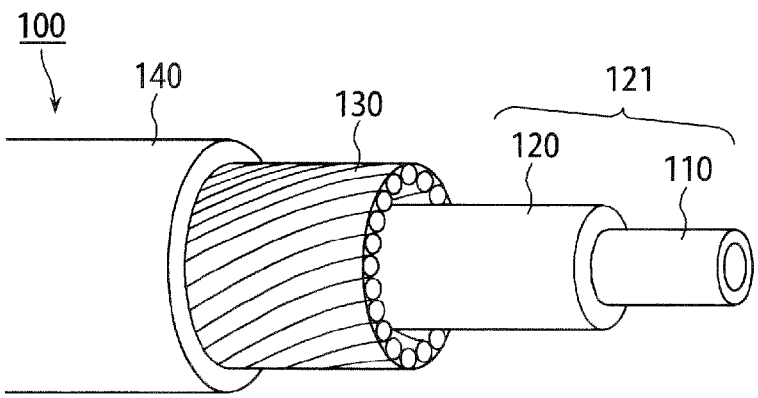
FIG. 6 An oblique view showing a structure of an electro-optical composite cable according to the embodiment of the present invention. Each part of the electro-optical composite cable is shown exposed for easy understanding.
Figure 7:
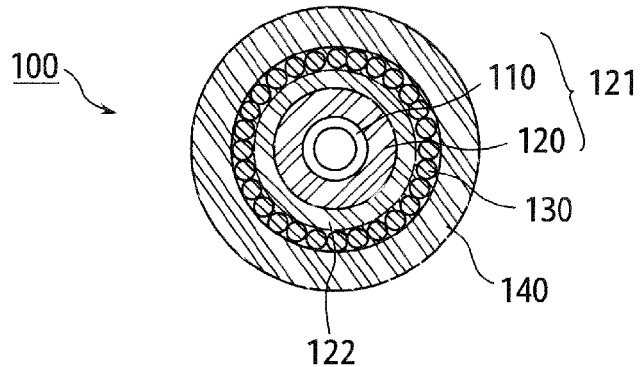
FIG. 7 A cross-sectional view showing the electro-optical composite cable of FIG. 6.

As illustrated in FIGS. 6 and 7, the electro-optical composite cable 100 comprises an optical fiber strand 121 composed of an optical fiber 110 and a protection cover covering the optical fiber 110, a metal conductor 130 positioned on an outer circumference of the optical fiber strand 121 and constituting a pipe-shaped outer conductor by disposing a plurality of metal wires without gaps therebetween, and an outer jacket 140 covering them. The outer jacket 140 of the present embodiment is made of polyvinyl chloride. In addition, as illustrated in FIG. 6, the electro-optical composite cable 100 further comprises a tensile-strength fiber 122 provided between the optical fiber strand 121 and the metal conductor 130.

On the other hand, as illustrated in FIG. 4, the ferrule 2200a comprises a main body portion 210 and a wiring portion 211 positioned at a back of the main body portion 210. The main body portion 210 is inserted with the optical fiber strand 121 and holds the inserted optical fiber strand 121 in a center part. On the other hand, wiring portion 211 functions as a portion to be wired with the electro-optical composite cable 100 (especially, metal conductor 130). In detail, a holding hole is formed at a back end of the ferrule 2200a (i.e. back end of wiring portion 211) and the main body portion 210, wherein the holding hole has an inner diameter substantially equal to an outer diameter of the optical fiber strand 121. Moreover, the main body portion 210 is formed with a communication hole which communicates the holding hole with a front end of the ferrule 2200a (i.e. front end of the main body portion 210), wherein the communication hole has a diameter substantially equal to that of the optical fiber 110. The communication hole is provided on a center part of the main body portion 210 in a diameter direction.

As illustrated in FIG. 4, the wiring portion 211 of the ferrule 2200a comprises a tubular portion 212 extending toward the back end and a ring-like recess 232 receiving the sleeve 240. The tubular portion 212 of the present embodiment has an inner diameter substantially equal to the outer diameter of the optical fiber strand 121 has a thickness and substantially equal to a thickness of the outer jacket 140 of the electro-optical composite cable 100. The ring-like recess 232 has an L-like shape in cross-section. The L-like shape extends toward the back end of the ferrule 2200a, wherein the L-like shape specifically projects outward from the tubular portion 212 in the diameter direction and in parallel with the tubular portion 212. The maximum inner diameter of the ring-like recess 232 of the present embodiment is substantially equal to the outer diameter of the sleeve 240.

In the present embodiment, a connection is carried out between the electro-optical composite cable 100 and the ferrule 2200a with the sleeve 240 as illustrated in FIG. 5.

As illustrated in FIG. 5(a), the outer jacket 140 of the electro-optical composite cable 100 is removed so that the metal conductor 130 is bared (exposed). Moreover, an unnecessary metal conductor 130 is removed so that the optical fiber strand is bared (exposed). In addition, the protection cover 120 is removed in the front end of the optical fiber strand 121 so that the optical fiber 110 is bared (exposed). The electro-optical composite cable 100 is inserted into the sleeve 240. In other words, the sleeve 240 is positioned at a back of the bared metal conductor 130 and on the outer jacket 140. The metal conductor 130 is once folded up and then returned back for the next step so that the metal conductor 130 is slightly apart from the optical fiber strand 121. As understood from FIG. 6, in the present embodiment, a length of an exposed portion (bared portion) of the metal conductor 130 is substantially equal to a length of the tubular portion in an axis direction.

Next, adhesive agent is applied on an outer circumference of the protection cover 120 (outer circumference of the optical fiber strand 121), and the optical fiber strand 121 is inserted into the ferrule 2200a as illustrated in FIG. 5(b). With these steps, the electro-optical composite cable 100 (optical fiber strand 121) is adhered to the ferrule 2200a. In this step, the metal conductor 130 is arranged on an outer circumference of the tubular portion 212.

Next, the sleeve is slid toward the front end of the ferrule 2200a so that a front end of the sleeve 240 is brought into contact with the ring-like recess 232. With this step, the sleeve 240 is electrically connected with the ferrule 2200a. In the sleeve 240, the tubular portion 212 having a thickness substantially equal to that of outer jacket 140 is inserted inside of the bared metal conductor 130. Therefore, the size difference between the outer circumference of the metal conductor 130 and the outer circumference of the outer jacket 140 is adjusted. In other words, the tubular portion 212 functions as the adjuster portion.

The sleeve 240 is crimped in a state where the adjuster portion adjusts the size difference so as to carry out the connection between the metal conductor 130 and ferrule 2200a. As is clear from the case above, the sleeve 240 of the present embodiment functions as a crimped portion. After the sleeve 240 is crimped, the adhesive agent is dried by heating. In a final step, the optical fiber 110 is polished. The connection between the electro-optical composite cable 100 and the ferrule 2200a is completed.

As described above, in the sleeve 240 of the crimped portion, the size difference does not exist between the outer circumference of the metal conductor 130 and the outer circumference of the outer jacket 140 because of a presence of the tubular portion 212. Therefore, there is no undesired clearance inside the sleeve 240. The crimped portion has a simple shape so that a crimped sleeve has also a simple shape. Therefore, high connection strength can be obtained.

Figure 8:
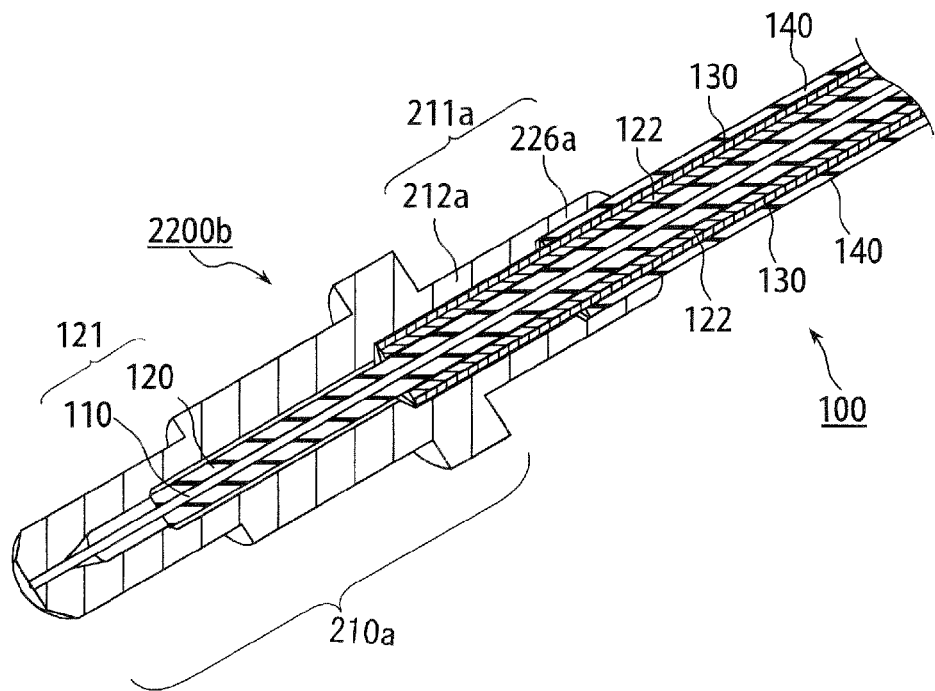
FIG. 8 A cross-sectional view showing a wiring structure between an electro-optical composite cable and a ferrule according to a second wiring structure of the present invention.
Figure 9:
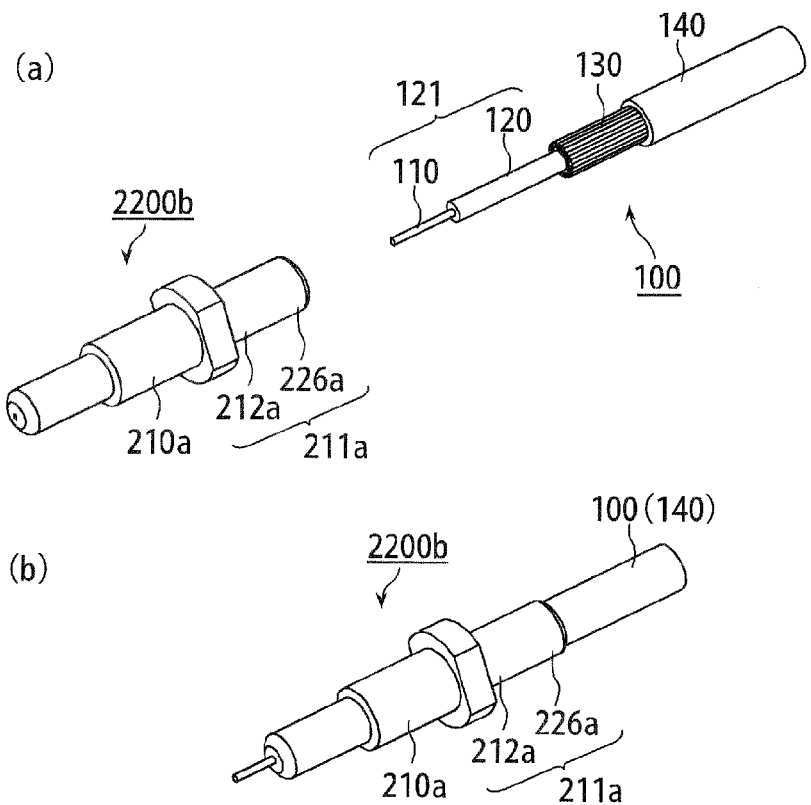
FIG. 9 An oblique view showing procedures of making the wiring structure of FIG. 8.

As a second wiring structure, a wiring structure as illustrated in FIG. 8 and FIG. 9 will be explained. Upon explaining the present, the same reference numerals are given to the components similar to the above-described first structure and, therefore, the description of those components will be omitted.

The second wiring structure is different from the first wiring structure in that the second wiring structure does not have the sleeve. However, as described below, the second wiring structure comprises a part which functions as the crimped portion and the adjuster portion. In this point, the second wiring structure is similar to the first wiring structure.

As illustrated in FIG. 8, the ferrule 2200b comprises a main body portion 210a and a wiring portion 211a. The main body portion 210a comprises a structure similar to the main body portion 210 (see FIG. 4) of the first wiring structure. The wiring portion 211a comprises a first tubular portion 212a extending backward from the main body portion 210a and a second tubular portion 226a further extending backward from the first tubular portion 212a.

The first tubular portion 212a has a first inner radius corresponding to a length between the center part of the electro-optical composite cable 100 and an outer circumference of the metal conductor 130. The second tubular portion 226a has a second inner radius corresponding to a length between the center part of the electro-optical composite cable 100 and an outer circumference of the outer jacket 140 (outer radius of the outer jacket 140). Outer radiuses of the first tubular portion 212a and the second tubular portion 226a are equal to each other. Therefore, an exterior of the wiring portion 211a has a tubular shape which has no size difference while an interior of the wiring portion 211a has the size difference between the first tubular portion 212a and the second tubular portion 226a. As is clear from a difference between the first inner radius and the second inner radius, a size of the size difference between the first tubular portion 212a and the second tubular portion 226a of the present wiring structure is substantially equal to a thickness of the outer jacket 140.

In the present wiring structure, the connection between the above-described ferrule 2200b and the electro-optical composite cable 100 is carried out as illustrated in FIG. 9.

Similarly to a first wiring method, the outer jacket 140 of the electro-optical composite cable 100 is removed so that the metal conductor 130 is bared. Next, an unnecessary metal conductor 130 is removed so that the optical fiber strand 121 is bared. In addition, the protection cover 120 is removed in the front end of the optical fiber strand 121 so that optical fiber 110 is bared (see FIG. 9(a)).

Next, the adhesive agent is applied on an outer circumference of the protection cover 120 (an outer circumference of the optical fiber strand 121) and the optical fiber strand 121 is inserted into the ferrule 2200b as illustrated in FIG. 9(b) so that the electro-optical composite cable 100 (optical fiber strand 121) is adhered to the ferrule 2200a. Here in, a size of the front end surface of the metal conductor 130 corresponds to a size of the back end surface of the first tubular portion 212a. Therefore, there is no undesired clearance in the wiring portion 211a. Then, after, the wiring portion 211a is crimped to connect the metal conductor 130 and the wiring portion 211a (ferrule 2200b), the adhesive agent is dried by heating. In the final step, the optical fiber 110 is polished. Thus, the connection of the electro-optical composite cable 100 and the ferrule 2200a is completed.

As is understood from the above explanation, the wiring portion 211a of the present wiring structure is constituted by integrally forming the crimped portion and the adjuster portion. Specifically, the wiring portion 211a may be divided to the first tubular portion 212a and the second tubular portion 226a in the axis direction while the wiring portion 211a may be divided to the adjuster portion and the crimped portion, in this order from inside, in a radius direction. In other words, the first tubular portion 212a has functions of the adjuster portion and the crimped portion while the second tubular portion 226a has only the function of the crimped portion. A shape of the crimped wiring portion 211a may be made simple because the wiring portion 211a having the above structure enables to eliminate the undesired clearance in the wiring portion 211a. Therefore, high connection strength can be obtained.

As a third wiring structure, the wiring structure illustrated in FIG. 10 and FIG. 11 will be explained. Upon explaining the present, the same reference numerals are given to the components similar to the above-described first structure and, therefore, the description of those components will be omitted.

Figure 10:
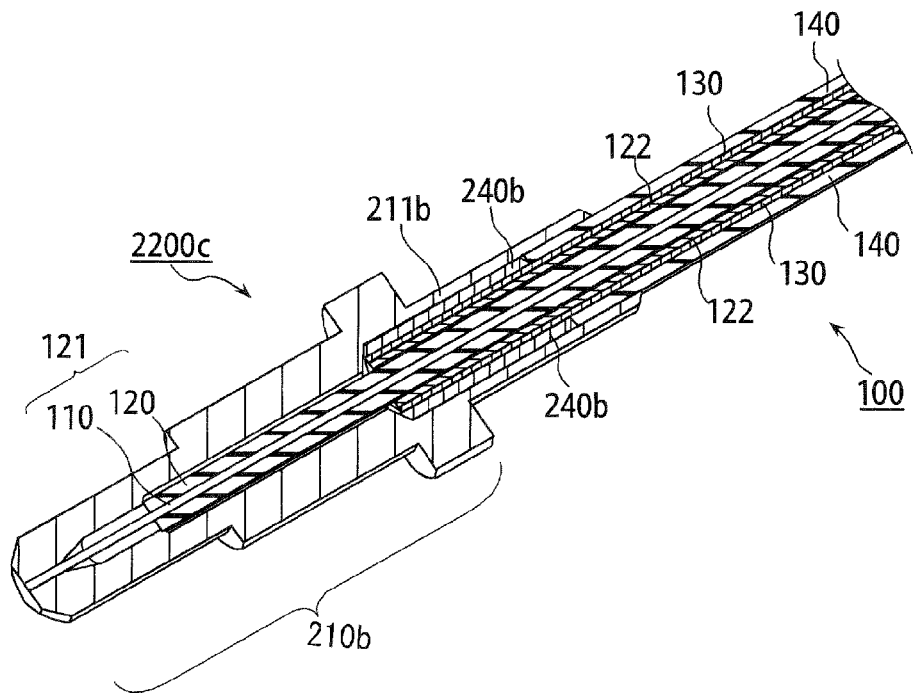
FIG. 10 A cross-sectional view showing a wiring structure between an electro-optical composite cable and a ferrule according to a third wiring method of the present invention.

As illustrated in FIG. 10, a ferrule 2200c comprises a main body portion 210b and a wiring portion 211b. The main body portion 210b comprises a structure similar to the main body portion 210 (see FIG. 4) of the first wiring structure. The wiring portion 211b has a tubular shape extending backward and has an inner diameter substantially the same as the outer diameter of the outer jacket 140 of the electro-optical composite cable 100.

In addition, as illustrated in FIG. 10, the present wiring structure comprises a sleeve 240b. An inner diameter of the sleeve 240b is substantially equal to a predetermined diameter (which is defined as an outer diameter of the metal conductor 130) wherein the predetermined diameter is twice the radius corresponding to a length between the center part of the electro-optical composite cable 100 and the outer circumference of the metal conductor 130. An outer diameter of the sleeve 240*b* is substantially equal to the outer diameter of the outer jacket 140. In other words, a thickness of the sleeve 240*b* is substantially equal to a thickness of the outer jacket 140.

Figure 11:
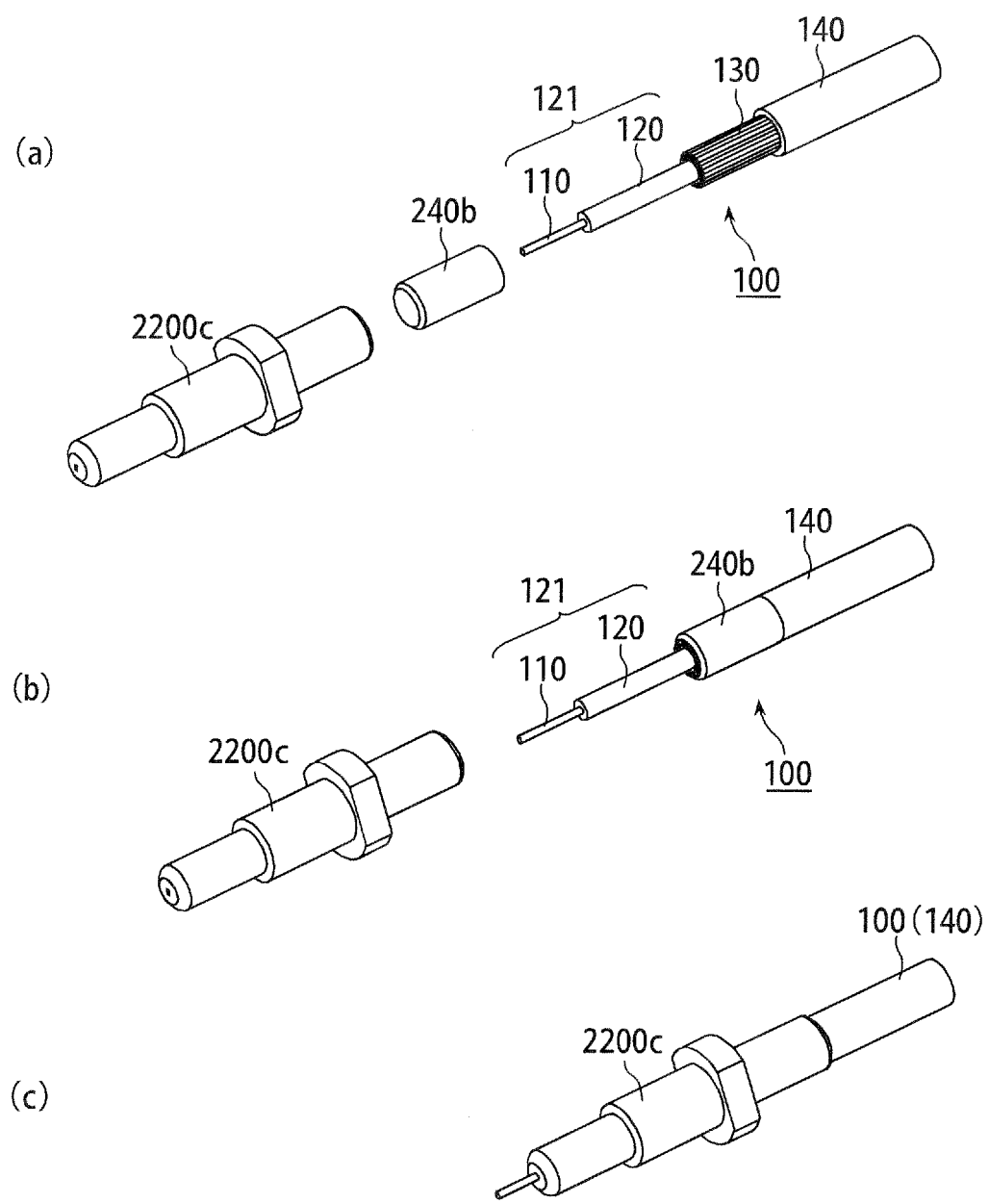
FIG. 11 An oblique view showing procedures of making the wiring structure of FIG. 10.

In the present embodiment, the above-described ferrule 2200*c* and the sleeve 240*b* are connected with the electro-optical composite cable 100 as illustrated in FIG. 11.

Similarly to the first wiring structure, the outer jacket 140 of the electro-optical composite cable 100 is removed so that the metal conductor 130 is bared. Next, the unnecessary metal conductor 130 is removed so that the optical fiber strand 121 is bared. In addition, the protection cover 120 is removed in the front end of the optical fiber strand 121 so that optical fiber 110 is bared (see FIG. 11(*a*)). As understood from FIG. 10, a length of an exposed portion (a bared portion) is substantially equal to a length of the sleeve 240*b* in the axis direction.

Next, as illustrated in FIG. 11(*b*), the sleeve 240*b* is inserted with the electro-optical composite cable 100. The metal conductor 130 is covered with the sleeve 240*b* so that a size difference between the metal conductor 130 and the outer jacket 140 is adjusted. In other words, in the present embodiment, the sleeve 240*b* functions as the adjuster portion which adjusts the size difference between metal conductor 130 and the outer jacket 140.

Afterwards, the adhesive agent is applied on an outer circumference of the protection cover 120 (an outer circumference of the optical fiber strand 121), and the optical fiber strand 121 is inserted into the ferrule 2200*c* as illustrated in FIG. 11(*c*). Thus, the electro-optical composite cable 100 (the optical fiber strand 121) is adhered to the ferrule 2200*c*. Then after, the wiring portion 211*b* is crimped to connect the metal conductor 130 and the wiring portion 211*b* (the ferrule 2200*c*), the adhesive agent is dried by heating. In the final step, the optical fiber 110 is polished. Thus the connection between the electro-optical composite cable 100 and the ferrule 2200*c* is completed. As is understood from the above, the wiring portion 211*b* of the present embodiment functions as the crimped portion.

As described above, in the wiring portion 211*b* which functions as the crimped portion, by presence of the sleeve 240*b*, the size difference between the metal conductor 130 and the outer jacket 140 is adjusted so that there is no undesired clearance or the like in the wiring portion 211*b*. A shape of the crimped wiring portion 211*b* may be made simple so that high connection strength can be obtained.

As a fourth wiring structure, the wiring structure illustrated in FIG. 12 and FIG. 13 will be explained. Upon explaining the present, the same reference numerals are given to the components similar to the above-described first structure and, therefore, the description of those components will be omitted.

Figure 12:
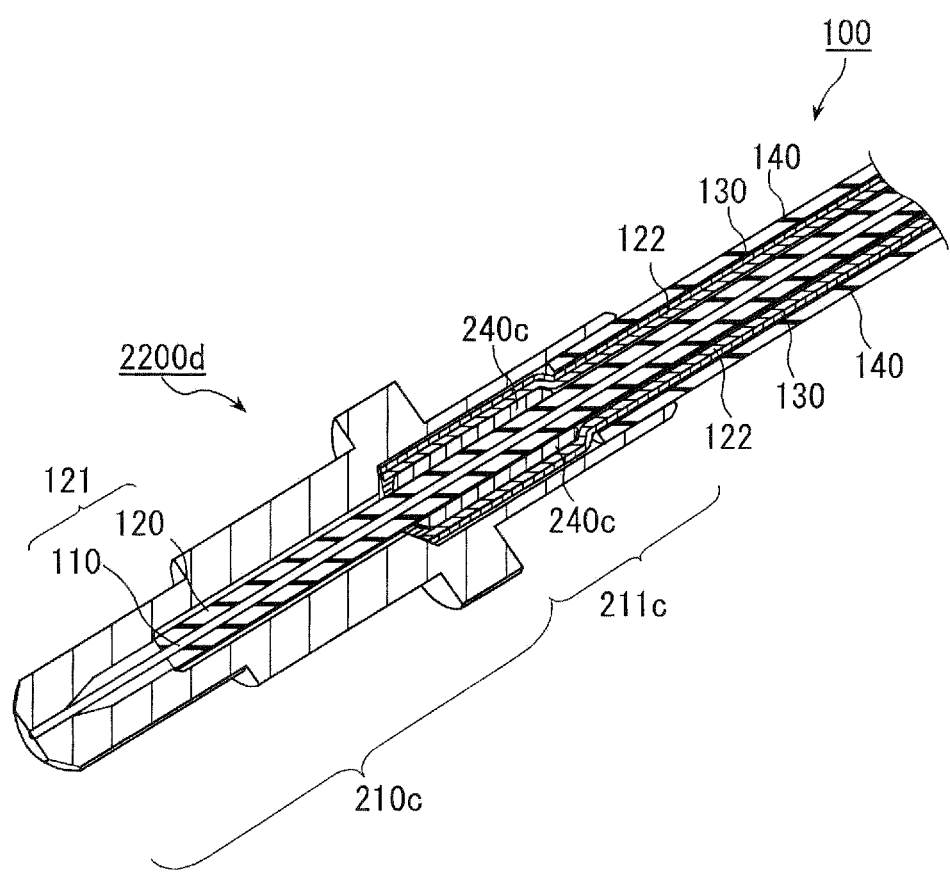
FIG. 12 A cross-sectional view showing a wiring structure between an electro-optical composite cable and a ferrule according to a fourth wiring method of the present invention.

As illustrated in FIG. 12, the ferrule 2200*d* comprises a main body portion 210*c* and a wiring portion 211*c*. The main body portion 210*c* comprises a structure similar to the main body portion 210 (see FIG. 4) according to the first wiring structure. The wiring portion 211*c* according to the present wiring structure has a tubular shape extending backward and is similar to the above-described wiring portion 211*b* according to the third wiring structure. An inner diameter of the wiring portion 211*c* is substantially equal to the outer diameter of the outer jacket 140 of the electro-optical composite cable 100.

In addition, as illustrated in FIG. 12, the present wiring structure comprises a sleeve 240*c*. An inner diameter of the sleeve 240*c* is substantially equal to an outer diameter of the optical fiber strand 121. A thickness of the sleeve 240*c* is substantially equal to a thickness of the outer jacket 140.

Figure 13:
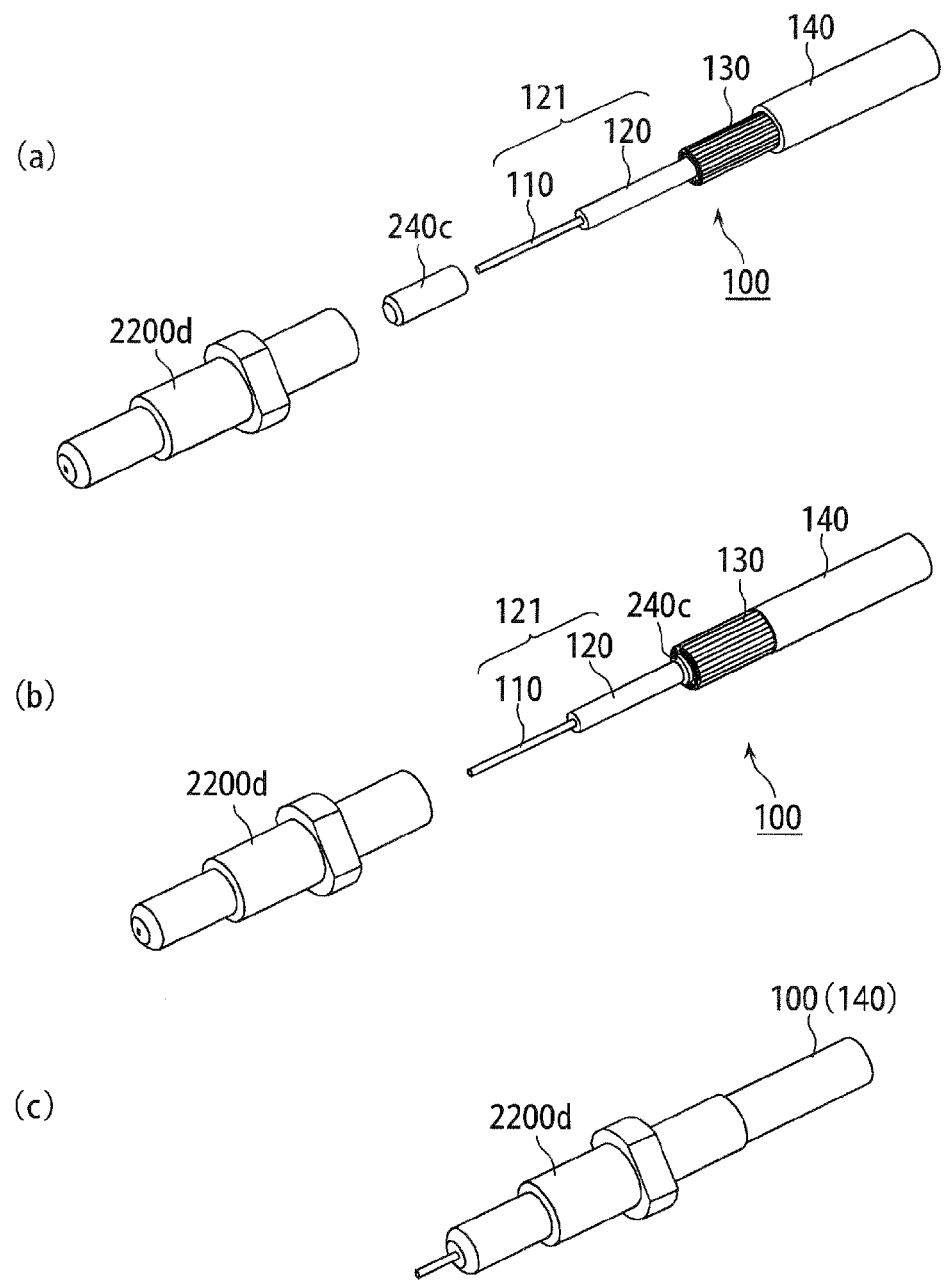
FIG. 13 An oblique view showing procedures of making the wiring structure of FIG. 12.

In the present wiring structure, the above-described ferrule 2200*d* and the sleeve 240*c* are connected with the electro-optical composite cable 100 as illustrated in FIG. 13.

Similarly to the first wiring structure, the outer jacket 140 of the electro-optical composite cable 100 is removed so that the metal conductor 130 is bared. Next, the unnecessary metal conductor 130 is removed so that the optical fiber strand 121 is bared. In addition, the protection cover 120 is removed in the front end of the optical fiber strand 121 so that optical fiber 110 is bared (see FIG. 13(*a*)). As is understood from FIG. 13, a length of an exposed portion (a bared portion) is substantially equal to a length of the sleeve 240*c* in the axis direction.

Next, as illustrated in FIG. 13(*b*), the sleeve 240*b* is inserted with the electro-optical composite cable 100 so that a size difference between the metal conductor 130 and the outer jacket 140 is adjusted. In other words, even if a size of the sleeve 240*c* according to the present wiring structure is different from a size of the sleeve 240*b* according to the third wiring structure (see FIG. 10), similarly to the third wiring structure, the sleeve 240*c* functions as the adjuster portion which adjusts the size difference between the metal conductor 130 and the outer jacket 140.

Next, adhesive agent is applied on an outer circumference of the protection cover 120 (an outer circumference of the optical fiber strand 121), and the optical fiber strand 121 is inserted into the ferrule 2200*d* as illustrated in FIG. 13(*c*) so that the electro-optical composite cable 100 (the optical fiber strand 121) is adhered to the ferrule 2200*d*. Then, after the wiring portion 211*c* is crimped to connect the metal conductor 130 with the wiring portion 211*c* (ferrule 2200*d*), the adhesive agent is dried by heating. In the final step, the optical fiber 110 is polished. Thus the connection between the electro-optical composite cable 100 and the ferrule 2200*d* is completed. As is understood from the above, the wiring portion 211*c* of the present embodiment functions as the crimped portion.

As described above, in the wiring portion 211*c* of the crimped portion, by the presence of the sleeve 240*c*, the size difference between the metal conductor 130 and the outer jacket 140 is adjusted so that there is no undesired clearance in the wiring portion 211*c*. A shape of the crimped wiring portion 211*c* may be made simple so that high connection strength can be obtained.

The concrete explanation has been made about the first to the fourth wiring structures as a wiring structure used in the embodiments according to the present invention. However, the present invention is not limited thereto. For example, in the first wiring structure or the fourth wiring structure, under the condition such that the metal conductor is deformed (a thickness of the electro-optical composite cable is decreased in the diameter direction) by inserting the tubular portion or the sleeve to the inside of the metal conductor, a thickness of the tubular portion or the sleeve may be slightly thicker than a thickness of the outer jacket in consideration of the decrease of the thickness. The wiring structure between the electro-optical composite cable and the ferrule relating to the present invention and the wiring method connecting the electro-optical composite cable with the ferrule may be applied to all electro-optical composite cable which uses a ferrule.

By employing the above-described configuration for the connection, an electro-optical composite connector can be constituted to have a size same as a conventional connector for an optical fiber cable. In other words, when the connector of the present embodiment is employed, the electric wiring may also be laid out within a space which was used for an optical wiring in an apparatus. Therefore, the apparatus may have a space-saving configuration.

With reference to FIGS. 1 to 3, FIG. 14 and FIG. 15, returning to the explanation of the optical connector according to the first embodiment, the first electro-optical composite cable 100 and the first ferrule 220 (or the second electro-optical composite cable 100' and the second ferrule 220') of the first embodiment is wired by the above-described first wiring structure.

As illustrate in FIG. 2, the first connector 200 comprises a first connector housing 202 made of insulative material, a first ferrule 220, a first sleeve (a first crimped portion 240), a first bias member 206 and a first cable stopper 207 made of insulative material. As illustrated in FIG. 1, the first connector housing 202 has a lock portion 204 (will be described later) to be locked with the adaptor 500 and a lock release member 205 for operating the lock portion 204.

The entire surface of the first ferrule 220 is made of conductive materials (hereafter, the ferrule of this type is called "a metal type"). In detail, a base material of the first ferrule 220 is made of copper, and nickel-plate and gold-plate are applied thereon. The first ferrule 220 may be made of other member. However, at least a surface is required to have conductivity in order to make an electrical connection with the first conductor 130. For example, the ferrule may be constituted by forming the base member with resin, followed by plating the surface with metal. However, in the present embodiment, as mentioned above, a crimping process is used for a connection with the electro-optical composite cable 100 (see FIG. 5). It is therefore preferable that the base member of the first ferrule 220 is made of copper (metal).

Figure 15:
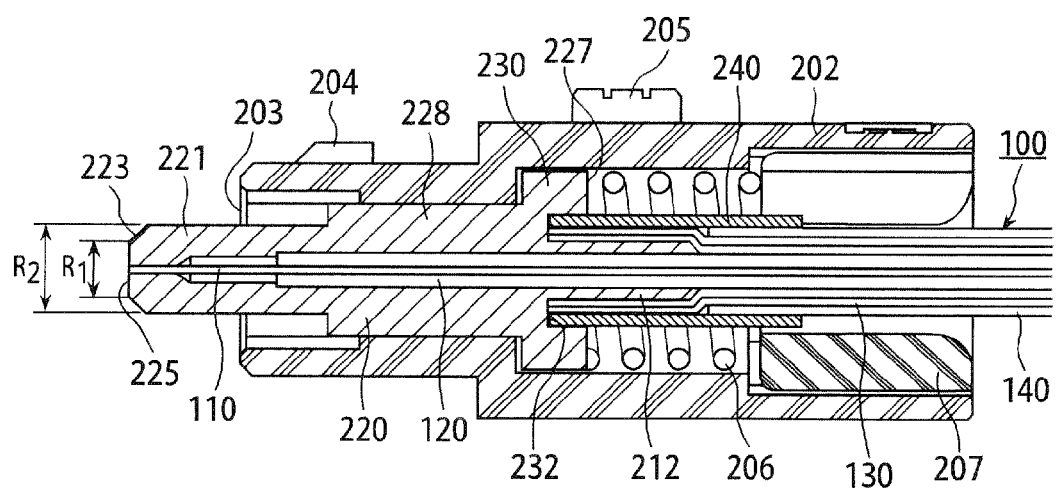
FIG. 15 A cross-sectional view showing only the connector (the first connector) included in the optical connector apparatus of FIG. 3.

As illustrated in FIG. 15, the first ferrule 220 comprises a connected portion 221 including an end surface 225 of the first ferrule 220 and being connected with and held by a connection portion 520 of the adaptor 500 (mentioned later), a large diameter portion 228 having a diameter larger than the connected portion 221, a shoulder portion 230 having a diameter larger than the large diameter portion 228, and a tubular portion (a first adjuster portion) 212 extending backward from the shoulder portion 230. The first ferrule 220 is held by the first connector housing 202 so that the connected portion 221 projects forward from a front end surface 203 of the first connector housing 202 and is movable in a front-back direction. Concretely, the large diameter portion 228 of the first ferrule 220 is slidably supported by the shoulder portion 230. The shoulder portion 230 defines a limit of movement in frontward. The front end of the first ferrule 220 is bevel-processed (chamfer-processed) and a bevel portion 223 is formed. A diameter $R_1$ of the end surface 225 of the first ferrule 220 is smaller than an outer diameter $R_2$ of the connected portion 221. A thickness of the tubular portion 212 is substantially equal to a thickness of the first outer jacket 140 of the first electro-optical composite cable 100.

Figure 14:
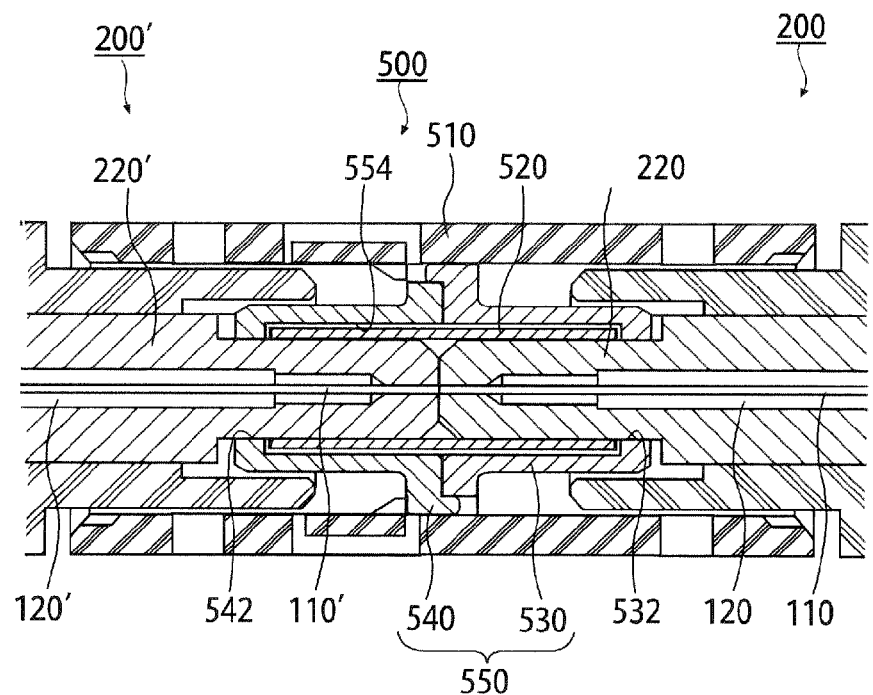
FIG. 14 An enlarged cross-sectional view of the optical connector apparatus of FIG. 3 showing a connection member and its vicinity wherein the connection member is included in an adaptor.

In the present embodiment, the electro-optical composite cable 100 is also inserted into the first bias member 206 composed of a coil spring when the first electro-optical composite cable 100 is connected with the first ferrule 220 as described above. In this state, these components are inserted into through the back and into the first connector housing 202. After that, the first cable stopper 207 is fitted into the back of the first connector housing 202 so that the first bias member (coil spring) 206 is compressed and accommodated between a pushed surface 227 of the first ferrule 220 and the first cable stopper 207. Thus, the first bias member 206 always forwardly biases the pushed surface 227 of the first ferrule 220. In other words, the first bias member 206 always biases the first ferrule 220 of the first connector 200 toward the second ferrule 220' of the second connector 200' (mentioned later) as illustrated in FIG. 14. In the present embodiment, the first bias member 206 or the first cable stopper 207 does not contribute to the electrical connection between the first metal conductor 130 and the first ferrule 220. For this reason, the first cable stopper may be made of insulative material as mentioned above and the first bias member may be made of an insulation member such as resin at a low cost.

As illustrated in FIG. 1 to FIG. 3, the second connector 200' comprises a second connector housing 202' made of insulative material, a second ferrule 220', a second sleeve (a second crimped portion) 240', a second bias member 206', and a second cable stopper 207' made of insulative material. Each component of the second connector 200' has the structure same as the respective component of the first connector 200. For example, similarly to the first connector housing 202, the second connector housing 202' has a lock portion 204' (mentioned later) and a lock release member 205' for operating the lock portion 204' as illustrated in FIG. 1. As illustrated in FIG. 3, the second ferrule 220' is provided with a second tubular portion 212'. The tubular portion 212' functions as a second adjuster portion which adjusts a size difference between the second metal conductor 130' and the second outer jacket 140' within the second sleeve 240' which functions as the second crimped portion.

As illustrated in FIG. 14, the adaptor 500 comprises an adaptor housing 510 made of insulative material, a connection member 520 made of conductive material, and an accommodation portion 550 composed of a first part 530 and second part 540 holding the connection member 520. As illustrated in FIG. 1, the adaptor housing 510 is formed with an lock hole 512 in which the lock portion 204 of the first connector 200 is to be locked and an lock hole 512' in which the lock portion 204' of the second connector 200'.

As illustrated in FIG. 3 and FIG. 14, the connection member 520 holds the first ferrule 220 and the second ferrule 220' and makes the electrical connection between the first ferrule 220 and the second ferrule 220'. The illustrated connection member 520 has a shape of a so-called split sleeve which is made by forming a slit on the cylindrical tube in parallel with an axis. In the present embodiment, in order to ensure the electrical connection between the first ferrule 220 and the second ferrule 220', an inner diameter of the connection member 520 in an unconnected state is smaller than the outer diameter $R_2$ (see FIG. 15) of either the connected portion 221 of the first ferrule 220 or a connected portion (a portion similar to the connected portion 221 of the first ferrule 220) of the second ferrule 220', wherein the unconnected state is a state where the first ferrule 220 and the second ferrule 220' are not inserted (i.e. not connected) into the connection member 520. Thus, when the first ferrule 220 and the second ferrule 220' are inserted into the connection member 520, the inner diameter of the connection member 250 is widened. As the counter action, the connection member 520 grips the connected portion 221 of the first ferrule 220 and the connected portion of the second ferrule 220' from outside. By using not a mere connection member but the connection member 520, the electrical connection is positively made between the first ferrule 220 and the second ferrule 220'. Upon connecting the first electro-optical composite cable 100 and the second electro-optical composite cable 100' with the first ferrule 220 and the second ferrule 220', the electrical connection may be made between the first ferrule 220 and the second ferrule 220' even when a good electrical connection is not ensured between the front end portions of the first ferrule 220 and the second ferrule 220' because the front end portions of the first ferrule 220 and the second ferrule 220' are polished. Furthermore, the inner diameter of the connection member 520 of the present invention is larger than the diameter $R_1$ (see FIG. 15) of the front end surfaces of the first ferrule 220 and the second ferrule 220. Therefore, when the first ferrule 220 and the second ferrule 220' are inserted into the connection portion 520, the bevel portion 223 of the first ferrule 220 and a bevel portion (a portion similar to the bevel portion 223 of the first ferrule 220) of the second ferrule 220 widen the inner diameter of the connection member 520. Thus the first ferrule 220 and the second ferrule 220' are smoothly inserted into the connection member 520. In the present embodiment, the connection member 520 is made of the conductive material. Instead, for example the resinous connection member having a metal-plated surface may be used. However, in consideration of strength and other conditions, the connection member 520 itself is preferred to be made of the conductive material as described in the present embodiment.

As illustrated in FIG. 3 and FIG. 14, the accommodation portion 550 is composed of two parts which are the first part 530 and the second part 540 and holds the connection member 520 so that the inner diameter of the connection portion 520 is variable. In detail, as illustrated in FIG. 14, the accommodation portion 550 has an accommodation portion 552 accommodating the connection member 520, and a first insertion opening 532 and a second insertion opening 542 communicating with an accommodation space 554. The accommodation space 554 has a space larger than the outer diameter of the connection member 520 in a state where the connected portion of the first ferrule 220 or the connected portion 221 of the second ferrule 220' is inserted into the connection member 520. The inner diameter of the connection member 520 is variable when the connected portion 221 of the first ferrule 220 or the connected portion of the second ferrule 220' is connected with the connection member 520. The first insertion opening 532 and the second insertion opening 542 are inserted with the connected portion 221 of the first ferrule 220 and the connected portion of the second ferrule 220', respectively. The inner diameters of the first opening 532 and the second opening 542 are larger than the inner diameter of the connection portion 520 in a normal state but smaller than the outer diameter of the connection portion 520 in the normal state. Therefore, the connection member 520 will not fall away from the accommodation portion 550 after the accommodation portion 550 is made up by combining the first part 530 and the second part 540. In the present embodiment, the accommodation portion 550 is made up by combining the first part 530 and the second part 540 so as to arrange the connection member 520 therein. Then the adaptor 500 is formed by holding and fixing the accommodation portion 550 in the adaptor housing 510.

As described above, according to the optical connector of the present embodiment, the conductive connection member 520 grips the first ferrule 220 and the second ferrule 220'. Therefore, the electro-optical connection between the first ferrule 220 and the second ferrule 220' is ensured. In the present embodiment, explanation was made about a case that the front end of the first ferrule 220 and the front end of the second ferrule 220' are polished. However, needless to say, the present invention is appliable to a case that the good electrical connection is made between the front end of the first ferrule 220 and the front end of the second ferrule 220'.

Figure 16:
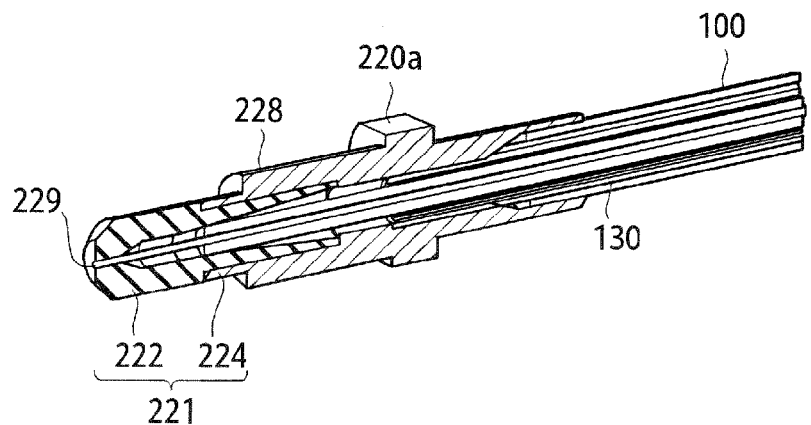
FIG. 16 A cross-sectional view showing a variation example of the ferrule (composite type).
Figure 17:
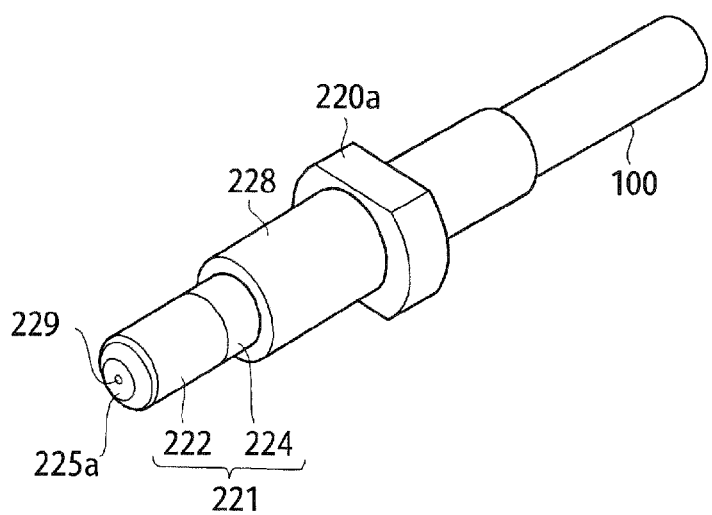
FIG. 17 An oblique view showing the ferrule of FIG. 16.

Furthermore, the first ferrule 220 and the second ferrule 220' has conductivity at least on the entire surface thereof. However, for example, an end portion including a front end surface 225a of a first ferrule 220a may be partially made of insulative material as illustrated in FIG. 16 and FIG. 17 so that unintentional occurrence of the short-circuit at the front end of the first ferrule 220a may be prevented (hereinafter, such ferrule is called a "composite type"). Similarly to the above-described first ferrule 220 (see FIG. 3), the illustrated first ferrule 220 comprises a connected portion 221 and a large diameter portion 228 which has a substantially tubular shape and has an outer diameter larger than the outer diameter of the connected portion 221. The connected portion 221 of the present embodiment is composed of a front portion 222 made of insulative material and a back portion 224 made of conductive material and integrally formed with the large diameter portion 228.

As is clearly shown in FIG. 16, the front portion 222 is provided with a hole 229 in a center for holding the optical fiber and also with a part at a back which has an outer diameter similar than that of the front part. The outer diameter of the front portion 222 is almost equal to an outer diameter of a back portion 224. The back portion 224 is formed of a base member made of copper and plated with nickel and gold. The back portion 224 and the large diameter portion 228 are electrically connected with the first metal conductor 130 of the first electro-optical composite cable 100. The first ferrule 220a of the present embodiment is connected with the first electro-optical composite cable 100 by the above-described second wiring structure (FIGS. 8 to 10). However, the use of the wiring structure is not limited thereto. The back portion 224 of the first ferrule 220a may be made of other material. However, at least the surface thereof is required to have conductivity in order to make the electrical connection with the first metal conductor 130. For example, the first ferrule 220a may be formed by preparing the base member made of resin and plating the surface with metal. In this case, the back portion 224 and the large diameter portion 228 are integrally formed with each other by resin. The respective surfaces are plated with metal. However, the base member of the first ferrule 220a is preferred to be made of copper (metal) because the present embodiment employs the crimping process for the connection with the first electro-optical composite cable 100.

The first ferrule 220a of the present embodiment is formed by combining a member (a front member) including the front portion 222 with a member (a back member) including the back portion 224 and the large diameter portion 228. In detail, as illustrated in FIG. 16, the back member has a cavity positioned inside the back member and is inserted with the front member. The first ferrule 220a is formed by inserting the front member into the cavity.

Figure 18:
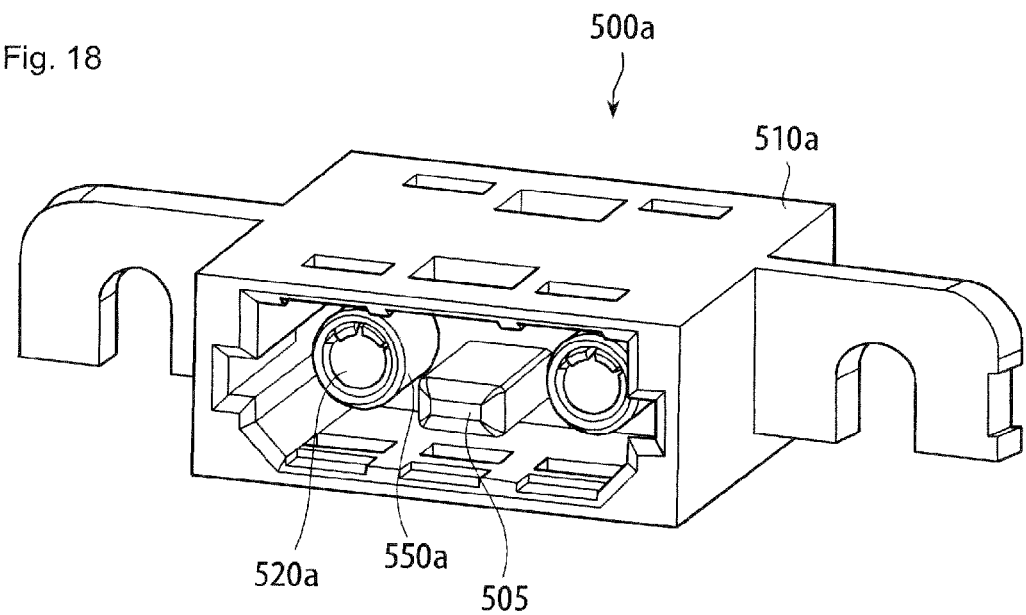
FIG. 18 A view showing a variation example of an adaptor used for the connector of FIG. 1.
Figure 19:
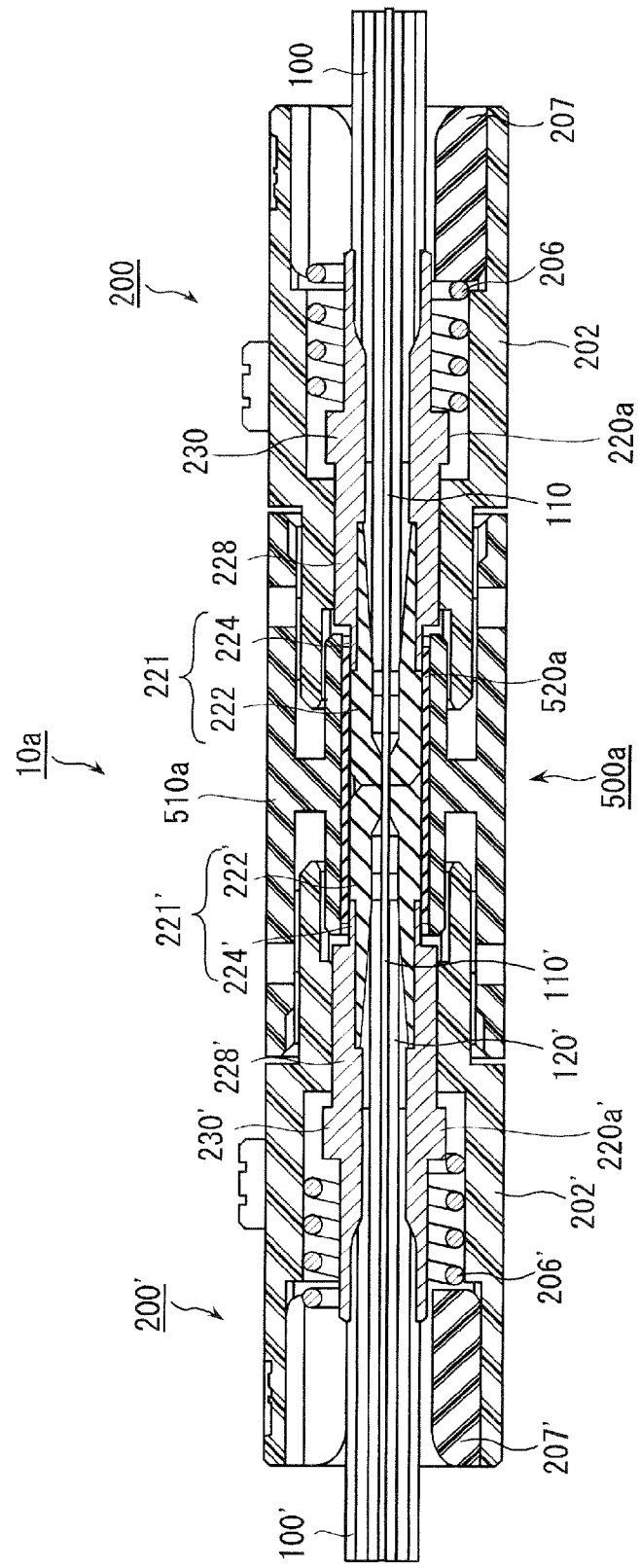
FIG. 19 A cross-sectional view showing an optical connector apparatus composing of the ferrules illustrated in FIG. 16 and FIG. 17, the adaptors illustrated in FIG. 18 and the connection member illustrated in FIG. 20. The illustrated optical connector apparatus is in the connection state.

When the first ferrule 220a is used, as a matter of course, the above-described adaptor 500 (see FIG. 3 and FIG. 14) is applicable to the optical connector apparatus. However, an adaptor 500a illustrated, for example, in FIG. 18 is more preferred to be applied. Similarly to the above-described adaptor 500, the adaptor 500a comprises an adaptor housing 510a made of insulative material and a connection member 520b made of conductive material and held by the adaptor housing 510a (the connection 520b will be mentioned later). As illustrated in FIG. 19, in an optical connector apparatus 10a of the present embodiment, the first connector 200 and the second connector 200' comprise ferrules same as the above-described ferrule 220a (see FIG. 16 and FIG. 17).

As illustrated in FIG. 18 and FIG. 19, the adaptor housing 510a comprises a projection 505 and an accommodation portion 550a having a substantially tubular shape and accommodating the connection member 520a. The accommodation portion 550a of the present embodiment is not formed with the first part 530 and the second part 540, like the above-described adaptor housing 510 (see FIG. 14), but is formed seamlessly and integrally with each other. The projection 505 prevents fingers or the like from being accidentally inserted in the adaptor housing 510a. A length of the projection 505 from an inner surface is longer than a length of the accommodation portion 550a.

Figure 20:
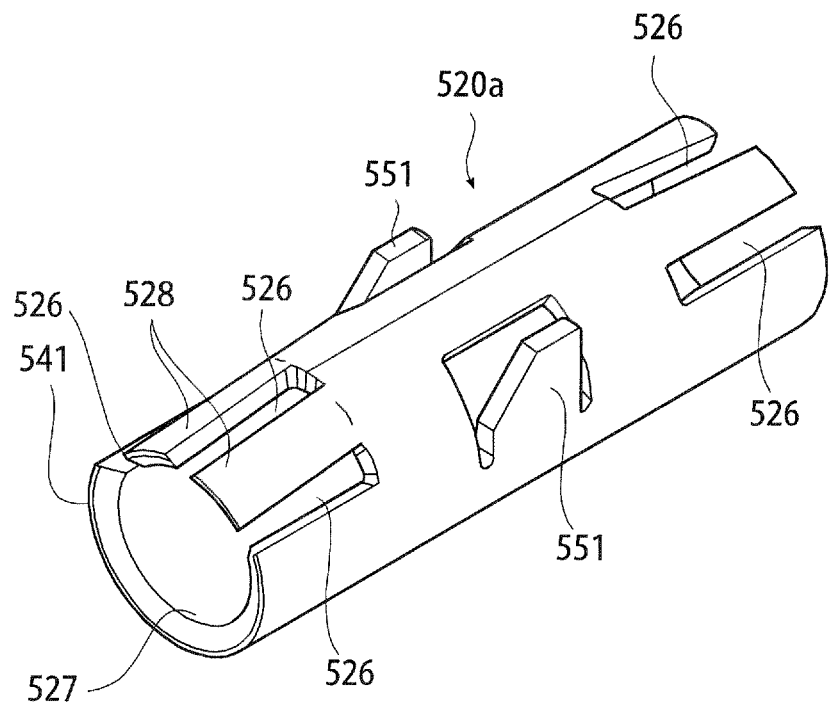
FIG. 20 A view showing a connection member (variation example 1) used for the optical connector apparatus of FIG. 19.

The connection member 520a illustrated in FIG. 20 is accommodated in the accommodation portion 550a. The connection member 520a comprises receiving portions 527 provided on both ends in a longitudinal direction, a press-fit portions 551, and two spring portions 528 formed by making three cuts 526 along the longitudinal direction into an edge portion 541 of each receiving portion 527. Each receiving portion 527 receives the connected portion 221 of the first ferrule 220a (or the connected portion 221 of the second ferrule 220a') along a predetermined direction (insertion and ejection direction). The connection member 520a is provided with the spring portions 528 having relatively low spring constant so that the connection member 520a is given a slight gripping force. With this structure, when the first ferrule 110a is inserted into the connection member 520a, the connection member 520a is flexibly deformed so that the diameter thereof increases. Therefore, it may be possible to deal with the first ferrule 220a or the connection member 520a which are different in size. Furthermore, the back portion 224 of the first ferrule 220a inserted into the connection member 520a is electrically connected with the connection member 520a through three portions, i.e. two spring portions 528 and the receiving portion 527 of the connection member 520a so that a connection reliability is improved.

Figure 24:
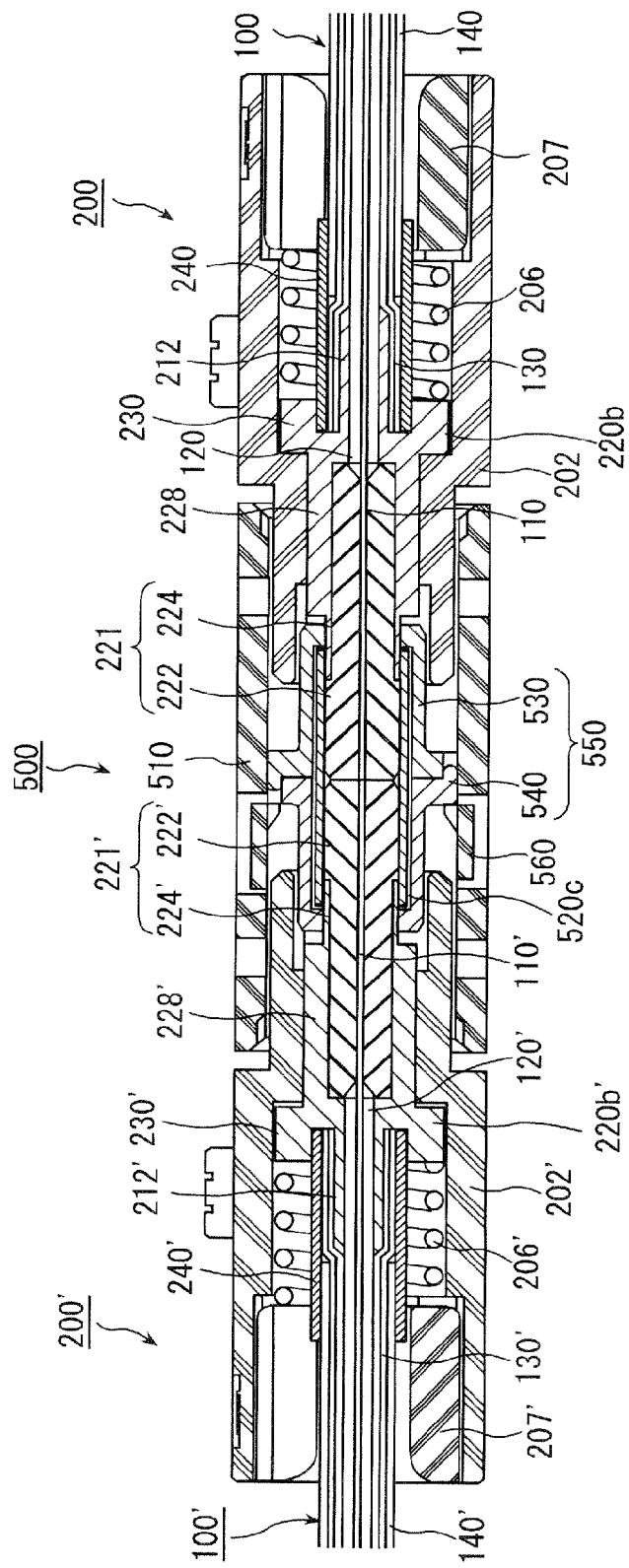
FIG. 24 A cross-sectional view showing the optical connector of FIG. 22, taken along lines XXIV-XXIV. The illustrated optical connector apparatus is in the connection state.
Figure 25:
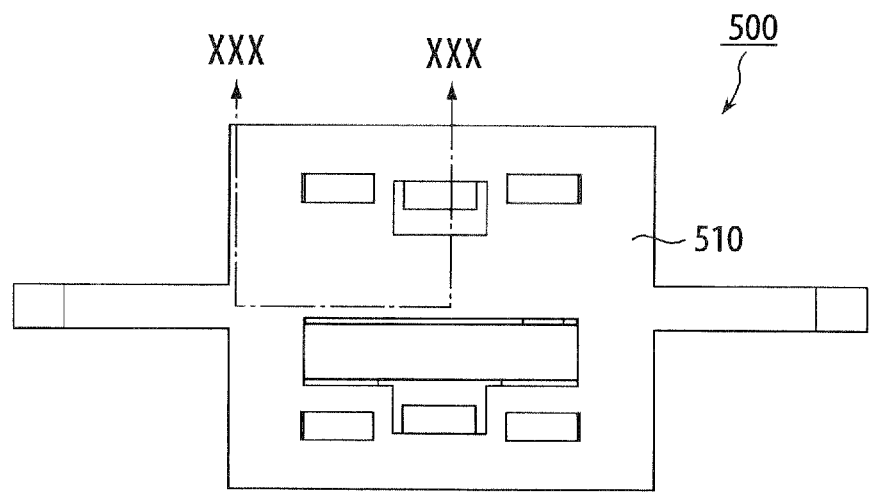
FIG. 25 A top view showing the connector of FIG. 22.
Figure 26:
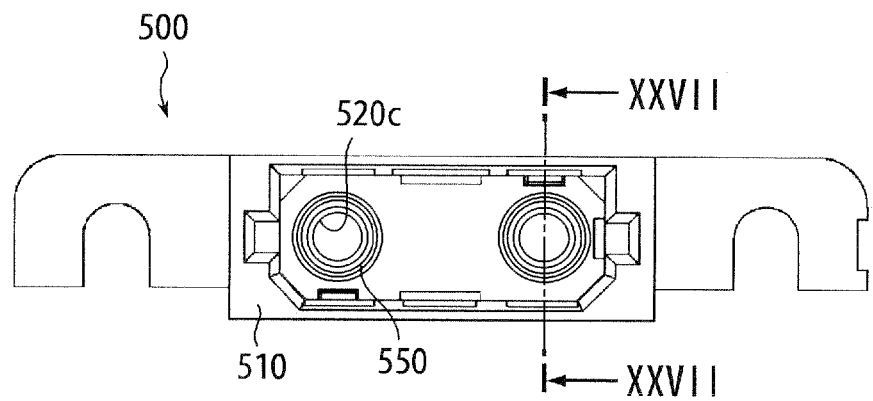
FIG. 26 A front view showing the connector of FIG. 22.

In the present embodiment, as illustrated in FIG. 18 to FIG. 20, the connection member 520a is press-fitted into the accommodation portion 550a of the adaptor housing 510a so that the press-fit portions 551 are locked to an inner wall of the accommodation portion 550a. Thus, the connection member 520a is accommodated in the accommodation portion 550a. After that, as illustrated in FIG. 24, the first connector 200a and the second connector 200a' are connected with the adaptor 500a.

Similarly to the above-described connection member 520, the connection member 520a may be held by the adaptor 500 (see FIG. 14). In this case, the connection member 520a is press-fitted into the first part 530 and the second part 540 of the adaptor 500 so that the press-fit portions 551 are locked an inner wall of the first part 530 and the second part 540. Thus, the connection member 520a is held.

Figure 21:
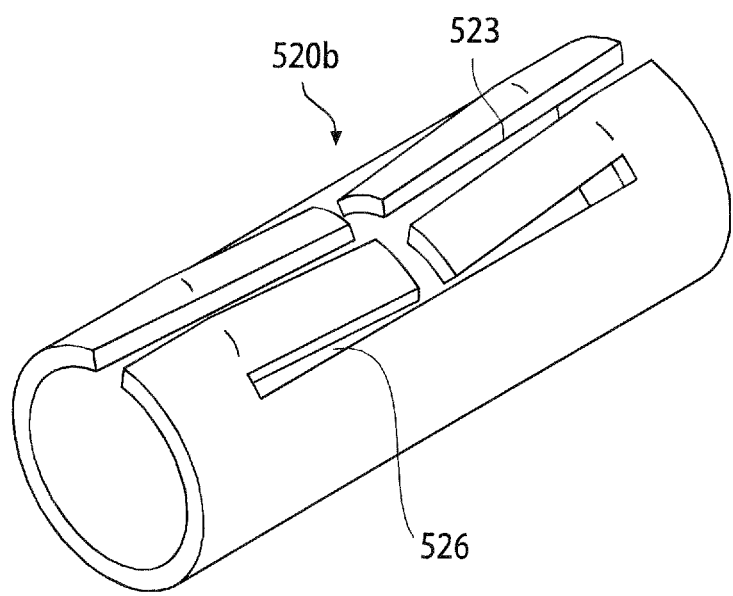
FIG. 21 A view showing another type of a connection member (variation example 2) to be used instead of the connection member of FIG. 1.

As the connection member, a connection member having a slit, a connection member having T-like wide recess in addition to the slit, or a connection member having an H-shaped cut (recess) 526 as illustrated in FIG. 21 may be used, wherein the H-shaped cut is perpendicular to a slit 523 defining a width of split of the connection member 520b. The connection member may have a holding function as a sub function and an electrical-connection function between the ferrules as a main function while axis alignment of the ferrules may be carried out by using other member which is specially provided.

An optical connector apparatus 10b illustrated in FIG. 22 to FIG. 30 is an example of the optical connector using other types of the connection member. In the illustrated optical connector apparatus 10b, components except for the first ferrule 220a and the connection member 520c are the same as those of the above-described optical connector 10 (see FIG. 1). The same reference numerals are given to the same components and therefore the description thereof will be omitted.

Figure 22:
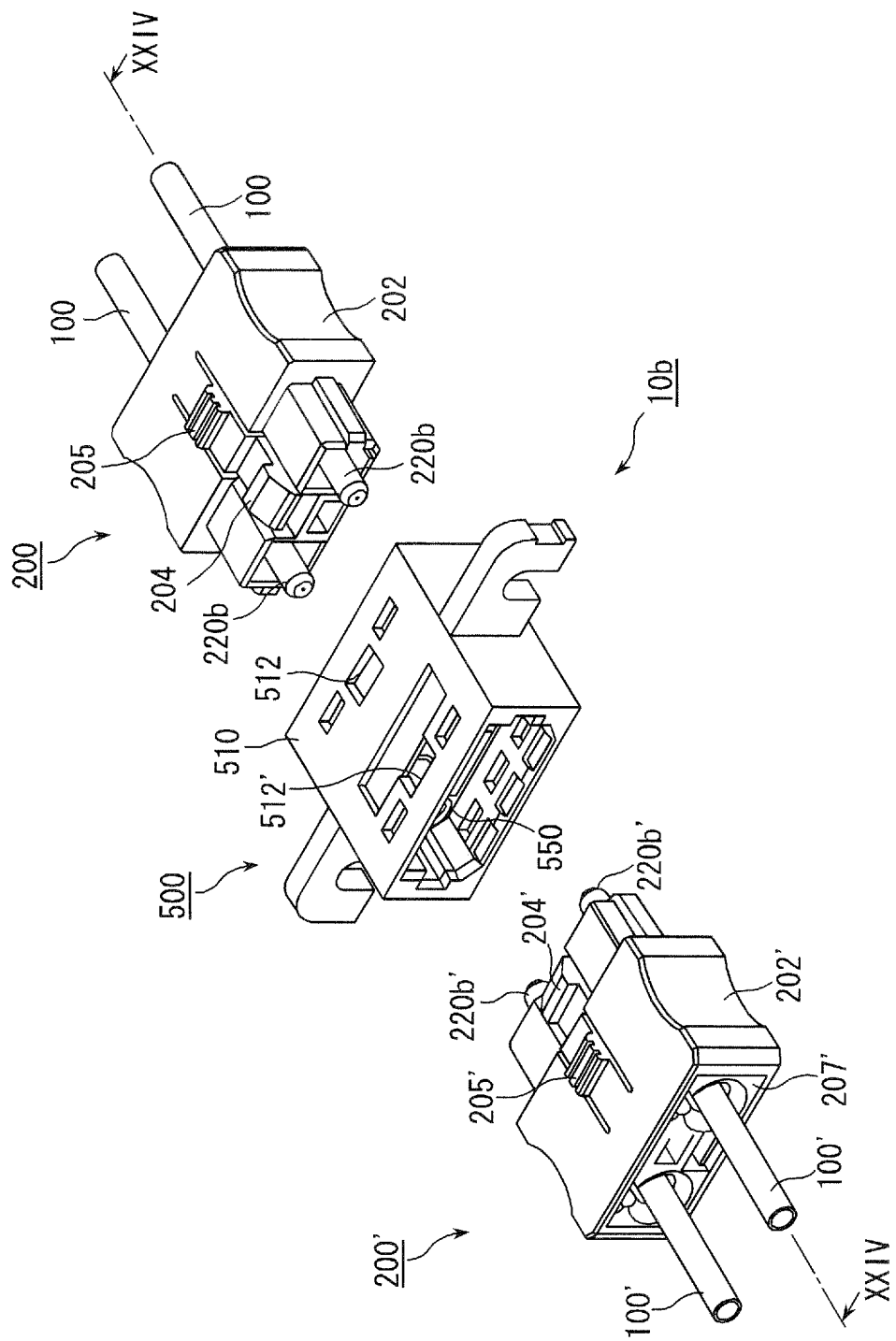
FIG. 22 An oblique view showing an optical connector apparatus using other types of the connection member. The connectors and the adaptor included in the illustrated connector apparatus are in a separated state.
Figure 23:
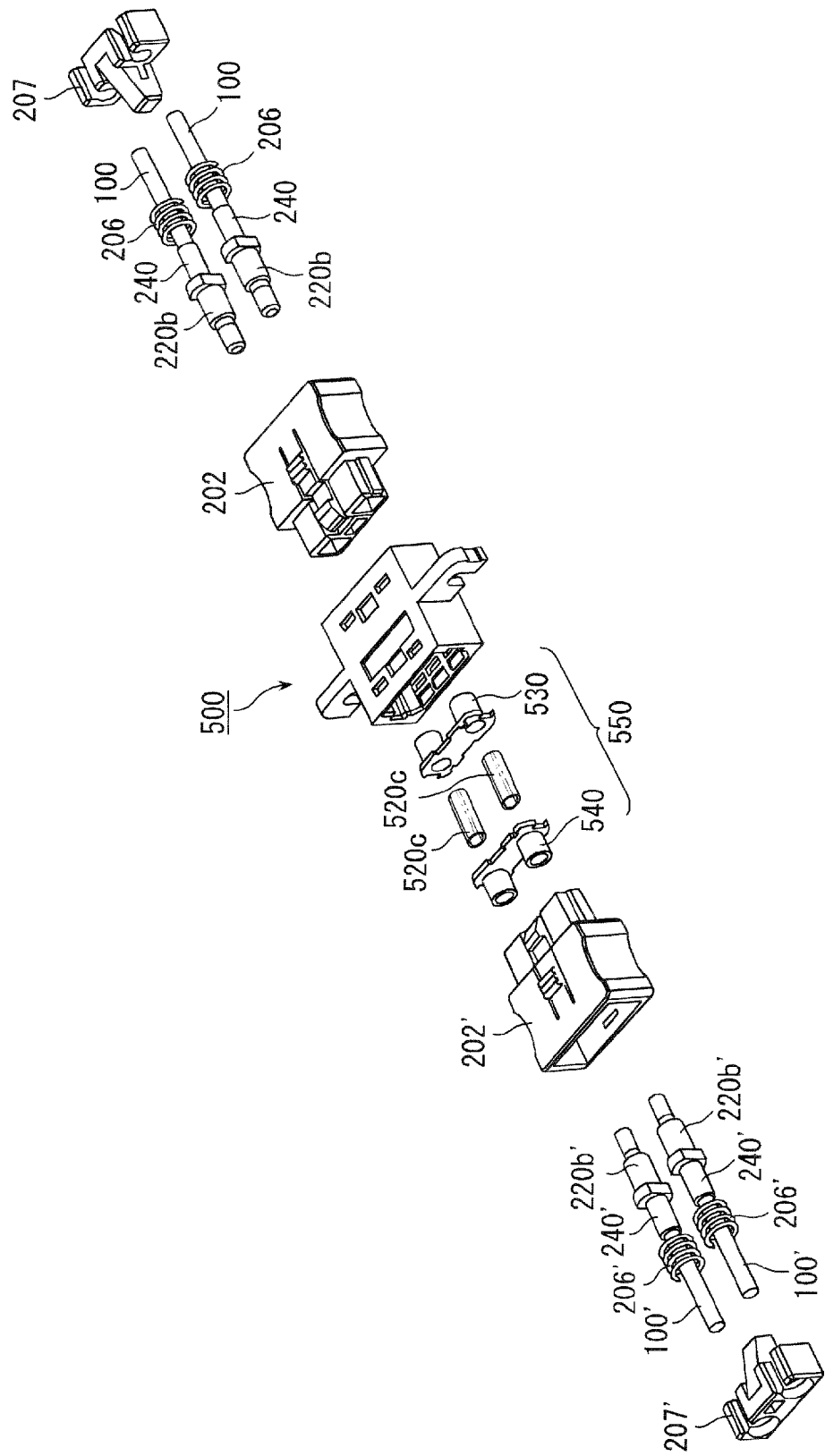
FIG. 23 An exploded oblique view showing the connector of FIG. 22.

As illustrated in FIG. 22 to FIG. 24, the optical connector apparatus 10b comprises a first connector 200 connected with a first electro-optical composite cable 100, a second connector 200' connected with a second electro-optical composite cable 100', and an adaptor 500 relaying a connection between the first connector 200 and the second connector 200'.

As illustrated in FIG. 24, similarly to the above-described first ferrule 220a (see FIG. 16 and FIG. 17), the first ferrule 220b is of the composite type and has a structure similar to the first ferrule 220a. Specifically, the first ferrule 220b comprises a connected portion 221 composed of a front portion 222 made of conductive material and a back portion 224 made of insulative material, a large diameter portion 228, a shoulder portion 230, and a first tubular portion 212. A wiring structure of the first ferrule 220b is different from that of the first ferrule 220a. The first ferrule 220b has the first wiring structure as illustrated in FIG. 4 and FIG. 5.

The first ferrule 220b is held by the first connector housing 202 so that a front portion 222 of the connected portion 221 projects forward from a front end surface of the first connector housing 202 and is movable in a front-back direction. The large diameter portion 228 is slidably supported by the shoulder portion 230. The shoulder portion 230 defines a limit of movement in frontward. The first ferrule 220b inserted from a back of the first connector housing 202 is always biased forwardly by the first bias member 206. The first bias member 206 may be formed with a low-cost insulating material such as resin or the like.

As illustrated in FIG. 24, similarly to the first ferrule 220b, the second ferrule 220b' comprises a connected portion 221' composed of a front portion 222' and a back portion 224', a large diameter portion 228, a shoulder portion 230', and a second tubular portion 212'.

The adaptor 500 has a structure substantially the same as the adaptor 500 explained in the above-described embodiment (see FIG. 1 to FIG. 3) except that a connection member 520c (a sleeve) is different. Specifically, as illustrated in FIG. 24, the adaptor 500 comprises the adaptor housing 510 made of insulative material, the connection member 520c made of conductive material, and the accommodation portion 550 holding the connection member 520c.

Figure 27:
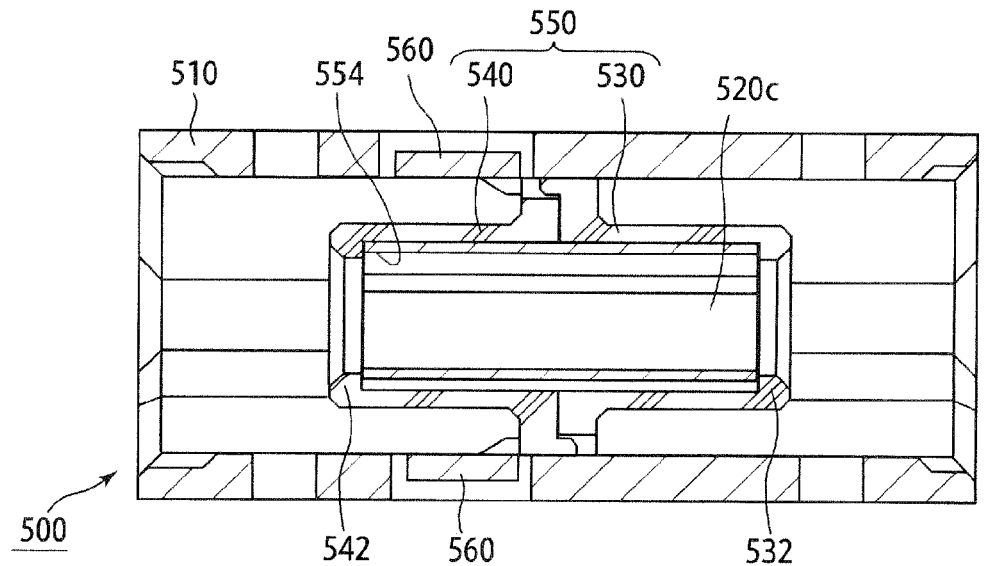
FIG. 27 A cross-sectional view showing the adaptor of FIG. 26, taken along lines XXVII-XXVII.
Figure 30:
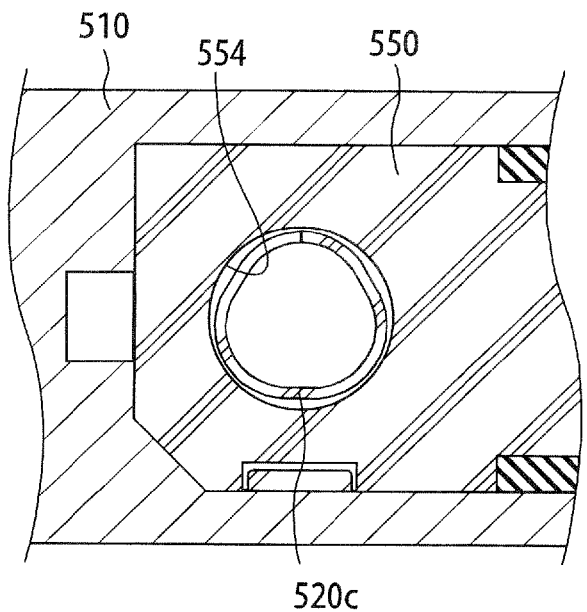
FIG. 30 A cross-sectional view showing the adaptor of FIG. 25, taken along lines XXX-XXX.

As is understood from FIG. 27 and FIG. 30, similarly to the adaptor 500 (see FIG. 14) explained in the first embodiment, the accommodation portion 550 of the present embodiment is composed of two parts which are a first part 530 and a second part 540. The accommodation portion 550 has the accommodation space 554 accommodating the connection portion, and the insertion openings 532, 542 communicating with the accommodation space 554. As described above, each inner diameter of the insertion openings 532, 542 is smaller than an inner diameter (a diameter of an inner wall portion) of the accommodation space 554. In detail, the accommodation space 554 is formed so as to accommodate the connection member 520c while the insertion openings 532, 542 are formed so as to prevent the connection member 520c from falling away from the accommodation space 554.

As illustrated in FIG. 22, FIG. 23 and FIG. 27, in the present embodiment, the accommodation portion 550 is made up by combining the first part 530 and the second part 540 so as to arrange the connection member 520c therein. Then the adaptor 500 is formed by holding and fixing the accommodation portion 550 in the adaptor housing 510.

Figure 28:
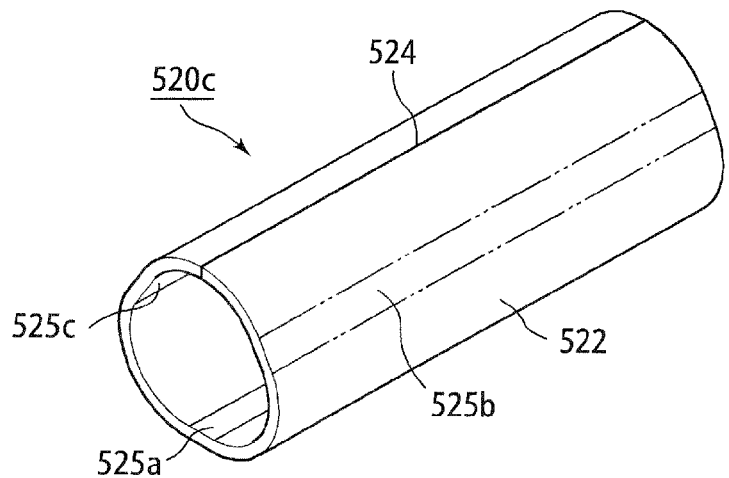
FIG. 28 A cross-sectional view showing the connection member (variation example 3) included in the adaptor of FIG. 23.
Figure 29:
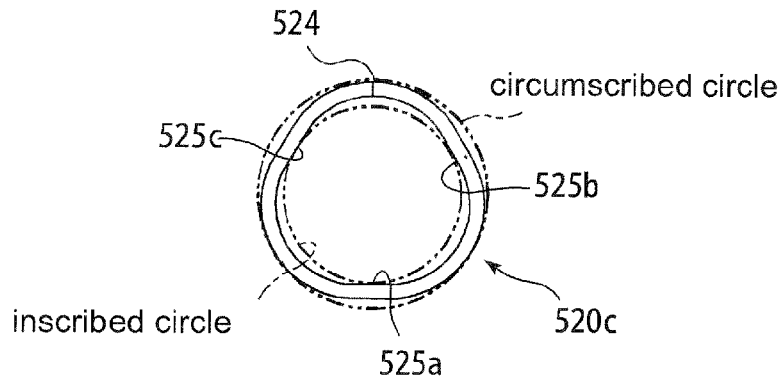
FIG. 29 A front view showing the connection member of FIG. 28. An inscribed circle and a circumscribed circle are also illustrated.

As illustrated in FIG. 24, FIG. 28 and FIG. 29, the connection member 520c of the present embodiment holds the first ferrule 220b and the second ferrule 220b' and electrically connects the first ferrule 220b with the second ferrule 220b'. When the first ferrule 220b and the second ferrule 220b' are inserted into the connection member 520c, the connection member 520c grips the front portion 222 formed on the connected portion 221 of the first ferrule 220b and the front portion 222' formed on the connected portion 221' of the second ferrule 220b' from outside so that they are electrically connected.

Referring to a structural feature of the connection member 520c, as illustrated in FIG. 28 and FIG. 29, the connection member 520c is formed by stamping a metal plate having two edge portions so that the edge portions are opposite to each other and thus forming a main body portion 522 having a tubular shape. In the present embodiment, an opposed-edges portion (joint portion) 524 is formed of the edges portions opposite to each other is substantially formed of the edge portions facing each other. Thus, the main body portion 522 is tubular as mentioned above. However, the present invention is not limited to this structure. For example, the opposed-edges portion 524 may be formed by arranging the edges opposite to each other with a slight space therebetween. In this case, the main body portion 522 may have a shape that is substantially tubular. In the present embodiment, the entire connection member 520c may be regard as the main body portion 522 because it is processed by stamping the metal plate having a simple shape. Even if a frond end and a back end are provided with characteristic shape, a part of the connection member 520c is required to be provided with a portion corresponding to the main body portion 522 in order to keep a suitable ferrule-holding function.

The main body portion 522 comprises three ferrule contact portions 525a, 525b, 525c which are brought into contact with the first ferrule 220b and the second ferrule 220b' when the connection member 520c holds the first ferrule 220b and the second ferrule 220b'. The ferrule-contact portions are separated from each other in a plane (a perpendicular plane) perpendicular to the axis-direction. Concretely, the ferrule contact portion 525a is positioned at an opposite side of the opposed-edges portion 524 in the perpendicular plane. The ferrule contact portions 525b, 525c are arranged so that each of the ferrule contact portions 525b, 525c, the ferrule contact portion 525a and a center of the connection member 520c forms a central angle of 120 degrees. In other words, the illustrated ferrule contact portions 525a, 525b, 525c are arranged on the main body portion at about 120 degree intervals in the perpendicular plane. Each of the ferrule contact portions 525a, 525b, and 525c has a linear shape in the perpendicular plane and extends along the axis-direction of the connection member 520c. In other words, each of the ferrule contact portions 525a, 525b and 525c has a long and thin plate-like shape. As a result, as illustrated in FIG. 29, the connection member 520c has a shape like a triangular rice ball (a shape of a triangle having rounded corners) in the perpendicular plane.

In the case of the connection member 520c, having the above-described shape, a difference between an inscribed circle and a circumscribed circle shown in FIG. 29 may be made larger than the thickness of the connection member 520c. In other words, the suitable ferrule-holding function can be obtained by adjusting the inscribed circle while the connection member 520c is prevented from rattling in the accommodation space 554 of the accommodation portion 550 by adjusting the circumscribed circle. Moreover, in the case of the connection member 520c of the present embodiment, the adjustment may be carried out during the stamp process of the metal plate or by the stamping process which is carried out afterwards. Therefore, according to the present embodiment, the circumscribed circle and the inscribed circle of the connection member 520c are easily adjusted by low-cost stamping so that both the suitable holding of the ferrule and the prevention of the rattling in the accommodation portion 550 can be achieved.

Figure 31:
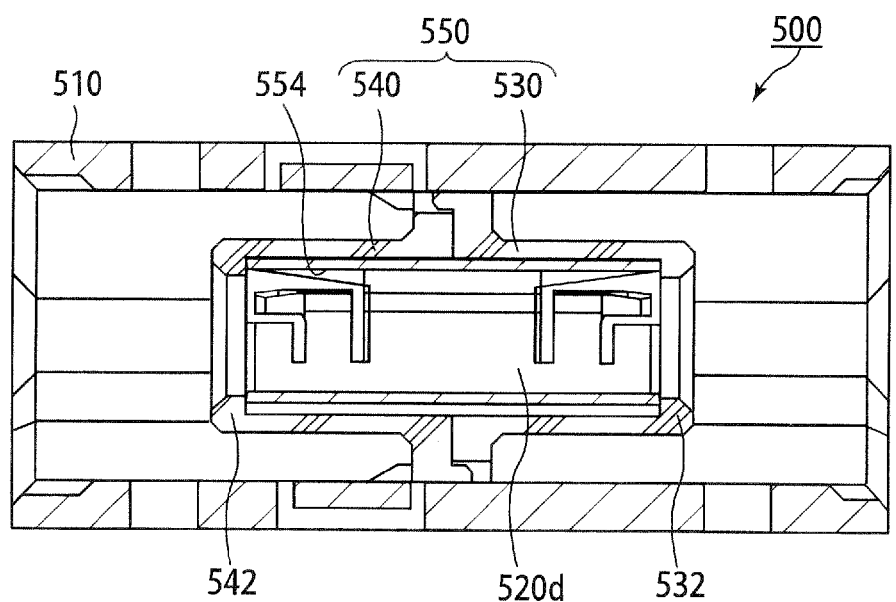
FIG. 31 A cross-sectional view of an adaptor of FIG. 27 in a case where the connection member (variation example 4) of FIG. 33 is applied.
Figure 32:
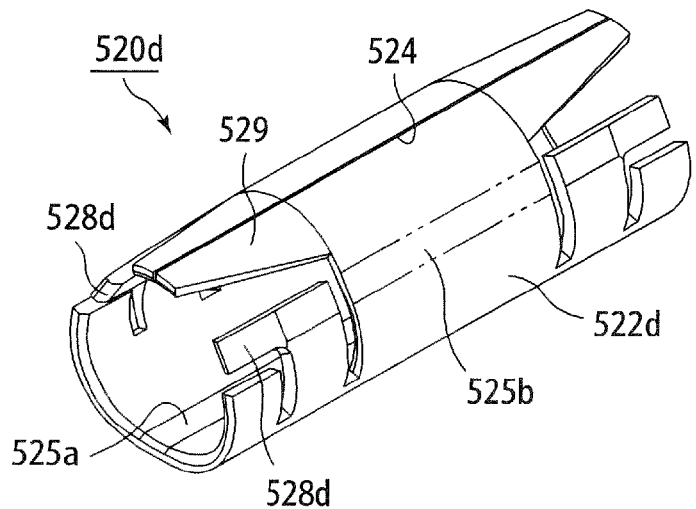
FIG. 32 An oblique view showing the connection member included in the adaptor of FIG. 31.
Figure 33:
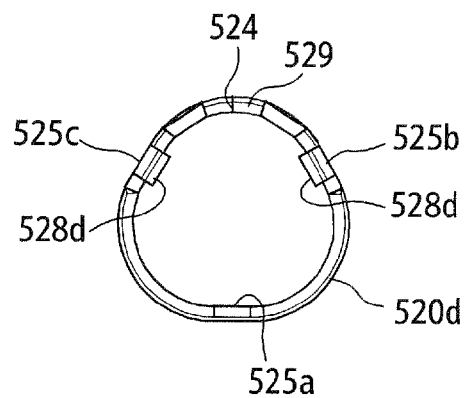
FIG. 33 A front view showing the connection member of FIG. 32.

As a further modification of the connection member, the connection member may be constituted to have more suitable structure for the connection with the electro-optical composite cable, for example, such as a connection member 520d illustrated in FIG. 31 to FIG. 33. In detail, the connection member 520d is formed by stamping a metal plate having two edge portions so that the edge portions are opposite to each other and thus forming a main body portion 522d having a tubular shape. An opposed-edges portion formed of the edge portions opposite to each other is substantially formed of the edge portions facing each other. The main body portion 522d of the connection member 520d is provided with ferrule contact portions 525a, 525b, 525c by stamping in a like manner of the above-described ferrule 520c (see FIG. 29). The ferrule contact portion 525a is positioned at an opposite side of the opposed-edges portion 524 in the perpendicular plane. The ferrule contact portions 525b, 525c are arranged so that each of the ferrule contact portions 525b, 525c, the ferrule contact portion 525a and a center of the connection member 520c forms a central angle of 120 degrees. In other words, the illustrated ferrule contact portions 525a, 525b, 525c are arranged on the main body portion at about 120 degree intervals in the perpendicular plane.

The connection member 520d is not obtained by stamping the metal plate having a simple structure but is obtained by punching out a front end and a back end so as to have a predetermined shape and followed by bending. As a result, each of the front end and the back end has a pair of spring portions 528d and a support portion 529. The spring portions 528d is provided to correspond to two ferrule contact portions 525b, 525c positioned apart from each other by the same distance from the opposed-edges portion 524 which locates between the ferrule contact portion 525b and the ferrule contact portion 525c. The spring portions 528d are brought into contact with the back portion 224 provided on the connected portion 221 of the first ferrule 220b illustrated in FIG. 24 (or the back portion 224' provided on the connected portion 221' of the first ferrule 220b'). The spring portions 528d in an normal state project inwardly than the inscribed circle defined by the main body portion 522d (see FIG. 33) in order to secure more solid electrical connection with the first ferrule 220b (or the second ferrule 220b'). On the other hand, the support portion 529 is provided to correspond to the opposed-edges portion 524. Specifically, the support portion 529 is positioned midway between the pair of spring portions 528d in the perpendicular plane. As illustrated in FIG. 31, the support portion 529 is provided so as to minimize a clearance between an inner wall of the accommodation space 554 of the accommodation portion 550 and an outer circumference of the connection member 520d. The connection member 520d is accommodated in the accommodation space 554 of the connection member 550 with clearance. Since the two spring portions 528d are positioned a part from a line extending in the center of the connection member 520d, in case if the support portion 529 is not provided, there is a possibility that the first ferrule 220b (or the second ferrule 220b') may be misaligned in the accommodation space 554 in an upward and a downward direction. In this case, when the first ferrule 220b (the second ferrule 220b') is to be inserted into the connection member 520d, the first ferrule 220b (the second ferrule 220b') will be brought into contact with an edge of the connection member 520d so that the insertion may be failed or may not be well guided. However, in case where the support portion 529 is provided, the clearance between the accommodation space 554 of the accommodation portion 550 and an outer circumference of the connection member 520d, i.e. the clearance, is minimized so that the misalignment in the upward and downward directions is resolved. Thus, when inserted into the connection member 520d, the first ferrule 220b (the second ferrule 220b') is guided toward the connection member 520d and inserted securely.

The support portion 529 may or may not have elasticity. The support portion 529 may be initially brought into contact with the inner wall of the accommodation portion 550 or may be brought into contact after the first ferrule 220b (or the second ferrule 220b') is inserted into the connection member 520d.

In the above-explained first embodiment, the explanation was made about the first to the fourth wiring structures (see FIG. 4, FIG. 5 and FIG. 8 to FIG. 13) as four types of the wiring structure, the adaptor housing 510 (see FIG. 14, or FIG. 27) and the adaptor housing 510a (see FIG. 19) as two types of the adaptor housing, the connection member 520 (see FIG. 2), the connection member 520a (see FIG. 20), the connection member 520b (see FIG. 21), the connection member 520c (see FIG. 28) and the connection member 520d (see FIG. 32) as five types of the connection members, and further the metal type ferrule 220 (see FIG. 3) and the composite type ferrules 220a and 220b (see FIG. 16 and FIG. 24) as two types of the ferrules. However, the optical connector apparatus of the present embodiment is not limited thereto. The optical connector apparatus may be constituted by selecting the most suitable components and combining them.

The optical connector apparatus according to the above-described embodiment comprises three components including two connectors (the first connector 200 and the second connector 200') and the adaptor. However, the present invention is not limited thereto. The concept of the present invention can be applied to any kind of the optical connector apparatus having the connection member which holds two ferrules in a state that the ferrules are butted (faced) with each other.

Second Embodiment

The optical connector apparatus according to the above-described first embodiment connects the electro-optical composite connector with another electro-optical composite connector through the adaptor. However, an optical element such as a photo diode may be used as an object which is connected through the adaptor.

Figure 34:
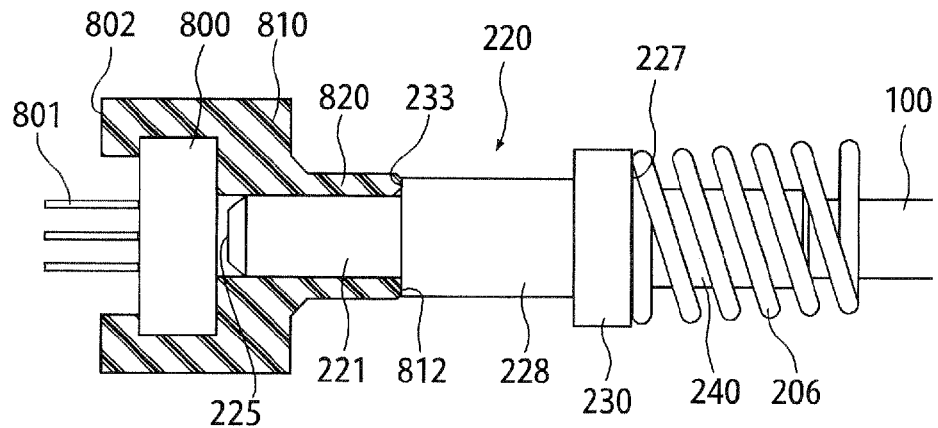
FIG. 34 A partially-cutaway internal side view showing an optical connector apparatus according to a second embodiment of the present invention. In the illustration, only a housing is illustrated in cross section.

As illustrated in FIG. 34, an optical connector apparatus according to a second embodiment comprises the ferrule 220 connected with the electro-optical composite cable 100, an optical element 800 such as the photo diode, and a housing 810 holding the optical element 800. The electro-optical composite cable 100 has the structure similar to that of the electro-optical composite cable of the first embodiment. The metal-type ferrule 220 (see FIG. 3) according to the first embodiment is used. Therefore, the ferrule 220 of the present embodiment comprises the connected portion 221, the large diameter portion 228, the shoulder portion 230 and the tubular portion (not shown) which functions as the adjuster portion. A sleeve 240 which functions as the crimped portion is crimped in a state that the size difference is adjusted by the tubular portion so that the electro-optical composite cable 100 is connected with the ferrule 220. The optical connector apparatus is also provided with the bias member (a coil spring) 206 which is arranged so as to always push a pushed portion 227 of the ferrule 220 and biases the ferrule 220 toward the optical element 800. Similarly to the first embodiment, the ferrule 220, the sleeve 140 and the bias member 206 may be accommodated in a space defined by a cable stopper and an-insulative connector housing (see FIG. 3).

The optical element 800 is installed on the substrate (not shown) and comprises terminals 801 connected with conductive patterns (not shown) on the substrate. The housing 810 of the present embodiment is made of conductive material and comprises an installation surface 802 to be installed on the substrate. The housing 810 is formed with a tubular connection portion 820 extending toward the ferrule 220. The connected portion 221 of the ferrule 220 is inserted into the connection portion 820 so that a contact end surface 812 of the connection portion 820 is brought into contact with a contact surface 233 which faces forward and defines a boundary between the connected portion 221 of the ferrule 220 and the large diameter portion 228. As a result, an electrical connection between the ferrule 220 and the housing 810 is established. In addition, a distance between the optical element 800 and a front end surface 225 of the ferrule 220 is fixed because the contact surface 233 of the ferrule 220 is brought into contact with the contact-end surface 812. Therefore, an optical connection between the optical element 800 and the optical fiber held by the ferrule 200 may be stable.

In the present embodiment, the housing 810 is entirely made of conductive material. However, for example, a part of the housing may be metal-plated so that the housing is partially conductive and that an electrical path may be established between the ferrule 220 and the substrate.

Third Embodiment

In the optical connector apparatus according to the above-described second embodiment, the optical element is held by the housing. However, the optical element may be held by an adaptor 900 illustrated in FIG. 35. Hereinbelow, an explanation will be made about a third embodiment of the optical connector apparatus which comprises the connector and the adaptor holding the optical element and relaying a connection between the connector and the optical element. As the connector to be connected with the adaptor 900, the above-described first connector 200 (see FIG. 1) according to the first embodiment may be used. In this case, the ferrule 220 (see FIG. 14), the ferrule 220a (see FIG. 16) or the ferrule 220b (see FIG. 24) may be used as the ferrule to be held by the first connector 200. Hereinbelow, detailed descriptions of the connector and the ferrule will be omitted. An explanation will be made only about the adaptor and the connection member held by the adaptor.

Figure 35:
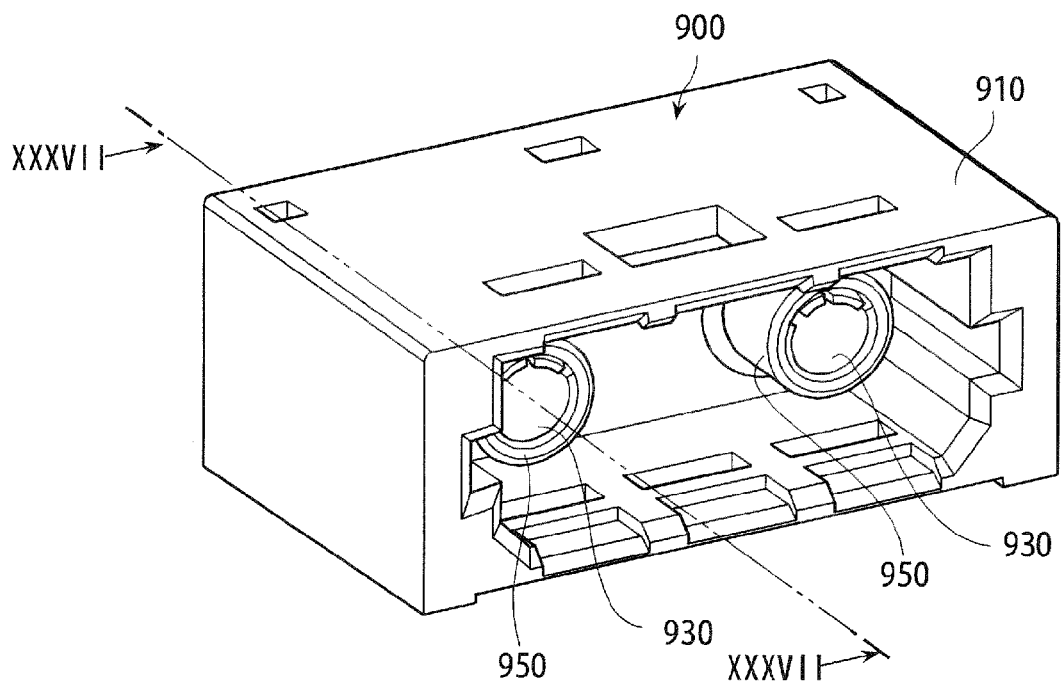
FIG. 35 An oblique view showing an adaptor used for an optical connector apparatus according to a third embodiment of the present invention. The adaptor holds a connection member.
Figure 36:
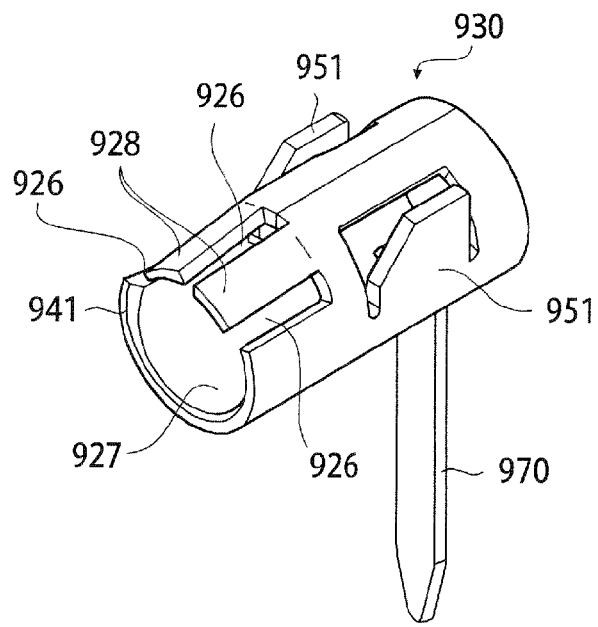
FIG. 36 An oblique view showing the connection member held by the adaptor of FIG. 35.
Figure 37:
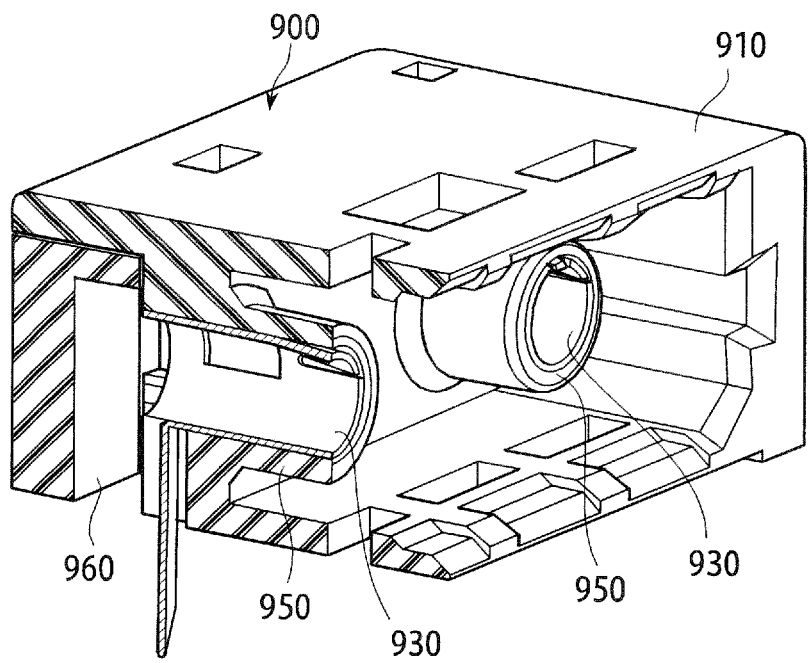
FIG. 37 A cross-Sectional view showing the adaptor of FIG. 35, taken along lines XXXVII-XXXVII. An illustration of an optical element is omitted.

As illustrated in FIG. 35 to FIG. 37, the adaptor 900 of the present embodiment comprises a housing 910 having an insulation property, and a connection member 930 made of the conductive material held by the housing 910.

As illustrated in FIG. 35 to FIG. 37, the housing 910 has a tubular accommodation portion 950 which accommodates the connection member 930, and an element-accommodation portion 960 which accommodates the optical element (not shown). The optical element is accommodated in the element-accommodation portion 960 so as to face an end surface of the optical fiber held by the ferrule of the connector when the connector is connected with the adaptor 900.

As illustrated in FIG. 36, the connection member 930 comprises a structure as if the connection member 520a illustrated in FIG. 20 into halves. Specifically, the connection member 930 is formed by attaching an extended-connection portion 970 to a tubular shaped portion wherein the extended-connection portion 970 extends in a diameter direction of the tubular shaped portion. In detail, the connection member 930 comprises a receiving portion 927 receiving the ferrule of the connector along a predetermined direction, two spring portions formed by making three cuts 926 along the longitudinal direction in an end portion 941 of the receiving portion 927, and the above-described extended-connection portion 970. As is clear from FIG. 36, the extended-connection portion 970 is provided on an end portion opposite to the end portion 941 which is formed with the above-described cuts 926. The extended-connection portion 970 is electrically connected with a circuit pattern on the substrate when the adaptor of FIG. 35 is installed on the substrate (not shown). Similarly to the connection member 520a illustrated in FIG. 20, the connection member 930 is formed with the spring portions 928 which has a relatively low elastic constant so that a small amount of gripping force is given to the connection member 930. With this structure, for example, when the connection member 930 is inserted with the above-described ferrule 220 (see FIG. 1 to FIG. 3), the connection member 930 is elastically deformed so that the diameter thereof increases. Thus, the connection member 930 is suitable for variety sizes of the ferrules 220 or the connection members 930. Even when the composite-type ferrule 220a (or the ferrule 220b: see FIG. 24) is used, the back portion 224 (or the back portion 224') of the ferrule 220a which is inserted into the connection member 930 is electrically connected with the three points which are two spring portions 928 and the accommodation portion 927. Therefore, each of the ferrules can improve the connection reliability with the connection member 930.

The connection member 930 is accommodated in the accommodation portion 950 in the similar manner to the connection member 520a (see FIG. 20) that the connection member 930 is press-fitted into the accommodation portion 950 so as to engage the press-fit portions 951 with an inner wall of the accommodation portion 950.

Fourth Embodiment

Figure 38:
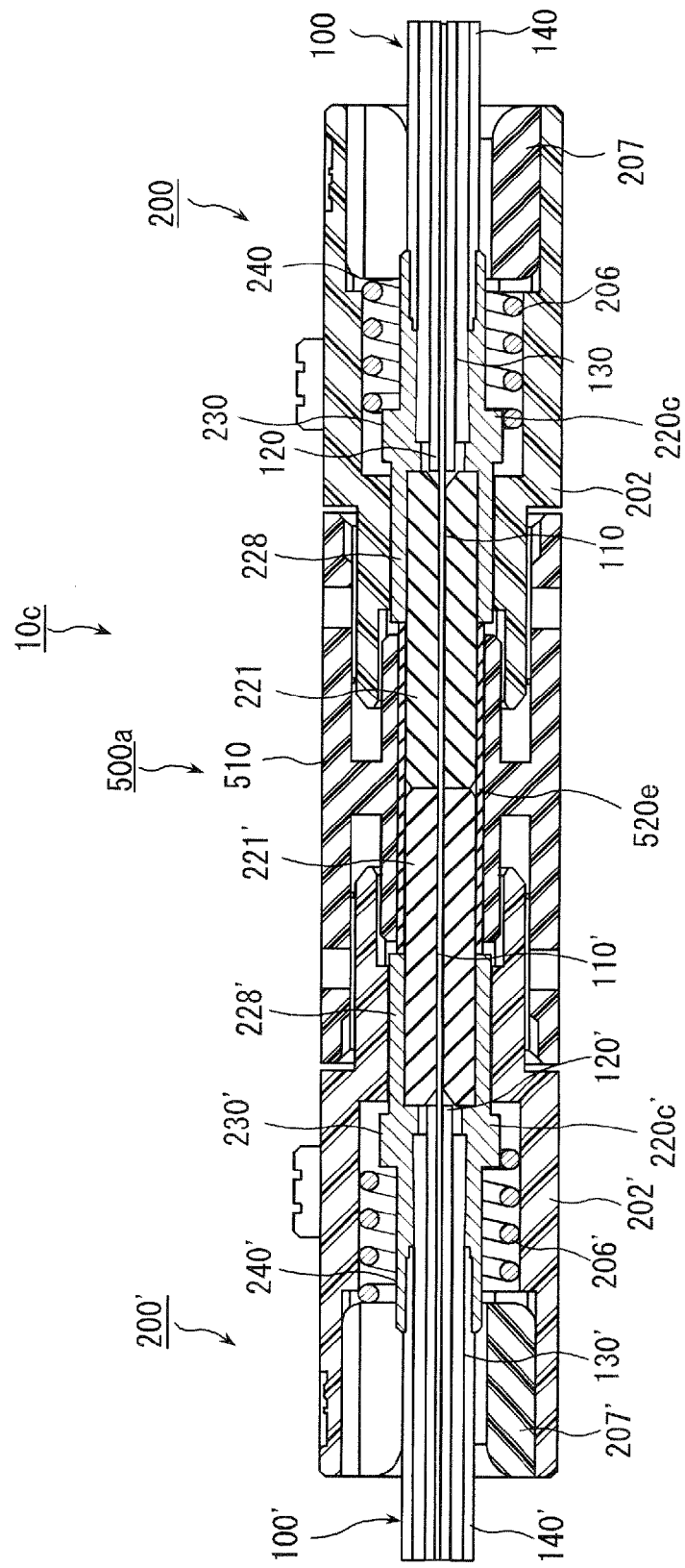
FIG. 38 An oblique view showing a connection object (an adaptor and a connector (a second connector)) included in an optical connector apparatus according to a fourth embodiment of the present invention. The illustrated optical connector apparatus is in the connection state.
Figure 39:
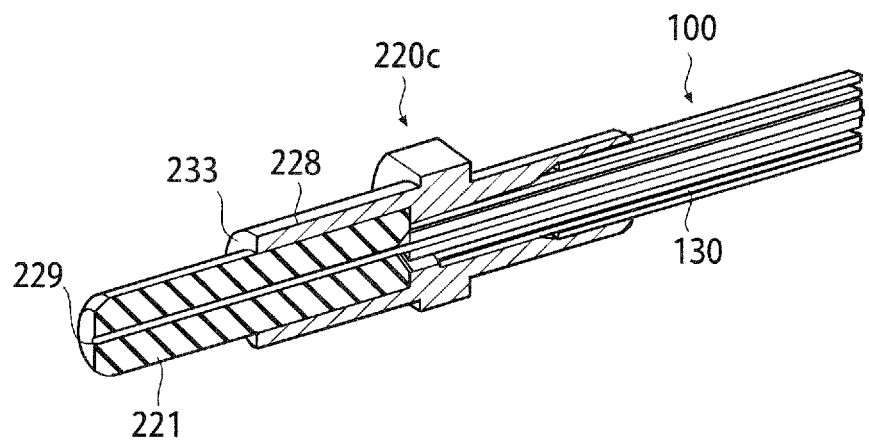
FIG. 39 A cross-sectional view showing a ferrule (an insulation type) included in the optical connector apparatus of FIG. 38.

In the above-described embodiments, the explanations have been made about the connection established between the ferrule and the connection member wherein the connection member grips the ferrule. As illustrated in FIG. 38, an optical connector apparatus according to a fourth embodiment comprises the first connector 200 connected with the first electro-optical composite cable 100, the second connector 200' connected with the second electro-optical composite cable 100, and an adaptor 500a relaying a connection between the first connector 200 and the second connector 200'.

As illustrated in FIG. 38 to FIG. 41, components, except for a connection member 520e and a first ferrule 220c, of the optical connector apparatus 10c according to the present embodiment are similar to that of the optical connector apparatus 10a (see FIG. 19). The same reference numerals are given to the components similar to the above-described first structure and, therefore, the description of those components will be omitted.

As illustrated in FIG. 38 to FIG. 41, the first ferrule 220c is composed of a connected portion 221 made only of insulative material and the large diameter portion 228 made of conductive material (hereinafter, a ferrule of such type is called the "insulation type"). In detail, the connected portion 221 is a tubular insulator formed with a hole 229 and is inserted in the large diameter portion 228 so as to form a front end of the ferrule 220c. The hole 229 holds the optical fiber in its center. The large diameter portion 228 is formed so as to constitute a tubular shaped frontend portion of a conductive member which is electrically connected with the first metal conductor 130 of the first electro-optical composite cable. In addition, an edge of the large diameter portion 228, i.e. a boundary between the large diameter portion 228 and the connected portion 221, forms a contact portion 233 having a ring-shape.

Figure 41:
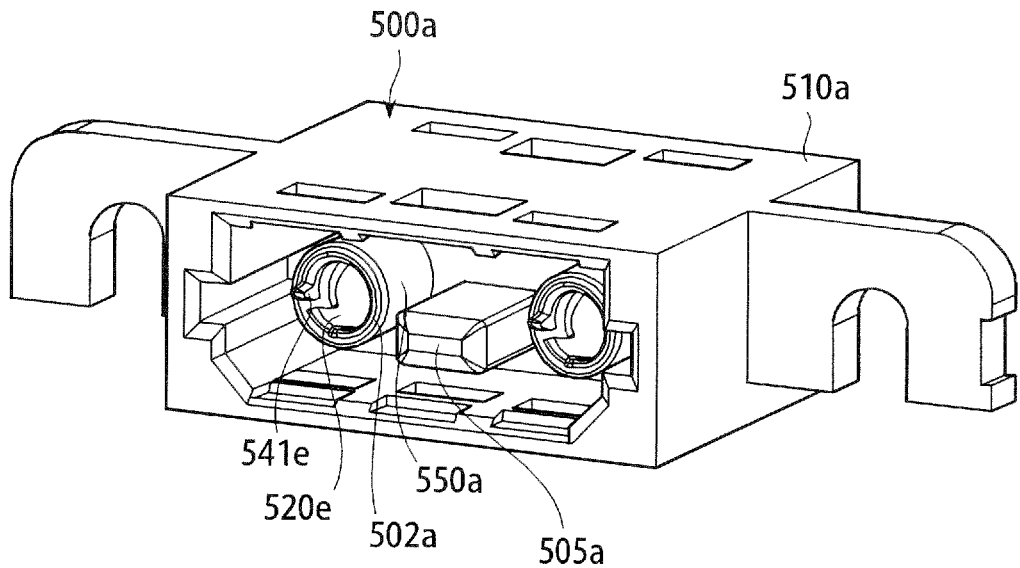
FIG. 41 An oblique view showing the adaptor included in the optical connector apparatus of FIG. 38.

As illustrated in FIG. 38 and FIG. 41, the adaptor 500a according to the present embodiment comprises an adaptor housing 510a made of insulative material and a connection member 520e wherein the connection member 520e is made of the conductive material and is held by the adaptor housing 510a.

As illustrated in FIG. 41, the adaptor housing 510a comprises a projection 505 and a tubular accommodation portion 550a which accommodates the connection member 520e. The projection 505 prevents fingers or the like from being accidentally inserted in the adaptor housing 510a. A length of the projection from an inner surface is longer than a length of the accommodation portion 550a.

Figure 42:
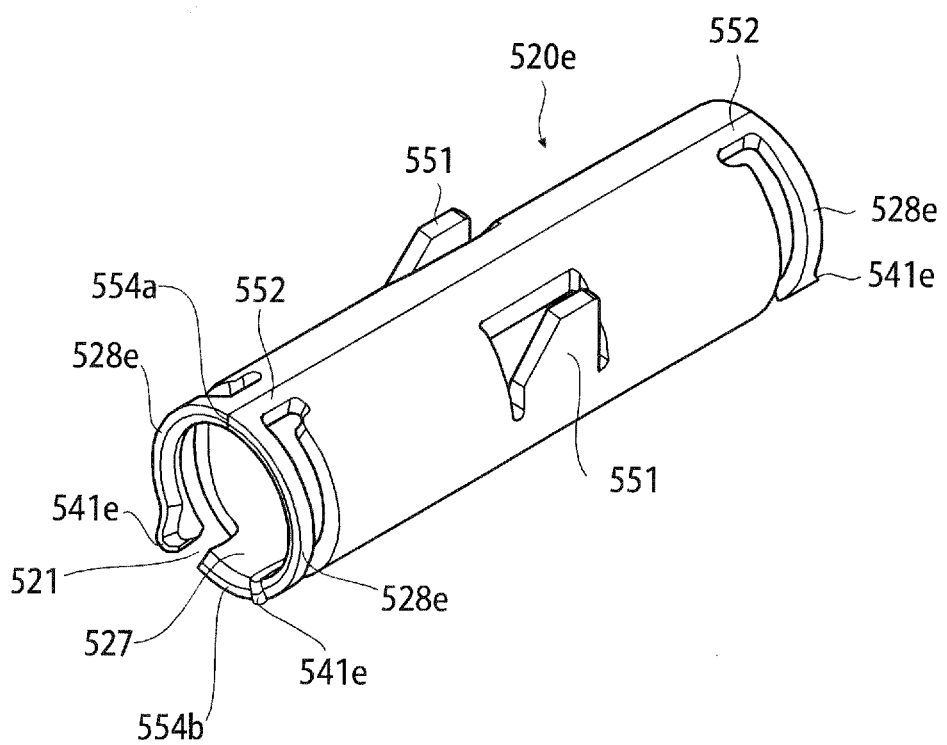
FIG. 42 An oblique view showing a connection member (contact type) included in the adaptor of FIG. 41.

As illustrated in FIG. 42, the connection member 520e is made of conductor and has a substantially tubular shape. The connection member 520e comprises the receiving portion 527 receiving the end portion of the first ferrule 220c (or the second ferrule 220c') in the predetermined direction (the insertion and the ejection direction), support portions 552 extending in the predetermined direction, the spring portions 528e extending from the support portions 552 in a peripheral direction of the connection member 520e, conductive portions 541e provided on the front ends of the spring portions 528e, and press-fit portions 551. A free end portion of the each of the spring portions 528e has a cut portion which is formed by making a cut in an end portion, into which a first ferrule 220c (or the second ferrule 220c') is inserted, along the insertion direction. The conductive portion 541e of the present embodiment is supported by the spring portions 528e so as to be displaceable in the predetermined direction. An end portion 554a of the support portion 552 and an end portion 554b of the receiving portion 527 are positioned at the same position in the insertion and the ejection directions. The conductive portion 541e of the present embodiment is positioned closer to the ferrule than the end portions 554a, 554b and is supported by the spring portions 528e so as to be displaceable in the predetermined direction.

The connection member 520e is accommodated in the accommodation portion 550a of the adaptor housing 510a in a manner as follows. The connection member 520e is press-fitted into the accommodation portion 550a. The press-fit portions 551 are engaged with an inner wall of the accommodation portion 550a. The conductive portion 541e of the connection member 520e is projected from an end portion 502a of the accommodation portion 550a.

In the electro-optical connector apparatus having the above-described these structure, the contact portion 233 of the first ferrule 220c is brought into contact with the conductive portion 541e of the connection member 520e when the first connector 200 is inserted into the adaptor 500a. In this state, when the first connector 200 is pushed toward the adaptor 500a, the conductive portion 541e slides on the contact surface 233 and is displaced. The connected portion 221 is inserted into the connection member 520e till the contact surface 233 is brought into contact with the end portions 554a, 554b of the connection member 520e so that a connection of the first ferrule 220c and the connection member 520e is completed. An electrical connection and an optical connection are established between the first connector 200 and the second connector 200'. The conductive portion 541e of the connection member 520e of the present embodiment is supported by the spring portions 528e. Therefore, the conductive portion 541e is securely brought into contact with the contact surface 233 by the restoring force of the spring portion 528e. In addition, the contact surface 233 is brought into contact with the end portions 554a, 554b so that reliability of an electrical connection between the adaptor 500a and the first connector 200 is increased. A portion including the end surface of the first ferrule 220c of the present embodiment has an insulation property so that, similarly to the above-described composite-type ferrule, unintentional occurrence of the short-circuit at the front end of the first ferrule 220c may be prevented.

As explained above, according to the present embodiment, the ferrule held by the connector is brought into contact with the connection object so that the electrical and the optical connections are established. In the above-described fourth embodiment, the component which constitutes the above-described connection object may be regard as a single component with the second connector 200' and the adaptor 500a combined together.

Fifth Embodiment

Applying a concept similar to the above fourth embodiment, the connection object may be not only the combination of the connector and the adaptor but also a housing which accommodates the optical element such as the photo diode, for example. From this point of view, the explanation of the optical connector apparatus according to a fifth embodiment of the present invention will be made about an optical connector apparatus which comprises the connection object having the optical element. Similar to the fourth embodiment, the connector (see FIG. 39 and FIG. 40) which comprises the insulation-type ferrule 220c may be used as a connector connected with the connection object. For this reason, a detailed explanation about the connector will be omitted.

Figure 43:
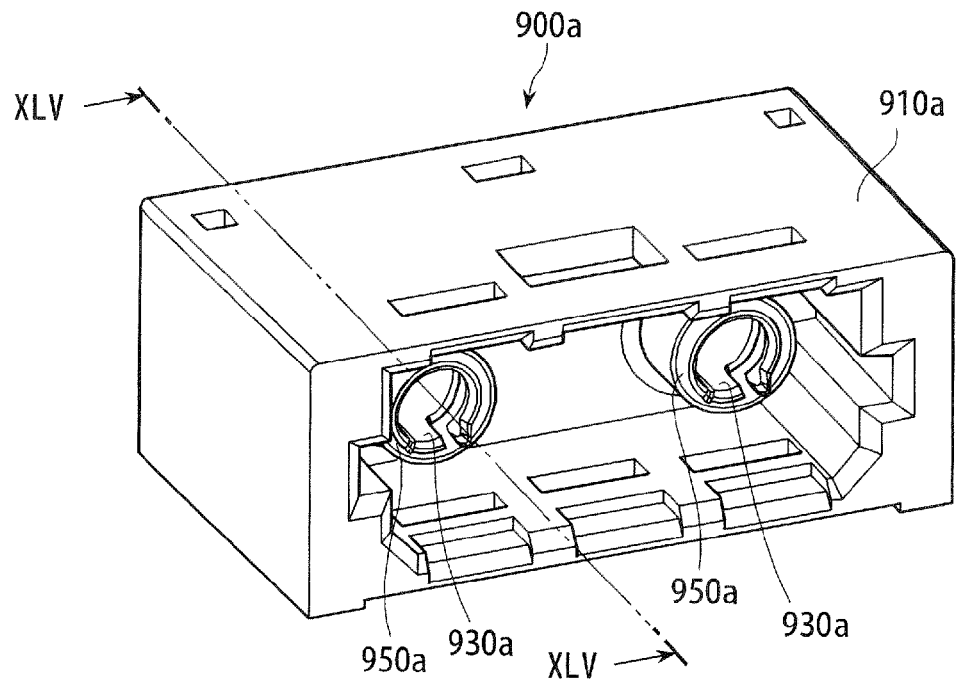
FIG. 43 An oblique view showing an adaptor used for an optical connector apparatus according to a fifth embodiment of the present invention. The adaptor holds a connection member.
Figure 44:
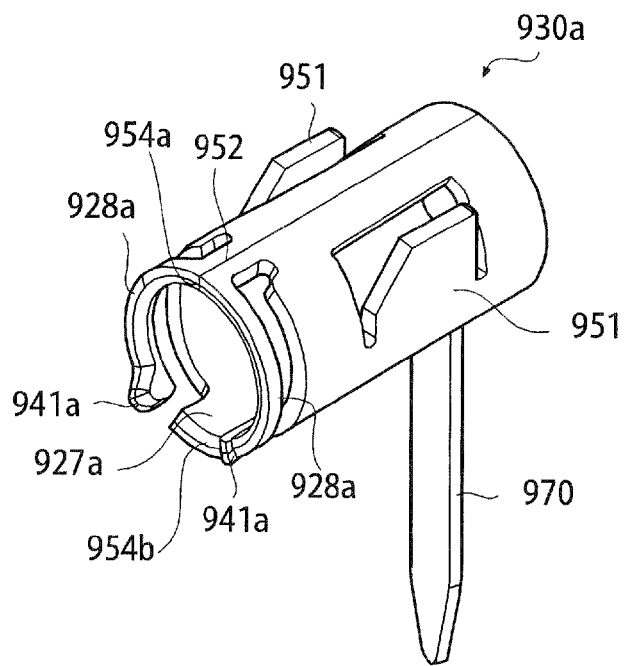
FIG. 44 An oblique view showing the connection member held by the adaptor of FIG. 43.
Figure 45:
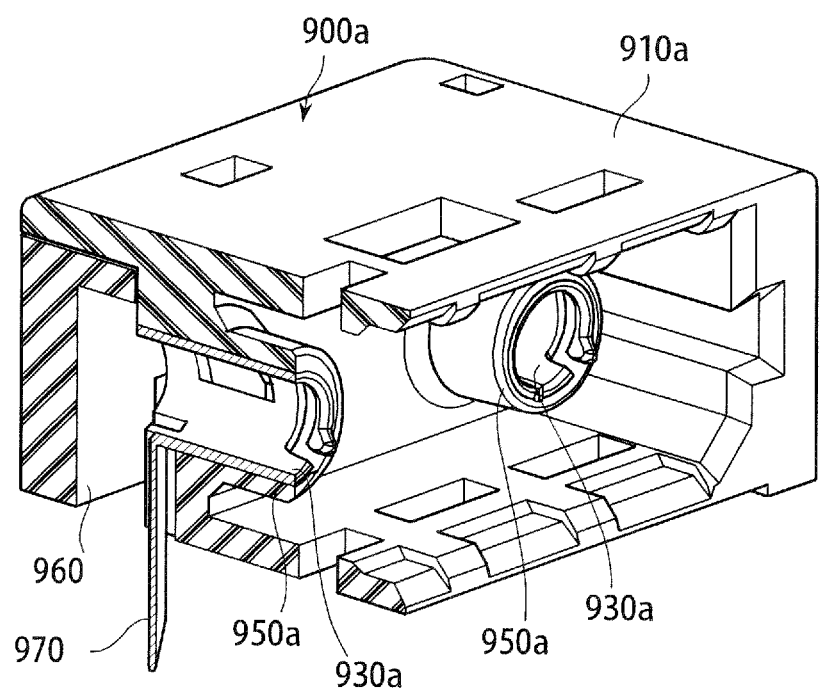
FIG. 45 A cross-sectional view showing the adaptor of FIG. 43, taken along lines XLV-XLV. An illustration of an optical element is omitted.

With reference to FIG. 43 to FIG. 45, the connection object 900a comprises a housing 910a having insulation property, the connection member 930a made of conductive material and held by the housing 910a and the optical element (not shown).

As illustrated in FIG. 43 and FIG. 45, the housing 910a has a tubular accommodation portion 950a accommodating the connection member 930a, and an element accommodation portion 960 accommodating the optical element (not shown). The optical element is held by the housing 910a so that, when the ferrule is inserted into the connection member 900a, the optical element faces the end surface of the optical fiber which is held by the ferrule.

As illustrated in FIG. 44, the connection member 930a comprises a structure as if the connection member 520e illustrated in FIG. 42 is divided into halves. Specifically, the connection member 930a is formed so that an extended-connection portion 970 extending in a diameter direction is attached to a tubular shaped part of the connection member 930a. In detail, the connection member 930a comprises receiving portions 927a receiving the end portion of the first ferrule in the predetermined direction, support portions 952 extending the predetermined direction, spring portions 928a extending from the support portions 952 in a peripheral direction of the connection member 930a, conductive portions 941a provided on front ends of the spring portions 928a, and the above-described extended-connection portion 970. Similarly to connection member 520e of the fourth embodiment, the conductive portion 941a is formed so that an end portion 954a of the support portion 952 and an end portion 954b of the receiving portion 927a are positioned at the same position in the insertion and the ejection directions. The conductive portion 941a of the present embodiment is projected toward the ferrule than the end portions 954a, 954b and is supported by the spring portions 928a so as to be displaceable in the predetermined direction. As is clear from FIG. 44, the extended-connection portion 970 is provided on an end portion located opposite to another end portion which is provided with the conductive portion 841a. When the connection object 900a is installed on the substrate (not shown), the extended-connection portion 970 is electrically connected with a circuit pattern on the substrate.

The connection member 930a is accommodated in the accommodation portion 950a similarly to the case of the adaptor 900a (see FIG. 35) of the optical connector apparatus according to third embodiment. Specifically, the connection member 930a is press-fitted into the accommodation portion 950a so that the press-fit portions 951 are engaged with an inner wall of the accommodation portion 950a. The conductive portion 941a of the connection member 930a is projected from an end portion of the accommodation portion 950a. Thus, the connection member 930a is accommodated in the accommodation portion 950a.

Figure 40:
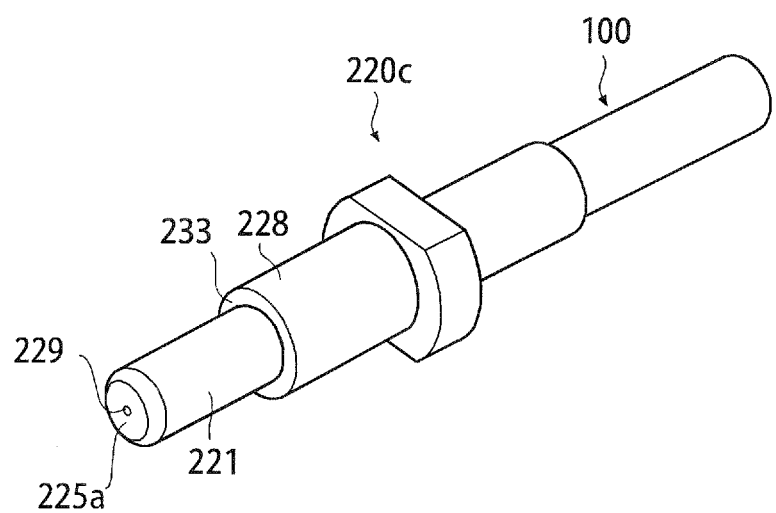
FIG. 40 An oblique view showing the ferrule of FIG. 39.

In the optical connector apparatus comprising the connection object having the above-described structure, the contact surface 233 of the first ferrule 220c is brought into contact with the conductive portion 941a when the first connector 200 as illustrated in FIG. 40 is inserted into the connection object 900a. In this state, when the ferrule 220c is further pushed therein, the conductive portion 941a slides on the contact surface 233 and is displaced. The connected portion 221 is inserted till the contact surface 233 is brought into contact with the end portions 954a, 954b of the connection member 930a so that a connection between the first ferrule 220c and the connection object 900a is completed. Thus, an electrical connection and an optical connection are made between the connector and the connection object 900a. Also in the present embodiment, the conductive portion 941a is securely brought into contact with the contact surface 233 by a restoring force of the spring portions 928a. In addition, the contact surface 233 is brought into contact with the end portions 954a, 954b so that reliability of an electrical connection between the connection object 900a and the electro-optical composite connector increases.

Sixth Embodiment

In the above-described optical connector apparatus, the connector holds the ferrules identical with each other. As a matter of course, when the connector is connected with the connection member, two ferrules held by one connector are electrically connected with the connection member at the same time. On the other hand, in the optical connector apparatus 10d of the present embodiment, when the connector is connected with the connection member, a timing of the electrical connection with the connection member is delayed within at least two or more ferrules. In detail, as illustrated in FIG. 46 to FIG. 49, the optical connector-apparatus 10d comprises a first connector 200 and a second connector 200' connected with a first electro-optical composite cable 100 and a second electro-optical composite cable 100', respectively, and the adaptor 500 relaying a connection between the first connector 200 and the second connector 200. In the present embodiment, the first connector 200, the second connector 200' and the adaptor 500, and a below described first ferrule 220, a first ferrule 220b and a connection member 520d are the same as those explained above. The same reference numerals are given to those components and, therefore, the description of those components will be omitted. In the above-described embodiment, the term "first ferrule" indicates two ferrules which are held by the first connector while the term "second ferrule" indicates two ferrules which are held by the second connector. In the sixth embodiment, one connector (the first connector or the second connector)

includes two ferrules, and the two ferrules are called "first ferrule" and "second ferrule". In other words, the first ferrule and the second ferrule are held by a common connector.

Figure 46:
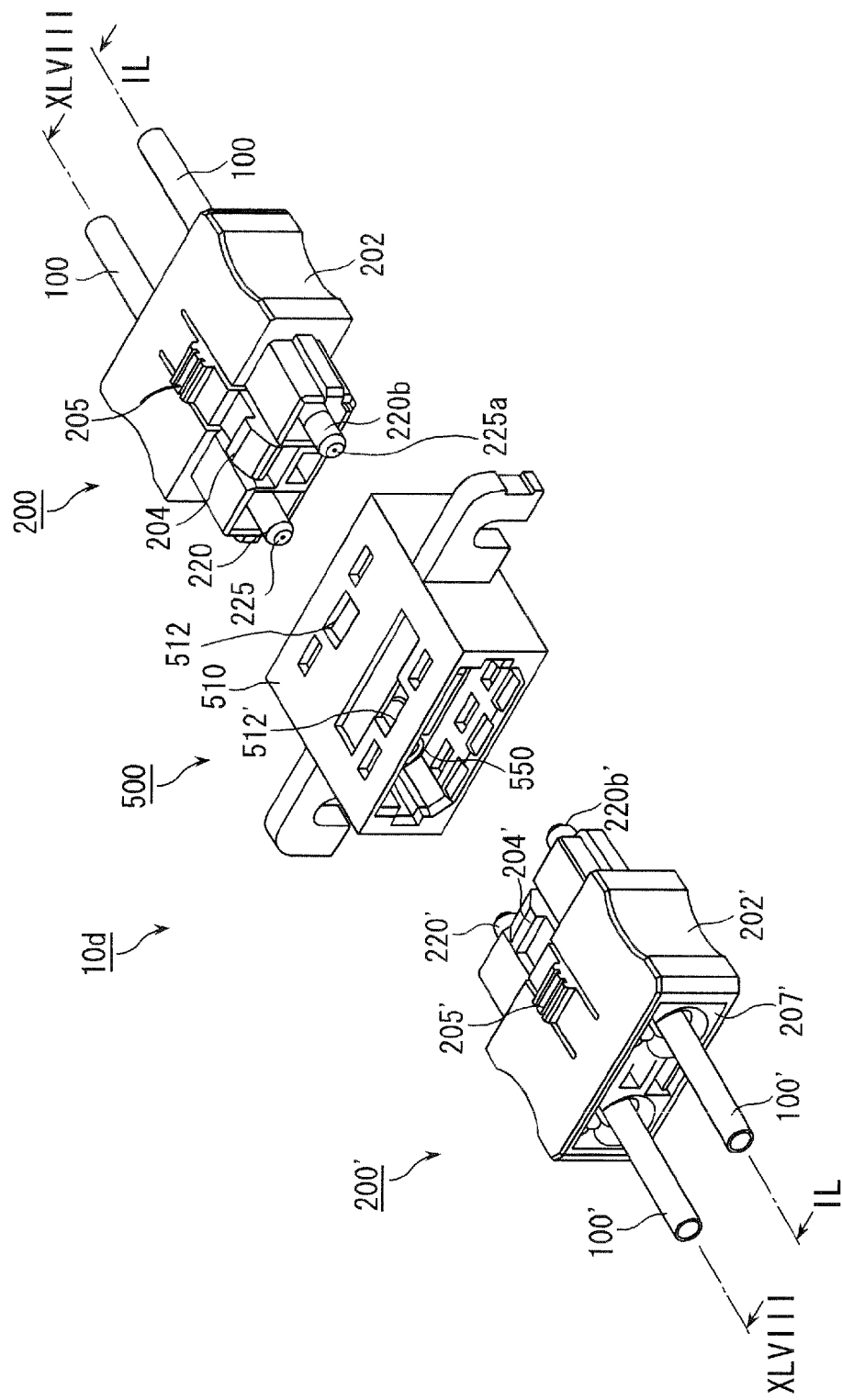
FIG. 46 An oblique view showing an adaptor used for an optical connector apparatus according to a sixth embodiment of the present invention. Connectors (a first connector and a second connector) and an adaptor which constitutes the optical connector apparatus are in an unconnected state.
Figure 47:
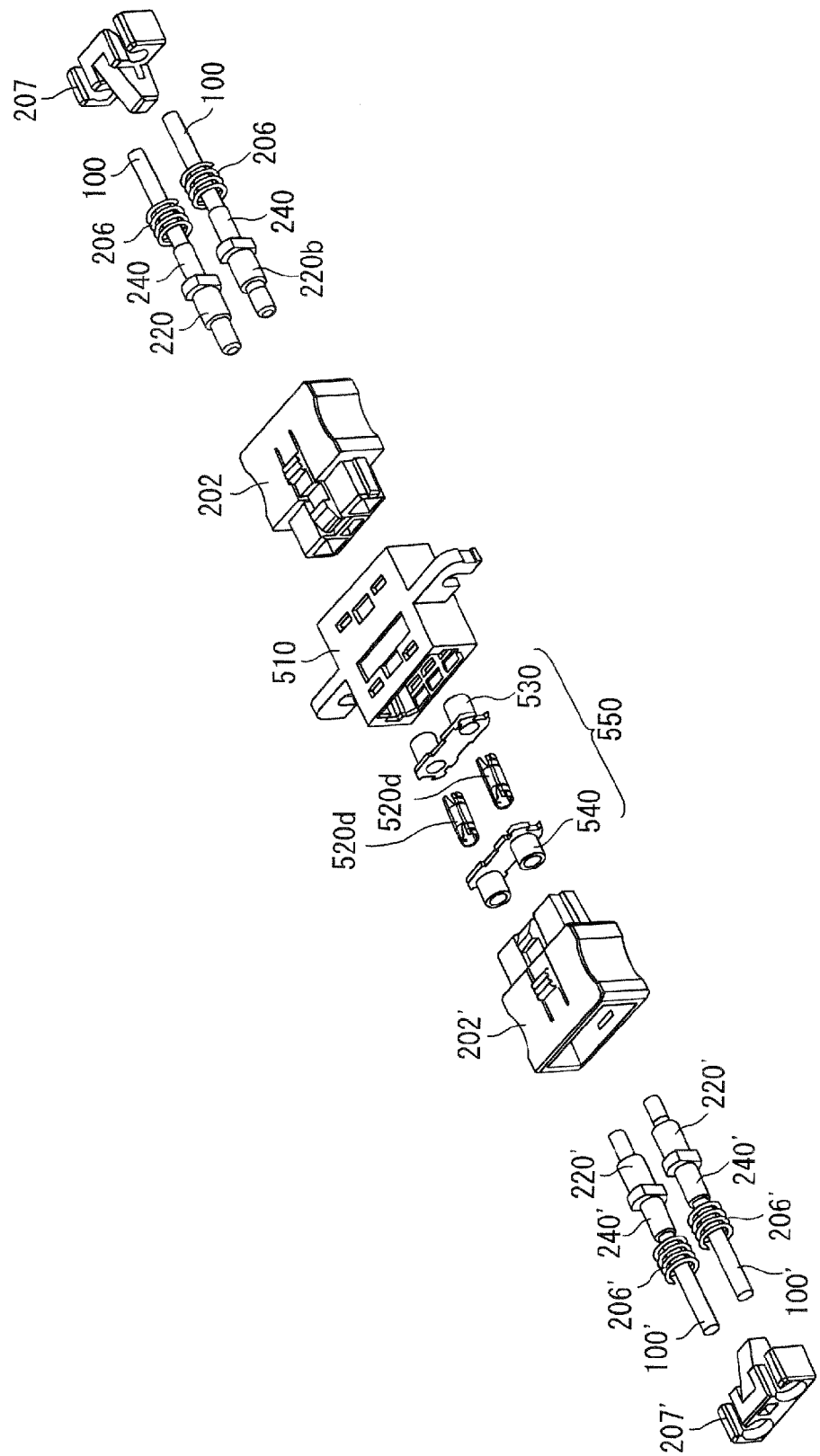
FIG. 47 An exploded oblique view showing the optical connector apparatus of FIG. 46.
Figure 48:
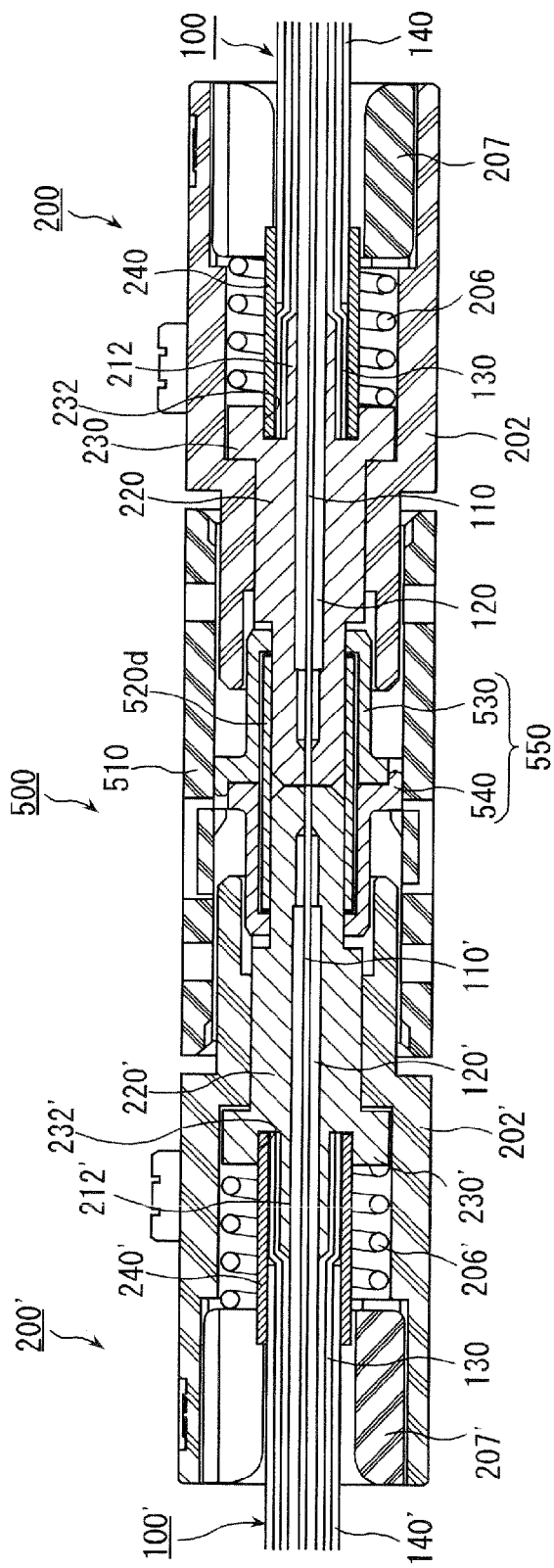
FIG. 48 A cross-sectional view showing the optical connector apparatus of FIG. 46, taken along lines XLVIII-XLVIII.

As illustrated in FIG. 46 to FIG. 48, the first connector 200 comprises a first connector housing 202 made of insulative material, the first ferrule 220, the second ferrule 220b, a first sleeve (a first crimped portion) 240, a first bias member 206, and a first cable stopper 207 made of insulative material.

Figure 49:
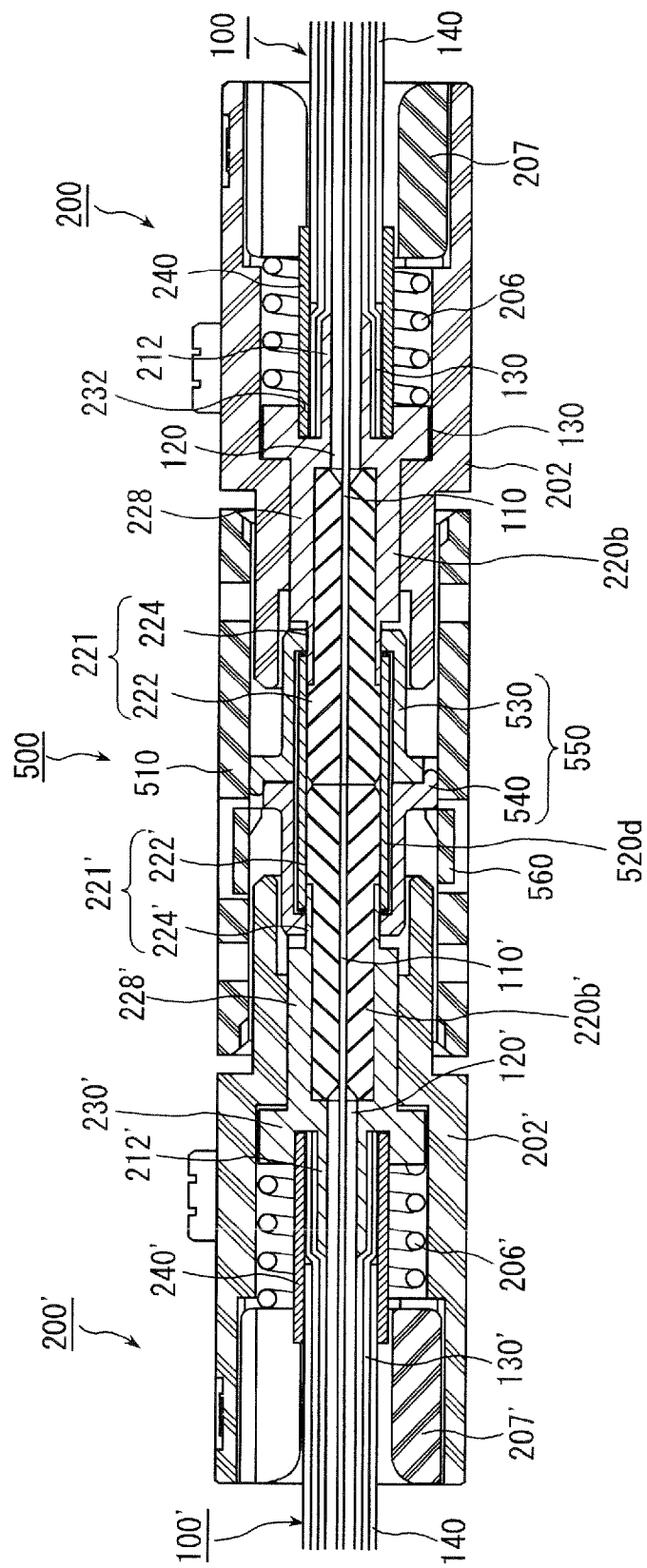
FIG. 49 A cross-sectional view showing the optical connector apparatus of FIG. 46, taken along lines IL-IL.
Figure 50:
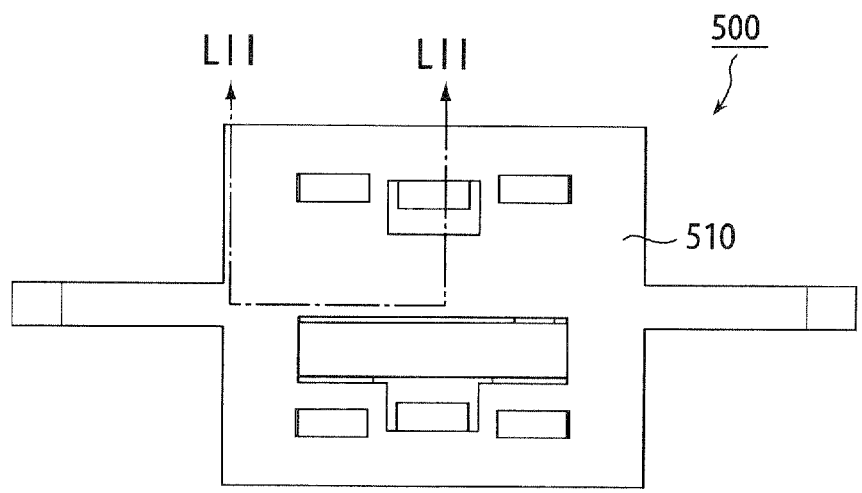
FIG. 50 A top view showing the adaptor of FIG. 46.
Figure 51:
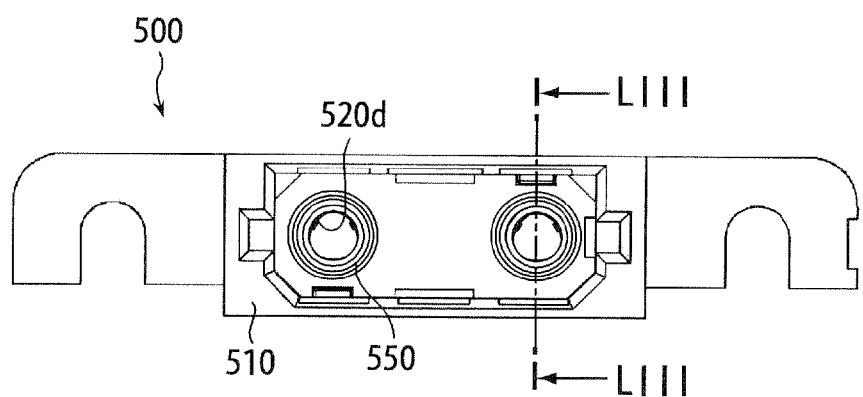
FIG. 51 A front view showing the adaptor of FIG. 46.
Figure 52:
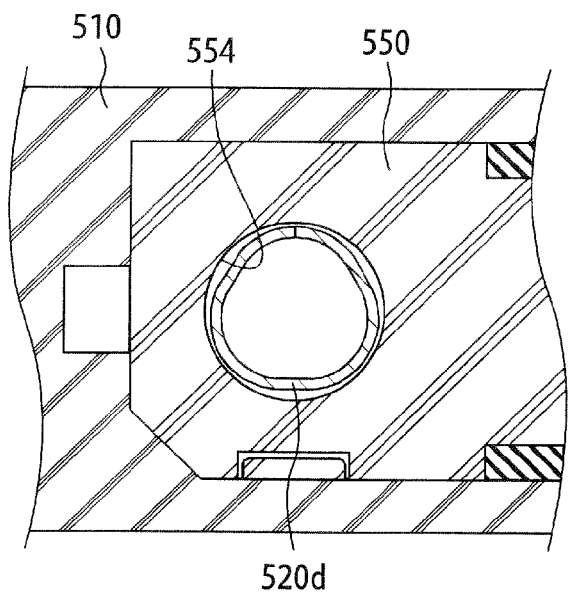
FIG. 52 a cross-sectional view showing the adaptor of FIG. 50, taken along lines LII-LII.

The first connector 200 comprises the metal-type ferrule 220 and the composite-type ferrule 220b. As illustrated in FIG. 48, the first ferrule 220 has the connected portion 221, the large diameter portion 228, the shoulder portion 230, and the tubular portion 212. As described above, the connected portion 221 and the large diameter portion 228 of the first ferrule 220 are made of the conductive material. The connected portion 221 of the first ferrule 220 functions as a first conductive portion. On the other hand, as illustrated in FIG. 49, the second ferrule 220b has the connected portion 221, the large diameter portion 228, the shoulder portion 230, and the tubular portion 212. The connected portion 221 of the second ferrule 220b is composed of the front portion 222 made of the insulative material and the back portion 224 made of the conductive material and integrally formed with the large diameter portion 228. The back portion 224 functions as a second conductive portion. In the present embodiment, as illustrated in FIG. 46, the first ferrule 220 itself functions as the first conductive portion. Therefore, a distance between a first front end surface 225 of the end surface of the first ferrule 220 and the first conductive portion is zero. On the other hand, a second end surface 225a of the end surface of the second ferrule 220b is apart from the second conductive portion (the back portion 224) by a length of the front portion 222 which is made of an insulative material and which is positioned between the second end surface 225a and the second conductive portion. In other words, a distance between the first end surface 225 and the first conductive portion (the first ferrule 220 in itself) is different from a distance between the second end surface 225a and the second conductive portion (the back portion 224).

As explained in the first embodiment, the first ferrule 220 is connected with the first electro-optical composite cable 100 by the above-described wiring structure (see FIG. 4 and FIG. 5). In the present embodiment, the first ferrule 220 always pushes the first ferrule 220 and the second ferrule 220b forward by the first bias member 206. The first bias member 206 may be made of the insulative material such as resin.

The second connector 200' has a mirror-image structure of the first connector. The second connector 200' has a structure same as the first connector 200 except for an arrangement of the second ferrule 220' and the second ferrule 220b' which are in reversed positions of those in the first connector 200. As illustrated in FIG. 46 to FIG. 49, the second connector 200' comprises a second connector housing 202' made of the insulative material, a first ferrule 220', a second ferrule 220b', a second sleeve (a second crimped portion) 240', a second bias member 206', and a cable stopper 207' made of the insulative material.

Similarly to the first ferrule 220 and the second ferrule 220b, of the first connector 200, the first ferrule 220' of the second connector 200' is the composite-type ferrule (see FIG. 24) while the second ferrule 220b' is the metal-type ferrule (see FIG. 3). A distance between a front end surface of the first ferrule 220' and a first conductive portion (a back portion 224') is different from a distance between a front end surface of the second ferrule 220b' and a second conductive portion (the second ferrule 220b' in itself).

As illustrated in FIG. 46 to FIG. 49 and FIG. 50 to FIG. 53, the adaptor 500 of the present embodiment comprises an adaptor housing 510 made of the insulative material, two connection member 520d made of the conductive material (see FIG. 32), and an accommodation portion 550 accommodating the connection member 520d. As illustrated in FIG. 46, the adaptor housing 510 is formed with an lock hole 512 locked with the lock portion 204 of the first connector 200, an lock hole 512' locked with the lock portion 204' of the second connector 200', and the accommodation portion 550.

Figure 53:
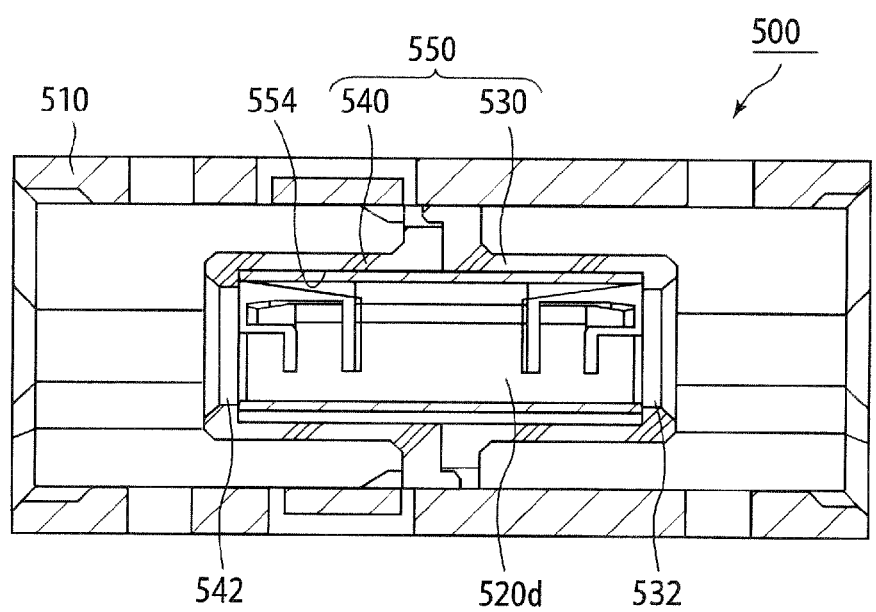
FIG. 53 A cross-sectional view showing the adaptor of FIG. 51, taken along lines LIII-LIII.

As understood from FIG. 47 and FIG. 53, the accommodation portion 550 is composed of two parts which are a first part 530 and a second part 540. Furthermore, the accommodation portion 550 has an accommodation space 554 in which the connection member 520d is positioned, a first insertion opening 532 and a second insertion opening 542 wherein the first insertion opening 532 and a second insertion opening 542 communicate with the accommodation space 554. Each of inner diameters of the first insertion opening 532 and the second insertion opening 542 is smaller than an inner diameter of the accommodation space 554 (a diameter of the inner walls). Therefore, the accommodation space 554 is able to accommodate the connection member 520d while the first insertion opening 532 and the second insertion opening 542 are made so that the connection member 520d will not fall out from the accommodation space 554.

As illustrated in FIG. 48, one of the connection members 520d grips the connected portion 221 (a first end portion) of the first ferrule 220 of the first connector 200 and the connected portion 221' (the first end portion) of the first ferrule 220' of the second connector 200' so as to electrically connect between them. On the other hand, as illustrated in FIG. 49, the other one of the connection member 520d grips the connected portion 221 (a second end portion) of the second ferrule 220b of the first connector 200 and the connected portion 221' (the second end portion) of the second ferrule 220b' of the second connector 200' so as to electrically connects between them.

As described above, in the optical connector apparatus of the present embodiment, each of the first ferrule 220 and the second ferrule 220b has a length between the end surface and the conductive portion, and the lengths are different from each other. Therefore, when the first connector 200 or the second connector 200' is connected with the adaptor 500, their conductive portions are connected with the connection member 520d of the adaptor 500 with a time lag. Thus, the hot swapping can be carried out.

The members of the optical connector apparatus according to the present invention are not limited to the above-mentioned members. For example, the already-explained first to the fourth wiring structure (see FIG. 4, FIG. 5, FIG. 8 to FIG. 13) may be used as the wiring structure between the ferrule and the optical composite cable, the adaptor housing 510 (see FIG. 14 or FIG. 27) or 510a (see FIG. 19) may be used as the adaptor housing, the connection member 520 (see FIG. 2), 520a (see FIG. 20), 520b (see FIG. 21), 520c (see FIG. 28), or 520d (see FIG. 32) may be used as the connection member, and the above components may be in an appropriate combination. Furthermore, one connection member of the two connection members comprised by the adaptor may be used as the connection member 520e (see FIG. 42) connected with the connection member by contacting the ferrules. In this case, an adaptor similar to the adaptor 500a illustrated in FIG. 19 may be used for the connection member 520e and the insulation-type ferrule 220c (see FIG. 39 and FIG. 40) may be used for the ferrule brought into contact with the connection member. Moreover, for example, the first ferrules may be connected through the connection member while the second ferrules may be connected by contacting their end surfaces with each other. With these structures, when the connector is connected with the adaptor, timings of the electrical connections through the plurality routes may be different from each other.

Seventh Embodiment

The optical connector apparatus comprises two connectors and the adaptor relaying them. However, the optical connector may have the connector and the adaptor comprising the optical element.

As for an example of such optical connector wherein the connection member is connected with the ferrule by gripping, the adaptor 900 and the connection member 930 illustrated in FIG. 35 to FIG. 37 may be used. As the ferrule which is connected with the connection member 930, the metal-type ferrule 220 (see FIG. 3) or the composite-type ferrule 220a (see FIG. 16 and FIG. 7: the composite-type ferrule illustrated in FIG. 24 may be appliable) may be used. In this case, similarly to the structures of the first ferrule and the second ferrule of the optical connector apparatus 10d explained with reference to FIG. 46, for example, the metal-type ferrule 220 may be used for the first ferrule while the composite-type ferrule 220b (or the ferrule 220a) may be used for the second ferrule. Applying this structure, similar to the sixth embodiment, the distances between the first end surface 225 of the first ferrule 220 and the connected portion 221 (the first conductor) is different from the distance between the second end surface 225a of the second ferrule 220b and the back portion 224 (the second conductor). Therefore, a timing of the electrical connection between the first ferrule 220 and one of the connection member 930 is different from a timing of the electrical connection between the second ferrule 220a and the other one of the connection members 930. As a result, the hot swapping may be possible.

Either the first ferrule or the second ferrule may be applied to the connection method which establishes the connection between the connection member and the ferrule brought into contact with the connection member. In this method, for example, the adaptor 900a illustrated in FIG. 43 to FIG. 45 may be used for the adaptor and a combination of the connection member 930 and the connection member 930a may be used for the connection members. The metal-type ferrule 220 or the composite-type ferrule 220a (or the ferrule 220b) may be used for the ferrule connected with the connection member 930. The insulation-type ferrule 220c (FIG. 39 and FIG. 40) may be used for the ferrule connected with the connection member 930a. Applying this structure, a distance between the first front end surface 225 of the first ferrule 220 (or 225a) and the first conductive portion (a distance being zero in case of the metal-type ferrule/a distance corresponds to a length of the front portion 222 in case of the composite type ferrule) is different from a distance between the second front end surface 225c of the second ferrule 220c and the second conductive portion (a distance corresponding to a length of the connected portion 221). Therefore, a timing of the electrical connection between one of the ferrules (the metal-type or the composite-type) and the connection member 930 is different from a timing of the electrical connection between the other one of the ferrules (the insulation-type) and the connection member 930a. As a result, the hot swapping may be possible.

Furthermore, the explanation was made about the connector having two ferrules which are the first ferrule and the second ferrule in the above-described embodiment. However, the present invention is not limited thereto. For example, three or more ferrules may be installed to the connector. In this case, each of the ferrules may have a distance between the end surface and the conductive portion, and each of the distances may be different in length from each other. For example, the first connector 200 may have the first ferrule 220 of the metal-type, the second ferrule 220a (or the ferrule 220b) of the composite-type and a third ferrule of the composite-type. On the other hand, each of the first to the third ferrules of the first connector 200 may be formed with the composite-type ferrule. In such case, a distance between a third conductive portion (a back part of the connected portion) which is formed on the third ferrule as the conductive portion and a third end surface which is an end surface of the third ferrule may be different from either a distance between the first front end surface 225 and the first conductive portion (the first ferrule 220 in itself) or a distance between the second front end surface 225a and the second conductive portion (a back portion 224). The combination of the first ferrule, the second ferrule and the third ferrule may be made up by selecting the appropriate one from the metal-type ferrule 220, the composite-type ferrule 220a (or the ferrule 220b) or the insulation-type ferrule 220c. Needless to say, any of the first to the fourth wiring structures (see FIG. 4, FIG. 5 and FIG. 8 to FIG. 13) may be applied to each ferrule.

Eighth Embodiment

Figure 54:
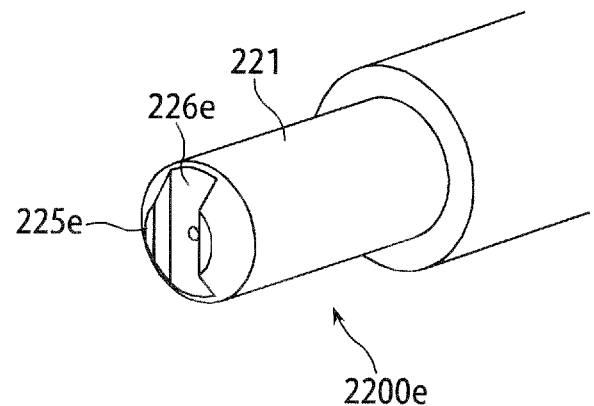
FIG. 54 An oblique view showing an adaptor used for an optical connector apparatus according to a eighth embodiment of the present invention.

Finally, an explanation will be made about variation examples of the front end surfaces of the ferrules used for the above-described embodiment. In a case where the front end of the ferrule is not polished in order to make the electrical connection between the front ends of the ferrules, the front end of the ferrule may be formed as illustrated, for example, in FIG. 54 and FIG. 55. A recess portion 226e is formed across a center of the front end surface 225e of a ferrule 2200e as illustrated in FIG. 54. The recess portion 226e has a rectangular shape when the ferrule 2200e is seen from the front end.

Figure 55:
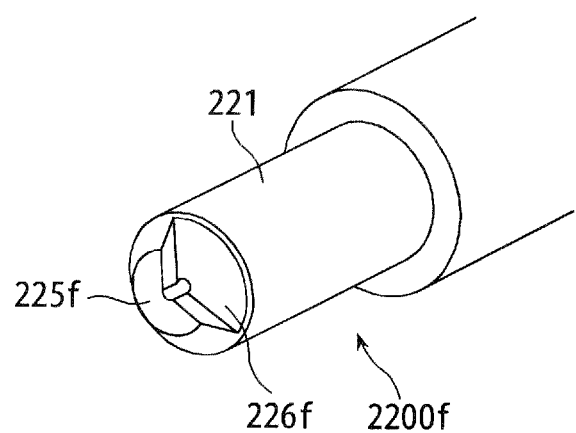
FIG. 55 An oblique view showing a variation example of an end portion of the ferrule.

A recess portion 226f is formed on the front end surface 226f of a ferrule 2200f illustrated in FIG. 55. The recess portion 226f has a fan-like shape which has a central angle of 180 degree or less when the ferrule 2200f seen from the front. In the case of the ferrule 2200e and the ferrule 2200f illustrated in FIG. 54 and FIG. 55, respectively, the optical fiber may be scratched and stressed within the recess portion 226e and 226f of the ferrule 2200e and 2200f, respectively, when the optical fiber is stressed and cut so that the front end surface of the optical fiber is positioned at the position (i.e. inner space of the recess portion 226d and 226e) lower than the front end surface 225e and 225f of the ferrule 2200e and the ferrule 2200f, respectively (see the ferrule 2200e of FIG. 56). The recess portion 226e, 226f may be formed to both ferrules which are brought into contact with each other. Depending on the shape of the recess portion, the front end portions may be unintentionally engaged with each other by a rotation of the ferrules. However, by applying the fan shaped recess portion 226f, the unintentional engaged state between the ferrules may be prevented even if the ferrule rotates and the connection is made through the front end surface.

Figure 56:
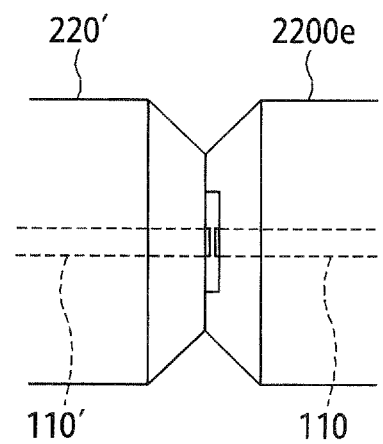
FIG. 56 A side view showing a connection between the ferrule of FIG. 54 and a normal ferrule.

As illustrated in FIG. 56, the front end of the ferrule 2200e (or the ferrule 2200f) which is provided with the recess portion may be brought into contact with a front end of a normal ferrule which is provided with no recess portion. With the above-described structure, the electrical connection between the ferrules may be established with reliability while the optical fiber may be prevented from being damaged by butting the end portions of the optical fibers with each other.

The optical connector apparatus according to first to the eighth embodiments explained above are used for the connection of the electro-optical composite cable. However, the above-described concept may be applied to an optical connector apparatus which is used simply for connecting the optical cable.

DESCRIPTION OF NUMERALS 10, 10a, 10b, 10c, 10d optical connector apparatus
100 first electro-optical composite cable (electro-optical composite cable)
100' second electro-optical composite cable
110 first optical fiber (optical fiber)
110' second optical fiber
120 first protection cover (protection cover)
120' second protection cover
121 optical fiber strand
122 tensile-strength resistant fiber
130 first metal conductor (metal conductor)
130' second metal conductor
140 first outer jacket (outer jacket)
140' second outer jacket
200 first connector (connector)
200' second connector
202 first connector housing (connector housing)
202' second connector housing
203 front end surface
204, 204' lock portion
205, 205' lock release portion
206 first bias member (bias member)
206' second bias member
207 first cable stopper (cable stopper)
207' second cable stopper
210, 210a, 210b, 210c, 2100 main body portion
211, 211a, 211b, 211c, 2110 wiring portion
212 first tubular portion (first adjuster portion)
212' second tubular portion (second adjuster portion)
212a tubular portion (first tubular portion)
226a tubular portion (second tubular portion)
2200a, 2200b, 2200c, 2200d, 2200e, 2200f ferrule
220, 220a, 220b, 220c first ferrule (ferrule)
220', 220a', 220b', 220c' second ferrule
221, 221' connected portion
222, 222' front portion
223 bevel portion
224, 224' back portion
225, 225a, 225c, 225e, 225f front end surface
226e, 226f recess portion
227 pushed surface
228 large diameter portion
229 hole
230, 230' shoulder portion
232, 232' ring-like recess
233 contact surface
240, 240b, 240c first sleeve (first crimped portion)
240', 240b', 240c' second sleeve (second crimped portion)
500, 500a adaptor
505 projection
510, 510a adaptor housing
512, 512' lock hole
520, 520a, 520b, 520c, 520d, 520e connection member
521 cut portion
522, 522d main body portion
523 slit
524 opposed-edges portion (joint portion)
525a, 525b, 525c ferrule-contact portion
526 cut
527 receiving portion
528, 528d, 528e spring portion
529 support portion
530 first part
532 first insertion opening
534 second insertion opening
540 second part
541 edge portion
541e conductive portion
550, 550a accommodation portion
551 press-fit portion
552 support portion
554 accommodation space
554a, 554b end portion
560 fixing portion
800 optical element
801 terminal
802 installation surface
810 housing
812 joint-end surface
820 connection portion
900, 900a adaptor
910, 910a housing
926 cut
927, 927a receiving portion
928, 928a spring portion
930, 930a connection member
941 end portion
941a conductive portion
950, 950a accommodation portion
951 press fit portion
952 support portion
954a, 954b end portion
960 element-accommodation portion
970 extended-connection portion

The invention claimed is:
1. An optical connector apparatus comprising:
a first connector connected with a first electro-optical composite cable including a first optical fiber and a first metal conductor;
a second connector connected with a second electro-optical composite cable including a second optical fiber and a second metal conductor; and
an adaptor relaying a connection between the first connector and the second connector,
wherein:
the first connector comprises a first ferrule holding the first optical fiber, at least a part of a surface of the first ferrule having a conductive portion electrically connected with the first metal conductor;
the second connector comprises a second ferrule holding the second optical fiber, at least a part of a surface of the second ferrule having a conductive portion electrically connected with the second metal conductor;
the adaptor comprises a connection member holding the first ferrule and the second ferrule, at least a part of a surface of the connection member having a conductivity for making an electrical connection between the conductive portion of the first ferrule and the conductive portion of the second ferrule; and
each of the first ferrule and the second ferrule has an end portion including an end surface, at least the entire end surface of the end portion has an insulation property, and the conductive portion is formed in a position apart from the end surface.

2. The optical connector apparatus as recited in claim 1, wherein the connection member grips a part of the surface of the first ferrule and a part of the surface of the second ferrule so as to make an electrical connection between the conductive portion of the first ferrule and the conductive portion of the second ferrule.

3. The optical connector apparatus as recited in claim 1, wherein the connection member comprises a split sleeve.

4. The optical connector apparatus as recited in claim 3, wherein an inner diameter of the split sleeve in an unconnected state is smaller than an outer diameter of each connected portion of the first ferrule and the second ferrule, the connected portion being connected with the split sleeve.

5. The optical connector apparatus as recited in claim 4, wherein each end surface of the first ferrule and the second ferrule has a diameter smaller than the outer diameter of the connected portion, and
wherein the inner diameter of the split sleeve in the unconnected state is larger than the diameter of each end surface of the first ferrule and second ferrule.

6. The optical connector apparatus as recited in claim 1, wherein the first connector further comprises a first bias member biasing the first ferrule toward the second ferrule, and
wherein the second connector comprises a second bias member biasing the second ferrule toward the first ferrule.

7. An optical connector apparatus comprising:
a first connector connected with a first electro-optical composite cable including a first optical fiber and a first metal conductor;
a second connector connected with a second electro-optical composite cable including a second optical fiber and a second metal conductor; and
an adaptor relaying a connection between the first connector and the second connector,
wherein:
the first connector comprises a first ferrule holding the first optical fiber, at least a part of a surface of the first ferrule having a conductive portion electrically connected with the first metal conductor;
the second connector comprises a second ferrule holding the second optical fiber, at least a part of a surface of the second ferrule having a conductive portion electrically connected with the second metal conductor;
the adaptor comprises a connection member holding the first ferrule and the second ferrule, at least a part of a surface of the connection member having a conductivity for making an electrical connection between the conductive portion of the first ferrule and the conductive portion of the second ferrule;
the connection member comprises a split sleeve; and
the adaptor further comprises an accommodation portion holding the split sleeve so that the inner diameter of the split sleeve is variable.

8. The optical connector apparatus as recited in claim 7, wherein the accommodation portion: includes (i) an accommodation space accommodating the split sleeve; (ii) a first insertion opening communicating with the accommodation space and being inserted with the first ferrule; and (iii) a second insertion opening communicating with the accommodation space and being inserted with the second ferrule, and
wherein each inner diameter of the first insertion opening and the second insertion opening is larger than the inner diameter of the split sleeve and smaller than the outer diameter of the split sleeve.

9. The optical connector apparatus as recited in claim 7, wherein the first connector further comprises a first bias member biasing the first ferrule toward the second ferrule, and
wherein the second connector comprises a second bias member biasing the second ferrule toward the first ferrule.

10. An optical connector apparatus comprising:
a first connector connected with a first electro-optical composite cable including a first optical fiber and a first metal conductor;
a second connector connected with a second electro-optical composite cable including a second optical fiber and a second metal conductor; and
an adaptor relaying a connection between the first connector and the second connector,
wherein:
the first connector comprises a first ferrule holding the first optical fiber, at least a part of a surface of the first ferrule having a conductive portion electrically connected with the first metal conductor;
the second connector comprises a second ferrule holding the second optical fiber, at least a part of a surface of the second ferrule having a conductive portion electrically connected with the second metal conductor;
the adaptor comprises a connection member holding the first ferrule and the second ferrule, at least a part of a surface of the connection member having a conductivity for making an electrical connection between the conductive portion of the first ferrule and the conductive portion of the second ferrule;
the connection member comprises a split sleeve; and
the split sleeve is formed with a slit defining a width of split of the sleeve and a cut portion besides the slit.

11. The optical connector apparatus as recited in claim 10, wherein the first connector further comprises a first bias member biasing the first ferrule toward the second ferrule, and
wherein the second connector comprises a second bias member biasing the second ferrule toward the first ferrule.

12. An optical connector apparatus comprising:
a first connector connected with a first electro-optical composite cable including a first optical fiber and a first metal conductor;
a second connector connected with a second electro-optical composite cable including a second optical fiber and a second metal conductor; and
an adaptor relaying a connection between the first connector and the second connector,
wherein:
the first connector comprises a first ferrule holding the first optical fiber, at least a part of a surface of the first ferrule having a conductive portion electrically connected with the first metal conductor;
the second connector comprises a second ferrule holding the second optical fiber, at least a part of a surface of the second ferrule having a conductive portion electrically connected with the second metal conductor;
the adaptor comprises a connection member holding the first ferrule and the second ferrule, at least a part of a surface of the connection member having a conductivity for making an electrical connection between the conductive portion of the first ferrule and the conductive portion of the second ferrule;
a recess portion is formed on the end portion of the first ferrule; and an end of the first optical fiber is positioned within the recess portion so that the end of the first optical fiber is not projected from the end surface of the first ferrule.

13. The optical connector apparatus as recited in claim 12, wherein the recess portion has a fan shape which has a central angle of 180 degrees or less when seen from the front end of the first ferrule.

14. The optical connector apparatus as recited in claim 12, wherein the first connector further comprises a first bias member biasing the first ferrule toward the second ferrule, and wherein the second connector comprises a second bias member biasing the second ferrule toward the first ferrule.

* * * * *

UNITED STATES PATENT AND TRADEMARK OFFICE
CERTIFICATE OF CORRECTION

PATENT NO. : 9,195,010 B2
APPLICATION NO. : 13/147888
DATED : November 24, 2015
INVENTOR(S) : Hideto Shimazu et al.

It is certified that error appears in the above-identified patent and that said Letters Patent is hereby corrected as shown below:

In the Specification

Column 6, line 29, change "Across-Sectional" to --A cross-sectional--.

Column 14, line 24, change "140" to --140'--.

Column 15, line 9, change "220" to --220'--.

Column 23, line 42, change "100," to --100',--.

Signed and Sealed this
Ninth Day of August, 2016

Michelle K. Lee
*Director of the United States Patent and Trademark Office*